United States Patent [19]
Stone et al.

[11] Patent Number: 5,652,851
[45] Date of Patent: *Jul. 29, 1997

[54] USER INTERFACE TECHNIQUE FOR PRODUCING A SECOND IMAGE IN THE SPATIAL CONTEXT OF A FIRST IMAGE USING A MODEL-BASED OPERATION

[75] Inventors: Maureen C. Stone, Los Altos, Calif.; Anthony DeRose, Seattle, Wash.

[73] Assignee: Xerox Corporation, Stamford, Conn.

[*] Notice: The term of this patent shall not extend beyond the expiration date of Pat. No. 5,467,441.

[21] Appl. No.: 96,521

[22] Filed: Jul. 21, 1993

[51] Int. Cl.$^6$ .................................................... G06T 3/00
[52] U.S. Cl. ........................... 395/346; 395/339; 395/133; 395/134
[58] Field of Search ........................ 395/155, 161, 395/157, 133, 134, 135; 345/113, 118, 119

[56] References Cited

U.S. PATENT DOCUMENTS

| 4,800,379 | 1/1989 | Yeomans | 340/731 |
|---|---|---|---|
| 4,809,201 | 2/1989 | Keklak | 395/155 X |
| 5,021,976 | 6/1991 | Wexelblat et al. | 364/521 |
| 5,222,159 | 6/1993 | Kawamura et al. | 382/48 |
| 5,241,624 | 8/1993 | Torres | 395/155 X |
| 5,278,954 | 1/1994 | Hohlfeld et al. | 395/160 X |
| 5,283,560 | 2/1994 | Bartlett | 345/113 |
| 5,307,457 | 4/1994 | Beitel et al. | 395/161 |
| 5,329,613 | 7/1994 | Brase et al. | 395/122 |
| 5,341,465 | 8/1994 | Goto | 395/134 |
| 5,341,466 | 8/1994 | Perlin et al. | 395/139 |
| 5,425,137 | 6/1995 | Mohan et al. | 395/133 |
| 5,459,832 | 10/1995 | Wolf et al. | 395/155 |
| 5,467,441 | 11/1995 | Stone et al. | 395/133 |
| 5,479,603 | 12/1995 | Stone et al. | 395/161 |
| 5,485,174 | 1/1996 | Henshaw et al. | 345/123 |

FOREIGN PATENT DOCUMENTS

| 538715A2 | 10/1992 | European Pat. Off. | G06F 15/72 |
|---|---|---|---|
| 0544509 | 6/1993 | European Pat. Off. | |

OTHER PUBLICATIONS

European Search Report, EP 94 30 5295.1, The Hague, Nov. 13, 1995.

E. Bier, M. Stone, K. Pier, W. Buxton and T. DeRose, "Toolglass and Magic Lenses:The See-Through Interface", *Computer Graphics Proceedings, SIGGRAPH* 93, pp. 73–80, 1993.

C. Ottino, "User Interface in the 1990's", *ISA Transactions*, Jul. 1993, vol. 32, No. 2, pp. 95–121.

(List continued on next page.)

*Primary Examiner*—Raymond J. Bayerl
*Assistant Examiner*—Crescelle N. dela Torre
*Attorney, Agent, or Firm*—Judith C. Bares

[57] ABSTRACT

A technique for producing a second image for display in the context of an original image uses a model data structure, in contrast to an image-based data structure, and a model-based operation, called a viewing operation, in contrast to an image-based operation, to produce the second image. The second image is displayed in the spatial context of the original image, as that context is defined by a viewing operation region, or VOR, at the same time as the original image is being displayed, giving the perception to a machine user of providing information related to the original image in the spatial context of the original image. The VOR functions as a type of "visual filter", binding the second view of the original image to the display area defined by the VOR. In one illustrated embodiment, the method operates within the environment of a rendering application executing in a graphical user interface environment. A machine user moves the VOR over a portion of a rendered image, and in response to the user's movement action, a viewing operation associated with the VOR invokes the renderer that produced the original rendered image to produce a second modified view of the original image using a new value for a global parameter in the scene description. The second image is then clipped to the size and shape of the VOR, and is then presented in the VOR, showing the second modified view.

33 Claims, 40 Drawing Sheets

OTHER PUBLICATIONS

Broderbund "Spelunx" Software Program Guide, pp. 1–2, 21 and 24; four (4) screen display images of Tumnus room; one (1) screen display of software copyright notice; Copyright 1992, 1993 by Broderbund Software, Inc. and Cyan.

Perlin, Ken, and Fox, David, "Pad An Alternative Approach to the Computer Interface", draft of journal article received from K. Perlin by Xerox colleague in Apr., 1993 without obligation of confidentiality; later published in Aug., 1993.

LaLonde, Wilf & Pugh, John, "Graphics Through the Looking Glass", in *Journal of Object Oriented Programming*, Aug./Sep., 1988, pp. 52–58.

Krasner, Glenn E., and Pope, Stephen T., "A Cookbook for Using the Model–View–Controller User Interface Paradigm in Smalltalk–80", in *Journal of Object Oriented Programming*, Aug./Sep., 1988, pp. 26–49.

Fairchild, Kim, Meredith, Greg, and Wexelblat, Alan, "A Formal Structure for Automatic Icons", in *Interacting With Computers*, vol. 1, No. 2 (1989), pp. 131–140.

Lin, Jin–Kun, "MediaMosaic–A Multimedia Editing Enviroment", in Proceedings of the ACM Symposium on User Interface Software and Technology (UIST), Nov. 15, 1992, pp. 135–141.

Weyer, Stephen and Borning, Alan, "A Prototype Electronic Encylcopedia", in *ACM Transactions on Office Information Systems*, vol. 3, No. 1, Jan. 1985, pp. 63–88.

Sarkar, M., and Brown, M., "Graphical Fisheye Views of Graphs", in *ACM Conference on Human Factors in Computing Systems (CHI)*, May 1992, pp. 83–91.

Spence, R. and Apperly, M., "Data base navigation: an office enviroment for the professional", in *Behaviour and Information Technology*, 1982, vol. 1, No. 1, pp. 43–54.

*PC Paintbrush IV Plus*™ User Manual, ZSoft Corp., 1989, 1990, pp. v–x, 21–24, 72, 79, –80, 95–96, 139–148.

Bier, E. and Freeman, S., "MMM: A User Interface Architecture for Shared Editors on a Single Screen" in the *Proceedings of the ACM SIGGRAPH Symposium on User Interface Software and Technology* (Hilton Head, SC, Nov. 11–13, 1991), ACM, New York, 1991, pp. 79–86.

D. Swinehart et al., "A Structural View of the Cedar Programming Enviroment", *ACM Transactions on Programming Languages and Systems*, vol. 8, No. 4, Oct. 1986, pp. 419–490.

W. Teitelman, "A Tour Through Cedar", *IEEE Software*, vol. 1, No. 2, Apr., 1984, pp. 44–73.

K. Pier et al., "An Introduction to Gargoyle: An interactive Illustration Tool", *Proceedings of the Intl. Conf. on Electronic Publishing, Document Manipulation and Typography*, (Nice, France, Apr.) Cambridge University Press, 1988, pp. 223–238.

"Kaleida Launches Alliance", in Digital Media, Mar. 29–Apr. 26, 1993, pp. 12–16.

Beck, K., Becher, J. and Liu, Zaide, "Integrating Profiling into Debugging", 1991 *International Conference on Parallel Processing*, vol. II, Software, H. Schwetman, ed., Penn State University, CRC Press, Aug. 12–16 1991, pp. II–284–II–285.

USER INTERFACE TECHNIQUE FOR PRODUCING A SECOND IMAGE IN THE SPATIAL CONTEXT OF A FIRST IMAGE USING A MODEL-BASED OPERATION

CROSS REFERENCE TO OTHER APPLICATIONS

The present invention is related to other inventions that are the subject matter of concurrently-filed, commonly-assigned U.S. patent applications having the following serial numbers and titles: Ser. No. 08/096,200, "Method and Apparatus for Operating on an Object-Based Model Data Structure to Produce a Second Image in the Spatial Context of a First Image"; Ser. No. 08/096,193, now U.S. Pat. No. 5,479,603, entitled "Method and Apparatus for Producing a Composite Second Image in the Spatial Context of a First Image", which is hereby incorporated by reference herein; Ser. No. 08/587,890, "User-Directed Method for Operating on an Object-Based Model Data Structure Through a Second Contextual Image"; and Ser. No. 08/320,975, now U.S. Pat. No. 5,467,441, which is a continuation of Ser. No. 08/096,131, entitled, "Method for Operating on Objects in a First Image Using an Object-Based Model Data Structure to Produce a Second Contextual Image having Added, Replaced, or Deleted Objects".

FIELD OF THE INVENTION

The present invention relates generally to a method of operating a processor-controlled machine having a display for displaying images, and to a processor-controlled machine operated according to the method. More particularly, the present invention relates to producing human perceptible output related to the image display features presented in a first displayed image by operating on the model data structure from which the image was produced, and using a displayed output producing region for identifying the relevant portion of the image for which the human perceptible output is to be produced.

BACKGROUND

A frequent and powerful use of a processor-controlled machine such as a computer is the presentation of information in the form of images on a display device connected to the machine. An image, which may include characters, words, and text as well as other display features such as graphics, is produced in a display area of the display device directly from an image definition data structure defining the image; the image definition data structure is typically stored in a memory area of the machine. One type of image format known as a raster image is composed of individual image locations commonly referred to as "pixels". The discussion of images herein will generally reference pixel data, but it is to be understood that other data formats, such as vector data, may also be used to define an image. The images discussed herein may be either static (having the appearance to a system operator or user of not moving), or animated, as, for example, in the case of a digital video image.

An image definition data structure alone carries relatively limited data about the information content of the image the data represent. However, for many images, the image definition data structure is itself generated from another data structure which contains information or data capable of being understood by a human or by a software operation such as an application program which is executed by the machine's processor. Such a data structure will be referred to herein as the "information model data structure" or the "model data structure", and is to be distinguished from the image definition data structure.

An example of an information model data structure is a model from which a graphics image, such as a photorealistic scene, is generated. The model, also called a scene description, contains descriptions of primitives that define the shapes of components, objects, and light sources in a three-dimensional scene, the displayed appearance attributes of the primitives, such as color and surface texture, and connectivity relationships that show how object primitives are positioned and fit together in the scene. The scene description must then be converted into the image definition data structure, such as a pixel data structure, for display of the image on an output medium, typically on a monitor or in hardcopy form. The operation, or application, of mapping the scene description to an image definition data structure is typically referred to as "rendering".

Another example of an information model data structure is a document data structure, or document model, used by a word processing or other document manipulation application which contains the text, formatting instructions, and other data needed for producing a formatted document. In order to permit interaction with the text and its format on a page or in a document by an operator or user of the processor-controlled machine on which the application instructions are executed, an application such as a word processing program produces an image definition data structure from the document data structure (the model) in order to display an image of the page or document in the display area of the display.

Still another example of an information model data structure is a graphical object data structure of the type used by a "illustration" or "drawing" application which contains data about each graphical object defined for display. The data about each graphical object typically includes appearance attribute data including the size, shape, color, line thickness, orientation, and the object's position in some relative coordinate system, which together describe how the object appears in an image created from the graphical object data structure. In software applications which permit manipulation of graphical objects, images may be created in which objects have the appearance of being in different planes in the two-dimensional display area, resulting in what is known as a 2½ dimensional (2½ D or 2.5 D) image. The graphical object data structure which provides description data for a 2.5 D image also includes a list of the objects in an order which describes the relative positioning of the objects in the different planes and with respect to each other.

The examples just discussed are by no means exhaustive of the examples of model data structures from which images may be produced. Images produced from model data structures have at least one similarity of importance to the discussion of the invention herein: each image provides a view of the model data structure to the machine operator or user. The content of the view is established by the functions defined in the processor-controlled operation, typically called the "application", which produces the image from the model data structure. In effect, the image produced by the application provides visual access to the data and information in the model data structure.

In some existing systems, the system user may access, and in some cases manipulate, data and information in the model data structure through alternate functions defined by the application. This provides the system user with the ability to access, and perhaps affect or manipulate, data and information that is not represented by display features currently visible in the original image.

For example, in some computer-aided design systems, at the command of the user, an image including a front view (the first image) of a part assembly is displayed in the display area of the system's display device, and the user may cause a side view (the second image) of the part assembly, or a portion of the part assembly, to be displayed simultaneously with the first image in a separate portion of the display area. The second image may be displayed at one side of the display area so as to permit viewing and inspection of, and perhaps interaction with, both images. The image portion containing the front view of the part assembly is produced, typically in response to a user command, from accessing and operating on the information model data structure containing all of the part assembly information, and then a first image definition data structure is produced for displaying the first (front view) image. Similarly, in response to a user command to display the side view of the same part assembly, the information model data structure for the part assembly is again accessed and operated on to select the part assembly information needed to produce the side view, and then a second image pixel data structure is produced for displaying the second (side view) image. In some system implementations, the system designer may have decided that the second image is of primary importance to the user and so it may be displayed on top of the first image, obscuring all or part of the first image from the user's view.

Another example of the display of related simultaneous first and second images is a computer spreadsheet application that provides the ability for the user to select a cell of the spreadsheet which contains summary data in order to produce a second image containing the detailed information that was processed to produce the summary information in the selected cell. The operation to produce the second image must operate on the model for the spreadsheet to select and format the necessary data to display in the second image. The detailed information in the second image is typically displayed in a separate workspace and may obscure a portion of the summary spreadsheet of the first image.

In each of the examples described, and typical of many of the systems implementing these types of multiple views of a model, the spatial relationship between the original image, the specification of the input content for the second image and the position of the second image in the display is not easy to visualize. While the specification of the input may be directly related to the first image (i.e. when the user can point to or select a region in the first image) this is not always the case as, for example, when the user has to type commands to specify a second image. Furthermore, once a selection is specified, the user either has no control over the location of the second image, or must reposition it in a separate step. Therefore, it can be difficult to understand how the second image is spatially related to the first image and to the model. Linking direct selection in the first image to the spatial position of the second image can make these relationships more clear. This can be especially important when the model is complex and can be viewed in many different ways. As systems supporting complex models, or sets of related models, are becoming more common, this problem is becoming more critical.

An example of providing a user with simultaneous control over both first image portion selection and second image display location is the software implementation of image magnification. U.S. Pat. No. 4,800,379 discloses a method and an apparatus for displaying an image, defined by digital data representing the color content of the pixels of the image, which is responsive to a "magnify" signal from an indicator assembly of the apparatus to cause the monitor to display, centered within the boundary of an image selecting outline area, the magnified portion of the image which falls within the boundary of the image selecting outline area. The magnified portion of the image can thus be seen in the spatial context of the entire image, with the portion of the image under the magnified portion in the outline area being suppressed. The portion of the image for which the second, magnified view is desired is defined by the location in the image to which the user moves the image selecting outline area. In the magnifier disclosed in U.S. Pat. No. 4,800,379, it appears that a separate command is required for the user to initiate the magnify operation itself (see col. 3, lines 58–65).

EPO 0 544 509, entitled "Photographic Filter Metaphor for Control of Digital Image Processing Software", discloses another example of the display of a second image in the spatial context of a first image. EPO 0 544 509 discloses a method and interactive user interface for displaying an image on a display device, selecting a filter for overlaying on a portion of the image, modifying for display the portion of the image overlayed by the filter while preserving the image as it appeared before modification, displaying the modified filtered portion of the image and retrieving the image as it appeared before the modification. Predetermined or custom designed filter functions may be moved over an image and over each other to produce a modified visual display showing the effect of the filter or filters on the image without altering the actual image. Examples of filters include gamma, convolution, mixer, halftone, rotation, scaling and geometric filters which provide a variety of digital image processing effects.

Operations on the image pixel data structure alone, such as those disclosed in U.S. Pat. No. 4,800,379 and EPO 0 544 509, provide versions and views of the first image which are limited strictly to manipulations of pixel values. So, while a typical software implementation of a pixel magnifier provides some desirable features for generating the simultaneous display of two images, the range of information content possible in a second image which is derived directly from the image pixel data structure of the first image is necessarily limited to versions and views of the first image which result only from operating on the pixel values. When information is available about the first image from the information model data structure of the first image, the method used for operating on the image pixel data structure to produce image (pixel) magnification is not transferable to operating on the information model data structure to provide alternate views of the first image and as a result, such a method is inoperable for use in accessing alternative views of an information model data structure.

SUMMARY OF THE INVENTION

The method of the present invention recognizes the importance of providing access to data and information in a model data structure from which an image was produced, and for providing that access in the spatial context of the original image. Depending on the nature of the data and information in the model, the method may provide such access in any suitable human perceptible form, including visual, audio, tactile and olfactory output.

In addition, for further versatility, the method of the present invention may be used as an interactive method, with input from a human user, as in the case, for example, of operating the method as a type of, or enhancement to, a graphical user interface facility. Or the method may be implemented as a fully automated method under software program control, receiving signals requesting human perceptible output representing access to data and information in the model data structure from a signal source, such as, for example, from another application program or from an operating system executing concurrently in the processor-controlled machine. Alternatively, a combination of signals from a user or from another signal source, may be used to request the human perceptible output representing access to data and information in the model data structure.

In accordance with the present invention, there is provided a method of operating a processor-controlled machine that includes a signal source for producing signals indicating image display requests, output circuitry connected to an output utilization device for producing human perceptible output, memory for storing data, and a processor connected for receiving the signals from the signal source, connected for providing data defining human perceptible output to the output circuitry, and connected for accessing the data stored in the memory. The output utilization device of the machine includes a display having a display area for presenting images, and the display area has a first image displayed in a present image position of the display area; the first image includes at least one perceptible display feature which is hereafter called a "first display feature". The data stored in the memory of the processor-controlled machine include instruction data indicating instructions the processor executes, and a first image model data structure from which the first image was produced. The first image model data structure includes a data item which is hereafter called a "first image data item"; the first image data item is represented by the first display feature in the first image, and the first display feature can be mapped to, or represents, the first image data item in the first image model data structure.

According to the method, the processor first receives request signal data from the signal source indicating a display request to present an output producing region in a present viewing position in the display area coextensive with the present image position of a portion, or "first image segment", of the first image that includes the first display feature. Next, the processor responds to the request signal data by producing output signal data defining human perceptible output using the first image data item from the first image model data structure, and providing the output signal data defining the human perceptible output to the output circuitry so that the output utilization device presents the human perceptible output in response to the output signal data at the same time as the first image is being displayed in the display area. In this manner, the method presents the human perceptible output produced using the first image data item in the first image model data structure in response to the display request from the signal source, thereby giving the perception to a machine user of providing access to information related to the first display feature in the first image segment.

In the case of providing visual access to the data and information in a model data structure from which an image is produced, the method and machine of the present invention recognize the deficiency in existing systems providing second image views of a model data structure that do not provide for a user to have simultaneous control over both selecting the portion of the first image as input and locating the display of the visual output in the appropriate spatial context of the first image. The method and machine of the present invention, therefore, use the output operation region to select the portion of the original image for which a second image is wanted, and at the same time provides for display of the second image in the same output operation region, in the spatial context of the first image. (Hereafter, the term "first image" will be used interchangeably with the term "original" image.) Such display of the second image in the spatial context of the first image, may, depending on the information content of the second image, enhance the information content of the first image, reveal information that is currently hidden from view in the first image, or suppress from view information currently displayed in the first image that appears distracting to a user. It can be seen that, when the method is implemented as an interactive method, the user need only specify the display location of the output producing region, called a "viewing operation" region in the case of visual output, to determine both the content and location of the second image.

Therefore, in accordance with still another aspect of the present invention, a method of operating a processor-controlled machine is provided in which the output producing region is a viewing operation region, and the human perceptible output provided to the output circuitry is image definition data defining a second image for display on the display device. The second image has size and shape dimensions substantially identical to size and shape dimensions of the viewing operation region. The second image is presented in the viewing operation region substantially at the same time as the first image is being displayed in the display area, so that presentation of the second image in the viewing operation region in the present viewing position in the display area coextensive with the present image position of the first image segment replaces the first image segment in the display area.

In another aspect of the present invention, the first image data item has a present attribute value indicating the first display feature included in the first image segment; this first image data item will hereafter be referenced as a "display feature attribute data item", the value of which indicating the appearance of the first display feature. The method further includes obtaining a new attribute value for the display feature attribute data item, the new attribute value indicating a modified first display feature. This aspect of the method further includes using the new attribute value for the display feature attribute data item to produce the image definition data defining the second image so that the second image includes the modified first display feature. Operating a machine according to this aspect of the method of the present invention shows the presentation of the second image, including the modified first display feature, in the viewing operation region replacing the first image segment in the display area, in response to the display request from the signal source. When the display feature attribute data item functions as a global parameter to an application that uses the first image model data structure to produce the first image, using the method to modify the display feature attribute data item in this manner will produce a second image having modified display features for all aspects of the first image controlled by the parameter data item.

Thus, this aspect of the method just discussed provides the ability to modify the view of a portion of the first image using the first image model data structure. Such a modified view may enhance the understanding of the image or the information in the first image model data structure, or reveal information about the image or about the first image model data structure. The method provides for the implementation of a wide range of information visualization interaction techniques for understanding information and its structure. As will be seen from the discussion of the illustrated embodiments below, the method may be implemented using techniques for exploring the first image model structure in a general manner, or may be implemented using techniques for accessing and visualizing information specifically tailored to the information's structure and a user's task.

Another significant advantage of the method of the present invention over existing methods which present second views of a model data structure is the ability to maintain and provide the global context of the first image while presenting the focus of the second image in the viewing operation region. As will be seen from the discussion of the illustrated embodiments below, in many of the specific implementations of the method, little or no global context or information is lost from the first image.

The present invention also provides for the display request signal requesting the display of the viewing operation region to be generated by a machine user through a user input device connected to input circuitry in communication with the processor. In one aspect of the user-directed method, the request signal data from the input circuitry indicating the display request by the machine user includes a movement signal indicating a movement action by the machine user moving the viewing operation region from a first position in the display area to the present viewing position coextensive with the first image segment including the first display feature in the display area. The first image has the appearance of being displayed in a first image plane in the display area, and the viewing operation region has the appearance of being displayed in a second image plane, in front of the first image plane, so that the movement action by the machine user moves the viewing operation region displayed in the second image plane in front of the first image segment of the first image displayed in the first image plane.

In this aspect of the invention, in order to reduce the amount of interaction required by a user to produce the second image, the operation which is performed on the information model data structure of the first image for generating the second image is associated with the movable viewing operation region. The location of the movable viewing operation region defines the portion of the first image for which a second image is desired, but does not necessarily define the portion of the information model data structure which is to be operated on. The input requirements of the operation itself define the portion of the information model data structure which is to be operated on. The binding of the operation to a selectable, movable display region and the binding of the definition of the output image to the location of the movable display region together reduces the number of steps the user must take to produce the selected second image on the display, thus providing a user with an intuitive and easy-to-use interface for producing the desired second image. This interface may take on the appearance to a user of a "lens" or "filter" which, when moved to different portions of the first image, presents the desired view of the first image within the movable viewing operation region with no further interaction required by the user to generate the desired view.

The present invention also includes a machine having a processor controlled according to the method described above or according to any of the aspects thereof. The present invention further includes a software article of manufacture for use in a processor-controlled machine having a storage medium access device for accessing a medium that stores data. The software article comprises a data storage medium, which can be accessed by the storage medium access device when the article is used in the machine, and data stored in the data storage medium so that the storage medium access device can provide the stored data to the processor when the article is used in the machine. The stored data comprises instruction data indicating instructions the processor can execute, and the processor, in executing the instructions, receives request signal data from the user input device indicating a display request by the machine user to display a viewing operation region in a present viewing position in the display area coextensive with the present image position of a first image segment of the first image. The processor, further in executing the instructions, responds to the display request by providing image definition data defining a second image to the display so that the display presents the second image in the viewing operation region in response to the image definition data. The second image, produced from the first image model data structure according to the instructions the processor executes, has size and shape dimensions substantially identical to the size and shape dimensions of the viewing operation region and is displayed substantially at the same time as the first image is being displayed in the display area.

The novel features that are considered characteristic of the present invention are particularly and specifically set forth in the appended claims. The invention itself, however, both as to its organization and method of operation, together with its advantages, will best be understood from the following description of the illustrated embodiments when read in connection with the accompanying drawings. In the Figures, the same numbers have been used to denote the same component parts or acts.

Figure 1:
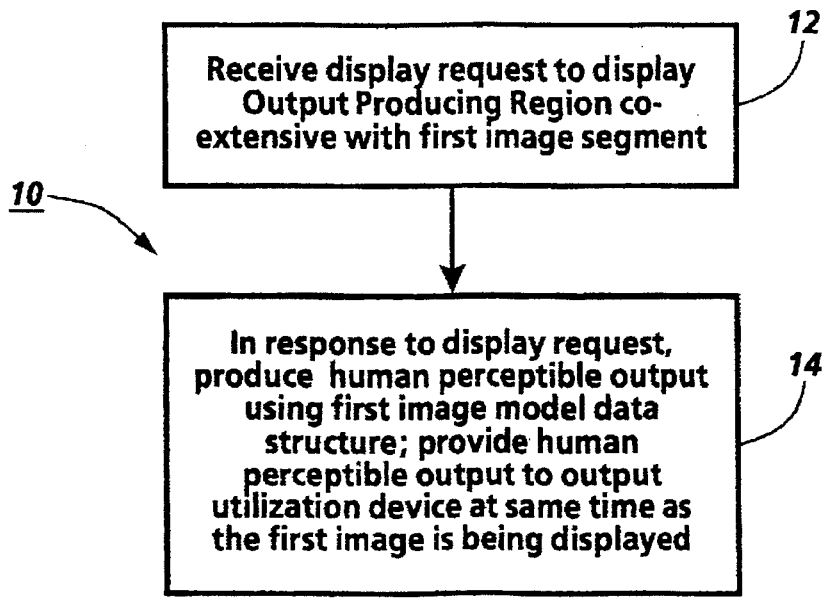
FIG. 1 is a flow chart illustrating the acts of the method of operating a machine according to the present invention.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

DETAILED DESCRIPTION OF THE ILLUSTRATED EMBODIMENTS

Table 1: Detailed Description Table of Contents
A. Definitions and Machine Environments.
 1. Definitions.
 2. The first image model data structure.
 3. The machine environment.
B. Description of the Method of the Present Invention.
 1. Presenting human-perceptible output about the first image model data structure using the output producing region.
 2. Presenting a second image showing information about the first image model data structure using the output producing region.
 3. Operating on a model data structure having a global parameter to present a second image having a modified first display feature.
 4. Operating on a model data structure having objects.
  a. Object-based model data structures.
  b. Presenting a second image using an object-based first model.
  c. Presenting a second image having a modified first display object.
  d. Selecting objects from the model data structure.
  e. Highlighting information in the model data structure.
C. Description of an illustrated embodiment of a graphical object implementation.
 1. The system environment for the user interface implementation.
 2. A graphical object implementation.
  a. The user interaction.
  b. Response to the user request signals.
   i. Copying and modifying the model data structure.
   ii. Subsequent user movement of the VOR.
   iii. Performance considerations.
  c. Operating on multiple first images.
  d. Operating with multiple viewing operation regions on a single first image.
 3. An alternative implementation using a standard graphics language interpreter as the model.
 4. The graphical object implementation using object selection.
 5. Facilitating user interaction with objects in the object-based model.
 6. Using viewing operations and viewing operation regions for temporally and spatially bounded "what-if" model changes.
 7. User selection of an input parameter and user interface implementation details.
  a. User selection of input parameters for viewing operations.
  b. User interface implementation details.
D. Implementation as an independent application in a window environment.
E. The machine and software product of the present invention.
F. Functional domains of viewing operations.
G. Miscellaneous considerations.
 1. Display request signals from non-user sources.
 2. Viewing operation regions.

A. Definitions and Machine Environments

The present invention relates to method steps for operating a machine including a processor, and to processing electrical or other physical signals to produce other desired physical signals. The detailed descriptions which follow are presented largely in terms of display images and symbolic representations of operations of data within the memory of the display system. These descriptions and representations, which are algorithmic in nature, are the techniques used by those skilled in the data processing arts to most effectively convey the substance of their work to others skilled in the art. An algorithm is here, and generally, conceived to be a self consistent sequence of acts leading to a desired result. These acts are those requiring physical manipulations of physical quantities such as electrical or magnetic signals that are capable of being stored, transferred, combined, compared, and otherwise manipulated. It proves convenient at times, principally for reasons of common usage, to refer to these signals by a variety of terms, including bits, values, elements, pixels, symbols, characters, terms, numbers, items, or the like. However, all of these terms and the additional terms defined below are convenient labels applied to appropriate physical quantities.

Further, the manipulations performed are often referred to in terms, such as adding, comparing, or determining, which are commonly associated with mental operations performed by a human user. The capability of a human user is neither necessary nor desirable in the operations described herein which form part of the present invention. In some aspects of the present invention, however, the machine operations are performed in response to operation request signals produced by a human user. In addition, the algorithmic descriptions presented herein of the acts of the present invention for operating a display system are not inherently related to any particular processor, machine, or other apparatus. Useful machines for performing the operations of the present invention include general purpose digital computers or other similar devices configured as described below and in the claims.

The present invention also relates to a machine for performing these operations. This machine may be specially constructed for the required purposes or it may comprise a general purpose computer selectively activated or reconfigured by a computer program stored in the computer. In particular, various general purpose machines may be used with programs in accordance with the teachings herein, or it may prove more convenient to construct more specialized apparatus to perform the required acts of the method. The required structure for a variety of these machines will appear from the description given below.

1. Definitions

Preliminary to describing the embodiments of the claimed invention illustrated in the accompanying drawings, the terms defined below have the meanings indicated throughout this specification and in the claims.

The term "data" refers herein to physical signals that indicate or include information. The term "data" includes data existing in any physical form, and includes data that are transitory or are being stored or transmitted. For example, data could exist as electromagnetic or other transmitted signals or as signals stored in electronic, magnetic, or other form.

An "item of data" or a "data item" is a quantity of data that a processor can access or otherwise operate on as a unit. For example, an eight-bit byte is a data item in many data processing systems. Data can be combined into a "data structure". A "data structure" is any combination of interrelated data. A data structure may also include other data structures.

A "processor-controlled machine" or "processor" is any machine, component or system that can process data, and may include one or more central processing units or other processing components. Any two components of a machine or system are "connected" when there is a combination of circuitry that can transfer data from one of the components to the other. The component from which the data is transferred "provides" the data, and the other component "receives" the data. For example, two processing units are "connected" by any combination of connections between them that permits transfer of data from one of the processing units to the other. A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor "uses" data in performing an operation when the result of the operation depends on the value of the data. An "instruction" is an item of data that a processor can use to determine its own operation. A processor "executes" a set of instructions when it uses the instructions to determine its operations.

"Memory" is any component, combination of components, circuitry, or system that can store data, and may include local and remote memory and input/output devices. An example of memory is a storage medium access device with a data storage medium that it can access.

A "data storage medium" or "storage medium" is a physical medium that can store data. Examples of data storage media include magnetic media such as floppy disks and PCMCIA memory cards, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples include floppy disk drives and CD-ROM readers.

An item of data "indicates" a thing, an event, or a characteristic when the item has a value that depends on the existence or occurrence of the thing, event, or characteristic or on a measure of the thing, event, or characteristic. When an item of data can indicate one of a number of possible alternatives, the item of data has one of a number of "values". In addition, a first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, when a first item of data indicates position information of an image display feature in the display area of a display device, and the position information may be used by the processor to obtain a second data item in a data structure, the first item of data indicates the second item of data. In another example, within a data structure, when a first item of data includes a pointer or other information related to the location of a second item of data in the data structure, the first item of data indicates the second item of data.

An "image" is a pattern of light. An image may include characters, words, and text as well as other features such as graphics. An image may be divided into image "segments," each of which is itself an image. A segment of an image may be of any size up to and including the whole image. An "image output device" is a device that can provide output defining an image. A "display" or "display device" is an image output device that provides information in a visible, human viewable form. A display may, for example, include a cathode ray tube; an array of light emitting, reflecting, or absorbing elements; a device or structure that presents marks on paper or another medium; or any other device or structure capable of defining an image in a visible form. To "present an image" on a display is to operate the display so that a viewer can perceive the image. A "display area" is the portion of the display in which an image is presented or the medium which receives an image. A "display system" is a system or machine that processes data and that includes a display and a processor.

Data "defines" an image when the data includes sufficient information to directly produce the image, such as by presenting the image on a display. Data defining an image will also be referred to herein as an "image definition" or "image definition data". For example, a two-dimensional array is an image definition that can define all or any part of an image, with each item of data in the array providing a value indicating the color of a respective location of the image. Each such image location is typically called a "pixel", and the two-dimensional array of data is typically called "image pixel data" or an "image pixel data structure", each item of data in the array providing a value, called a "pixel value", indicating the color of an image location. While image pixel data is the most common type of image definition data, other image definitions, such as vector list data, are intended to be included within the meaning of data defining an image.

The term "display feature" refers to any human perception produced by a display in a processor-controlled machine or display system. A "display object" is a display feature that is perceptible as a coherent unity. A "shape" is a display object that has a distinguishable outline; for example, a circular display object is a shape. A shape having a bounded area may be called a "region". An image "includes" a display feature or object if presentation of the image can produce perception of the feature or object. Similarly, a display object "includes" a display feature if presentation of the display object can produce perception of the display feature. As used herein, the term "display feature" includes a single display feature and also may include plural display features that together form a pattern of display features in an image. For example, a display feature perceived as a solid black line in an image may be considered a single display feature or a combination of display features including the line's length, color, solidness, orientation in space, and other such perceivable features. In the terminology just presented, therefore, the solid black line may also be considered a display object which includes the display features of blackness and solidness.

A "viewing operation region", also referred to herein as an "output producing region", is a region having an arbitrarily shaped, bounded area. A viewing operation region is also an example of a "workspace" A "workspace" as used herein is a display region within which display features appear to have respective relative positions, and "presenting" a workspace that includes plural display features produces the human perceptions of the display features in respective positions relative to each other. A window is an example of a workspace.

A common characteristic of processor-controlled machines and display systems operated by the method of the present invention is a mapping between items of data within the system and display features included in images presented by the system. A display feature "represents" a body of data when the display feature can be mapped to one or more items of data in the body of data, or, stated in another way, a display feature "represents" the item or items of data to which it can be mapped. For example, the display object perceived as a solid black line in an image may represent one or more items of data in the model data structure that an operation uses to produce the line's length, color, solidness, orientation in space, and other perceivable features.

The mapping of one or more items of data to a display feature or object is performed by an "operation" which is used herein to mean a set of instructions (instruction data items) accessible and executable by the processor in a display system, defining the mapping relationship or function between one or more items of data (an input of the operation) and a display feature or object in an image (an output of the operation). An operation "produces" a display feature or object in an image when the operation begins without the data defining the display feature or object in the image and performing the operation results in the data defining the display feature or object in the image. When the operation uses items of data as input to produce data defining a display feature or object in an image, the display feature or object is "produced from" those input data items. An operation "modifies" an item of data that has one of a number of values when it changes the data item to a data item that has a different value.

One way of categorizing an operation is to distinguish it by the type of data the operation uses as input. An operation such as an image processing operation uses image definition data defining an original image (for example image pixel data) to produce image definition data defining a "version" of the original image, that is, an image different from the original image. The magnification operation disclosed in U.S. Pat. No. 4,800,379, for example, maps pixel data defining a first image or portion thereof to pixel data defining a second, different image (the magnified image). An operation of this type is an "image-based operation." An image-based operation maps one or more image definition data items, such as pixels, to a display feature included in the image produced by the operation.

The method of the present invention is a "model-based operation." The distinction between image-based and model-based operations is important to the invention. A model-based operation uses "model data" as input to produce image definition data defining an image as output. A data item other than image definition data, for example, a data item other than an image pixel data item, is an "information model data item" or "model data". A model-based operation maps one or more model data items in a model data structure to a display feature included in the image produced by the operation.

A combination of interrelated model data items is referred to herein as an "information model data structure", a "model data structure", or a "first image model data structure." For purposes of describing the invention herein, all model data items an operation uses to produce an image are considered to be included as part of the model data structure. Moreover, the model data structure is not limited to a combination of data items physically located in a substantially contiguous part of a system's memory, but may include individual model data items diversely located in memory and accessible by the processor when it performs the operation. In addition, the interaction between the model data and the operation, and the nature, quantity and source of the data considered to be part of the model data structure, vary according to the functional capability of the model-based operation, which may itself vary considerably.

2. The First Image Model Data Structure

Figure 41:
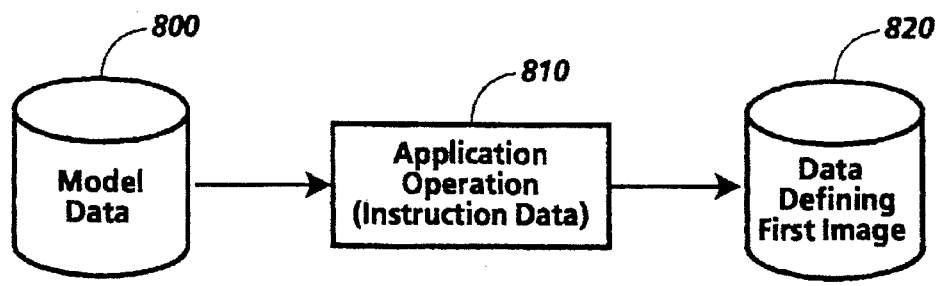
FIGS. 41, 42, and 43 illustrate examples of sources of the model data in the first image model data structure from which the first image may be produced, and on which the method of the present invention operates.
Figure 42:
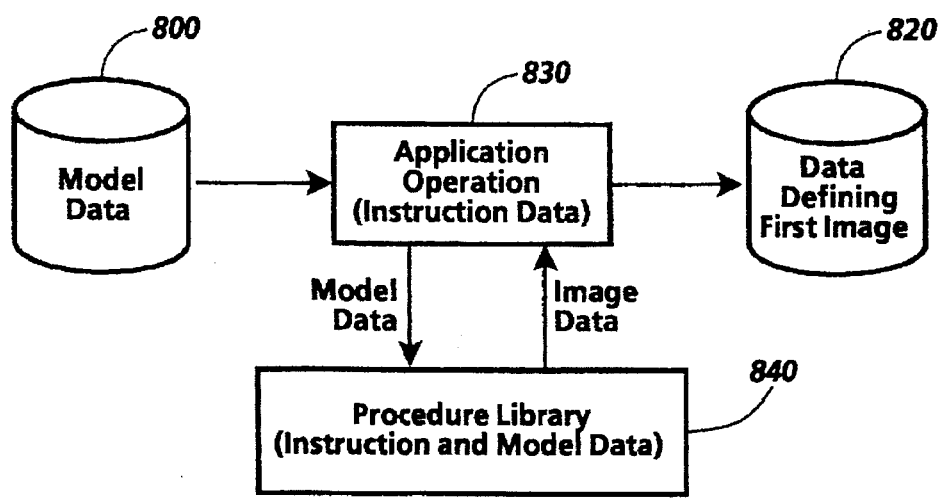
Figure 43:
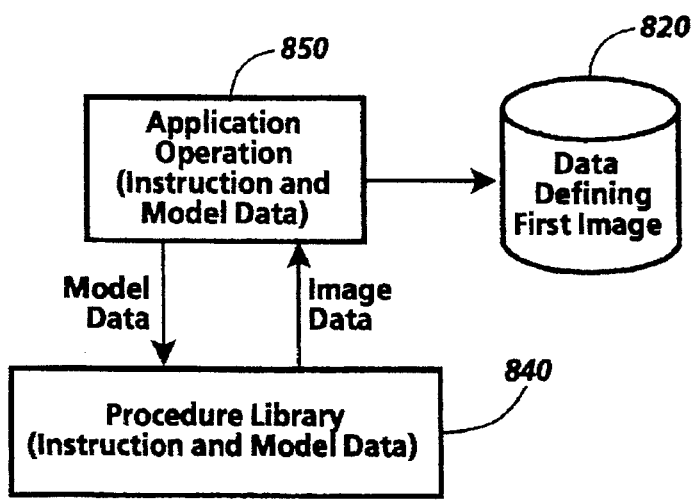

The method of the present invention "operates on" an existing first image when it uses the model data structure from which the first image was produced to produce image definition data defining a second image. The model-based operation that produced the first image will be referred to as an "application". FIGS. 41, 42, and 43 illustrate various known examples of the source of the model data used by the application, its interaction with the application, and the variability of the functionality of the application which produces what is referred to below as the first image. Variations of the examples illustrated in FIGS. 41, 42, and 43 as they relate to the source of the model data and its interaction with the application are also possible, and are intended to be encompassed in the discussion of the illustrated embodiments of the present invention.

Figure 44:
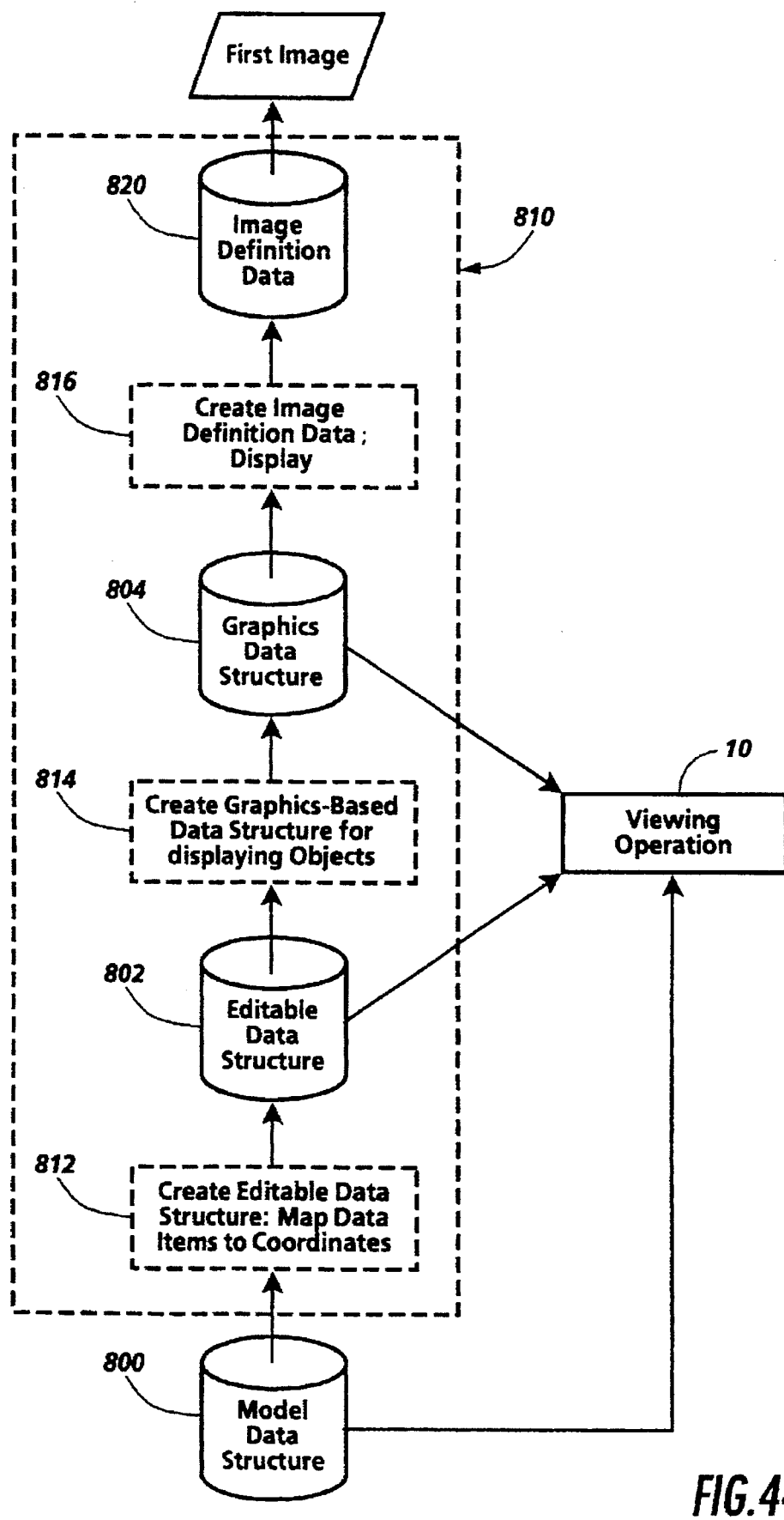
FIG. 44 illustrates types of model data structures on which the method of the present invention may operate.

In FIG. 41, model data 800 contains data items including sufficient information to permit the application 810 to entirely produce image data 820 defining the image. So, for example, if the image defined by image definition data structure 820 includes a display object perceived as a solid black line, the solid black line represents one or more data items in model data 800 indicating the existence, position, and orientation of the line in the image, and having values of the "blackness" and "solidness" of the line. Thus, according to the terminology defined herein above, all of those model data items in model data 800 used to produce the solid black line are part of the "model data structure" as that term is intended to be used herein, and the solid black line can be said to represent those model data items. A page description data file, described in more detail in the discussion below accompanying FIG. 44, is an example of model data 800 in FIG. 41.

Or, as shown in FIG. 42, application 830 may make use of components of instruction data that perform the common and basic functions used to produce an image. These components, commonly called procedures or subroutines, may be stored in a separate memory location called a procedure library 840. The procedures themselves may include model data items. So, for example, for the same image defined by image definition data structure 820 that includes the solid black line, the solid black line represents one or more data items in model data 800 indicating the existence of the line in the image, and also represents one or more data items in procedure library 840 indicating the position and orientation of the line in the image, and having values of the "blackness" and "solidness" of the line. Thus, the display object of the solid black line can be mapped to data items in model data 800 and in procedure library 840. According to the terminology defined herein above, all of those model data items in model data 800 and in procedure library 840 used to produce the solid black line are part of the "model data structure", and the solid black line can be said to represent those model data items.

Finally, as shown in FIG. 43, application 850 may make use of procedures in procedure library 840, and may also include model data items within its own set of instruction data, such as parameter values, lists, tables and arrays, that are used to produce image definition data structure 820. For the same image defined by image definition data structure 820 that includes the solid black line, the solid black line represents one or more data items in application 850 indicating, for example, the existence of the line in the image and having values of the "blackness" and "solidness" of the line, and also represents one or more data items in procedure library 840 indicating the position and orientation of the line in the image. Again, all of those model data items used to produce the solid black line are part of the model data structure, and the solid black line represents those model data items.

For ease of reference in the remainder of the specification, a reference to the first image model data structure, which the application uses to produce the first image and on which the method of the present invention operates, is intended to include all of the model data items used to produce the first image in any of the configurations illustrated in FIGS. 41, 42, and 43.

Any one of the applications 810, 830, and 850 illustrated in FIGS. 41, 42, and 43, respectively, may create intermediate model data structures while executing instructions for operating on model data before creating the image definition data 820 defining the image. These intermediate model data structures may be stored in the memory of the machine after the application is complete, and therefore may be accessible to the method of the present invention, or they may be accessible during the application's execution. It is intended that the method of the present invention operate on any of these intermediate model data structures from which the image may be ultimately produced.

Examples of such intermediate model data structures are illustrated in FIG. 44, in which application 810 is a representative graphical object editing application. Application 810 is composed of processes 812, 814, and 816; processes 812 and 814 produce intermediate data structures 802 and 804. For example, intermediate data structure 804 may be a display list of objects in a graphical image, or it may be a page description file containing instructions in a high-level page description language (PDL), also called a graphics language, describing the device independent appearance of text, graphical shapes, and sampled images on printed pages. Process 816 is then a display list processor or PDL interpreter producing image definition data 820 from which image 180 is directly produced. Method 10 of the present invention, designated as a "viewing operation" in FIG. 44, may operate on any of data structures 800, 802, or 804.

Additionally, the model data structure may also include other data items that are not directly used by the application to produce the image but which may be known to and accessible by the application or another model-based operation. In addition, the model data structure may include a data item which, while used to produce the image, also indicates one or more other data items which are not used to produce the image and which are not included in the model data structure. For example, a data item in the model data structure represented by a display object in the image may also indicate a second model data item having characteristic or detail information about the display object that is not represented in the image. This second model data item may be included in the model data structure, or may be included in a different data structure linked to the model data structure. For example, in a model data structure that an application uses to produce a spreadsheet image, a data item having a value indicating a numerical entry in one of the columns may also indicate another data item containing the values indicating the individual numbers totaling the numerical entry in the spreadsheet, or the equation used by the spreadsheet cell to compute its numerical value.

3. The machine environment

Figure 45:
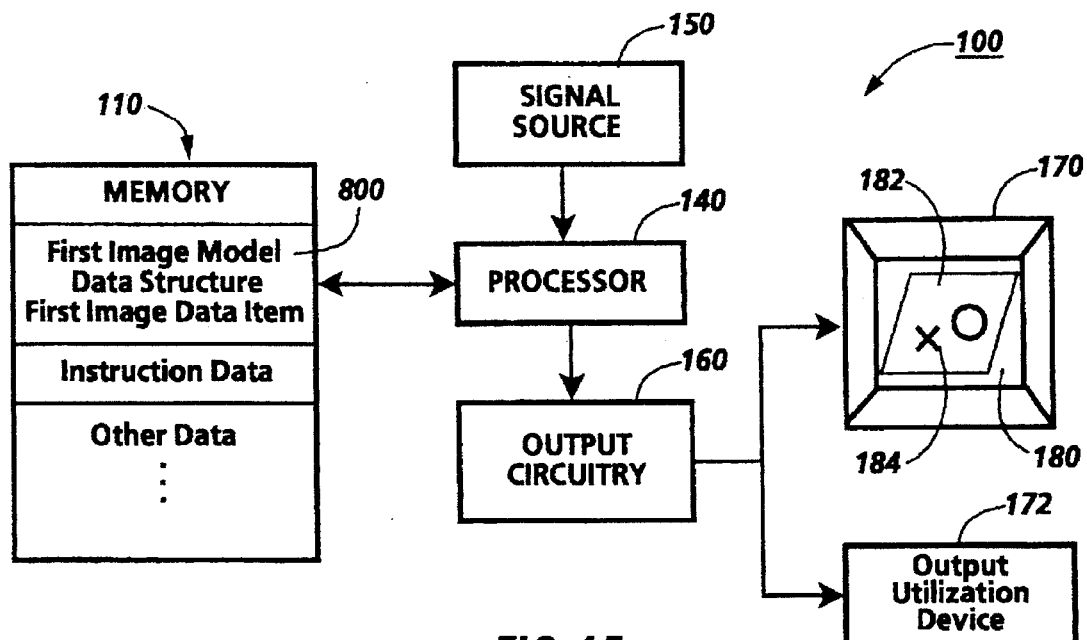
FIGS. 45 and 46 illustrate representative processor controlled machines which the method of the present invention may operate.
Figure 46:
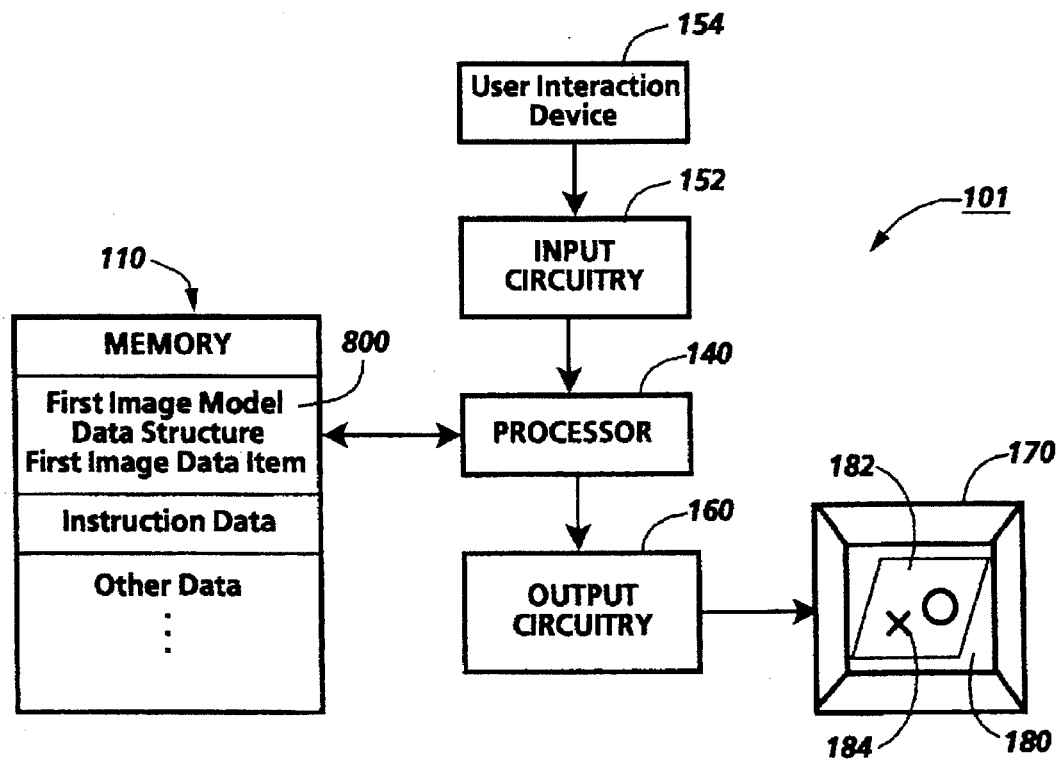

The method of the present invention operates a variety of processor-controlled machines, each of which has the common components, characteristics, and configuration illustrated in FIGS. 45 or 46. Machine 100 in FIG. 45 includes a signal source 150 for producing signals indicating image display requests. Signal source 150 may include any signal producing source that produces signals of the type needed by the method of the present invention. Such sources include a variety of input devices controllable by a human user that produce signals generated by the user, and may also include other devices connected to machine 100 for providing such signals, including devices connected by wired or wireless communications facilities, such as through remote or local communications networks and infrared and radio connections. Signal source 150 may also include operations performed by machine 100, such as the operating system of a digital computer, or other applications performed by the digital computer. The method of the present invention may be implemented in a manner to receive signals indicating a display request from any of these signal sources. Processor 140 is connected for receiving the signals from signal source 150.

Machine 100 also includes memory 110 for storing data. Processor 140 is connected for accessing the data stored in memory 110, and for providing data for storing in memory 110. FIG. 44 illustrates examples of the kind of data stored in memory 110. Memory 110 stores instruction data indicating instructions the processor executes, including the instruction data indicating the instructions for operating machine 100 according to the method of of the present invention. The method of the present invention operates machine 100 when display 170 has a first image 182 displayed in display area 180. The first image is produced from a first image model data structure which is also stored in memory 110. The first image 182 shows a first display feature 184.

Processor 140 is also connected for providing data defining the first image 182 to output circuitry 160 for presentation on display device 170 in display area 180. As used herein, with respect to all circuitry components, any two components of circuitry are "connected" when there is a combination of circuitry that can transfer data from one of the components to the other. Processor 140 is further connected for providing data defining human perceptible output, produced according to the method of the present invention, to output circuitry 160 for presentation on an output utilization device 172.

Machine 101 in FIG. 46 illustrates an alternative type of machine that the method of the present invention may operate. In this implementation of the method, machine 101 does not require an additional output utilization device, since this implementation provides signal data defining human perceptible output in image (visual) form to display device 170.

In addition, machine 101 includes input circuitry 152 for providing signals based on actions of a machine user. Input circuitry 152 is connected to receive signals from one or more input devices that provide signals based on actions of the machine user indicating operation of the input device. Signals from user input circuitry may include a "request" for an operation and information identifying the requested operation, wherein the signal or signals indicate one or more actions by a machine user intended to cause performance of the operation. An operation is performed by the machine "in response" to a request when the signals received are for indicating a valid request for a valid operation and for causing the operation to be performed. Signals indicating a single complete request may include a combination of any number of actions indicated by the user necessary for indicating a valid request for a valid operation and for causing the operation to be performed.

Input device 154, connected to input circuitry 152, may include, for example, a keyboard or a pointing device, used by the machine user to indicate actions. Suitable pointing devices include, but are not limited to, a mouse, a stylus or pen, and a trackball. The pointing device has circuitry (not shown) for controlling the interaction between the machine user and display features and objects presented on display device 170. For example, the pointing device may have buttons (not shown) which when clicked or released result in signals being sent through input circuitry 152. In addition, input device 154 may be a pen-like or stylus device that can be moved over the display surface display area 180. In the case of a pen-like or stylus device, there may be a pressure sensitive tip switch (not shown) which results in signals being sent through input circuitry 152 when the user presses the tip switch against display area 180, such as, for example, when the system user uses the stylus to make gestures in display area 180. Alternatively, input device 154 may be a touch sensitive surface of display device 170, for example corresponding with display area 180, such that input circuitry 152 is included within display device 170. Signals indicating user actions may include signals indicating the selection or movement of a display object visible to the user in display area 180, signals indicating requests that result in operations being performed by processor 140, and signals that result in processor 140 providing data defining an image to output circuitry 160 for display in display area 180.

The actual manner in which the physical hardware components of both machines 100 and 101 are connected may vary, and may include hardwired physical connections between some or all of the components, connections over wired or wireless communications facilities, such as through remote or local communications networks and infrared and radio connections. For example, memory 110 may include memory that is physically connected to processor 140 as local memory, or that is remotely accessible to processor 140 by means of a wired or wireless communications facility. Thus, when it is described below that the method causes processor 140 to access a particular data item, that data item may be stored in a memory device that is remotely located from machine 100 but which is accessible to processor 140 by means of the appropriate connections. It is further of importance to note that the range of the physical size of either machine 100 or 101 may vary considerably from a machine that includes a very large display device 170 suitable, for example, for electronic whiteboard applications, to a machine that includes much smaller desktop, laptop, and pocket-sized or smaller display devices. It is intended that the method of operating a machine according to the present invention be operable on all display machines in this physical size range.

B. Description of the Method of the Present Invention

1. Presenting human-perceptible output about the first image model data structure using the output producing region The method of operating a processor-controlled machine, such as machine 100 or 101 illustrated in FIGS. 45 and 46, according to the present invention is illustrated in FIG. 1. As already noted, the display area 180 of display device 170 has a first image 182 displayed in a present image position of the display area; first image 182 includes a first display feature 184. First display feature 184 represents a first image data item included in the first image model data structure 800 (FIG. 41) from which the first image was produced. First image model data structure 800 is stored in memory 110.

The method 10 comprises operating processor 140 to receive request signal data from the signal source, in box 12, indicating a display request to provide output producing region image data to the output circuitry connected to a display so that the display presents, in response to the output producing region image data, an output producing region image showing an output producing region displayed in a present viewing position in display area 180 coextensive with the present image position of a first image segment of first image 182. The first image segment includes first display feature 184. Then, in box 14, processor 140 responds to the request signal data indicating the display request by producing output signal data defining human perceptible output using the first image data item from the first image model data structure, and by providing the output signal data defining the human perceptible output to output circuitry 160 connected to output utilization device 172 so that output utilization device 172 presents the human perceptible output in response to the output signal data, at the same time as first image 182 is being displayed in the display area. In this manner, method 10 presents the human perceptible output produced using the first image data item in the first image model data structure in response to the display request from the signal source, thereby giving the perception to a machine user of providing access to information related to the first display feature in the first image segment.

Figure 2:
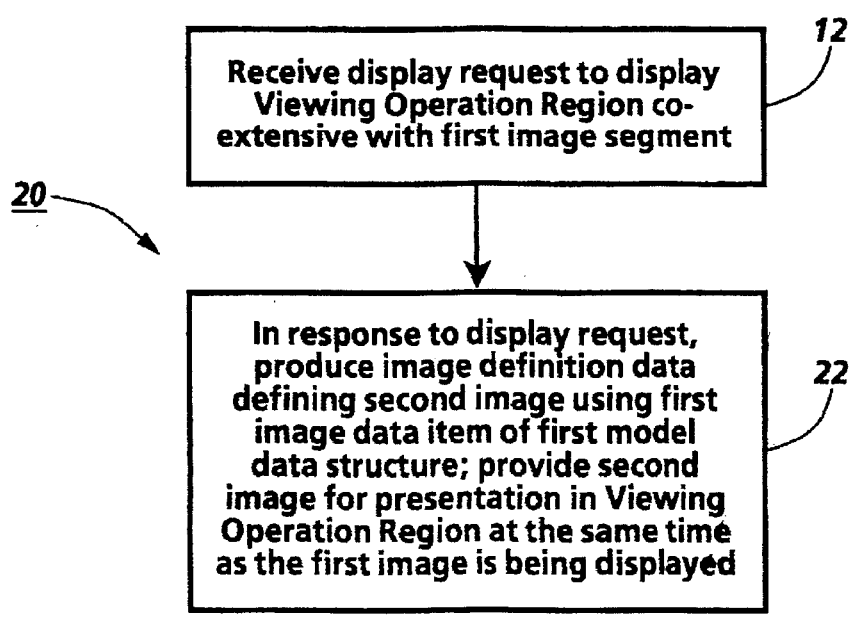
FIG. 2 is a flow chart illustrating the acts of the method of operating a machine according to the present invention which produces image definition data defining a second image for display in a viewing operation region.

2. Presenting a second image showing information about the first image model data structure using the output producing region In the case of providing visual access to the data and information in the first image model data structure from which the first image is produced, the method of the present invention produces image definition data defining a second image. This implementation of method 10 is illustrated in FIG. 2 in boxes 12 and 22, and identified as method 20. In the case of image output, the output producing region will hereafter be referred to as the "viewing operation region". After receiving request signal data from the signal source, in box 12, indicating the display request to display the viewing operation region in a position in the display area coextensive with the position of the first image segment, the processor 140 produces image definition data defining the second image using the first image model data structure and provides the second image to the display, in box 22. The second image has size and shape dimensions substantially identical to size and shape dimensions of the viewing operation region. The second image is presented in the viewing operation region substantially at the same time as the first image is being displayed in the display area. Since the viewing operation region is located in a position in the display area coextensive with the position of the first image segment, presentation of the second image in the viewing operation region replaces the first image segment in the display area.

Figure 4A:
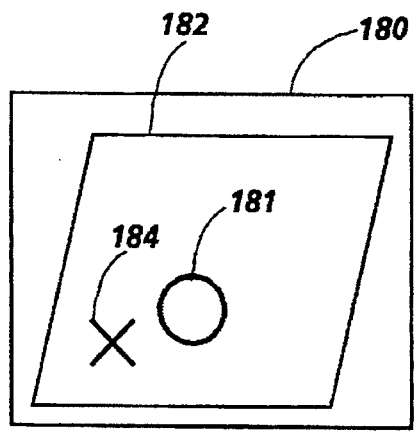
FIGS. 4A and 4B illustrate a sequence of display screens showing the first image and the second image produced according to the method illustrated in FIG. 3.

3. Operating on a model data structure having a global parameter to present a second image having a modified first display feature In one implementation of method 20, the presentation of the second image includes a modified first display feature displayed in the viewing operation region. With respect to this implementation, the first image data item in first image model data structure 800 is referred to as a "display feature attribute data item". The first display feature included in the first image segment is represented by the present attribute value of the display feature attribute data item. For example, as illustrated in FIG. 4A, first image 182 in display area 180 includes figures "x" and "o" in black, solid (or unbroken) lines, the figure "x" labeled as first display feature 184, and the figure "o" labeled as display feature 181. The display feature attribute data item included in first image model data structure 800 has a present attribute value of "solid" giving both figures their solid outlines.

Figure 3:
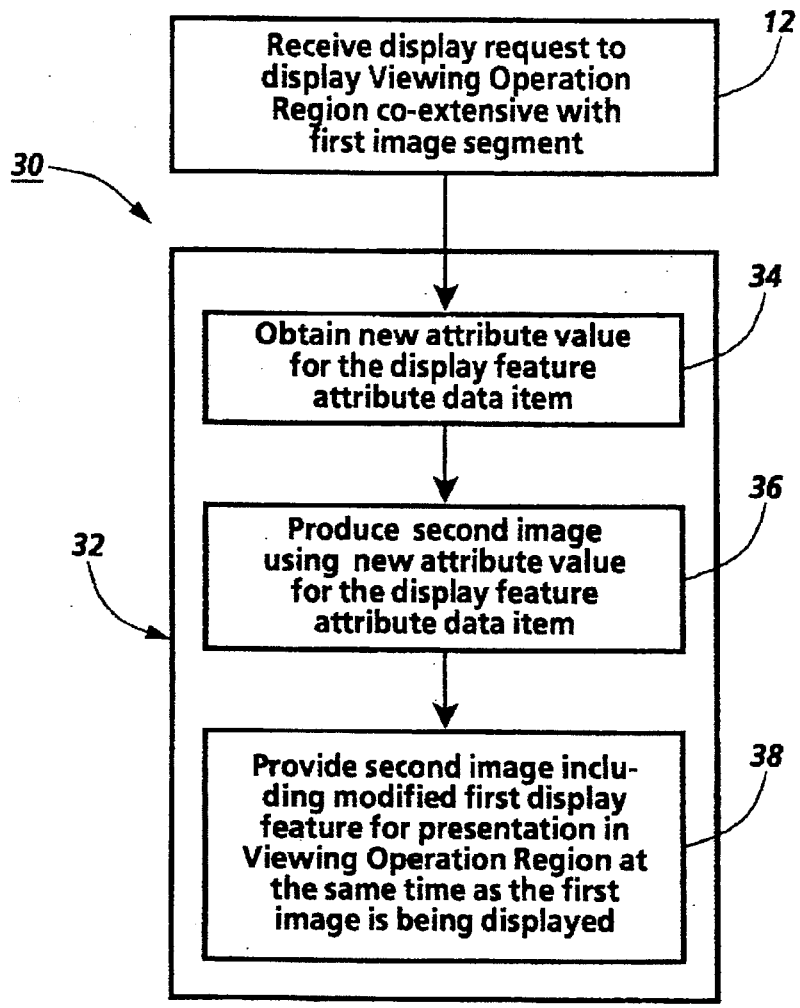
FIG. 3 is a flow chart illustrating the acts of the method of operating a machine according to the present invention which produces image definition data defining a second image including a modified first display feature.
Figure 4B:
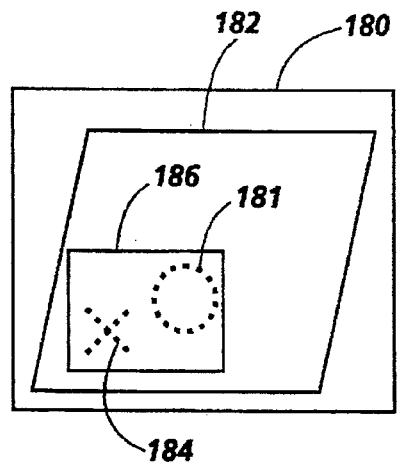

With reference to FIGS. 3, 4A and 4B, this implementation of the method of the present invention is designated as method 30. The act in box 12 receives a request to display the viewing operation region in a present viewing position in display area 180 coextensive with the present image position of a first image segment of first image 182. The first image segment includes first display feature 184 and display feature 181. In response to the display request to display the viewing operation region, component acts 34, 36 and 38 are performed, in box 32. Acts 36 and 38 are similar to those performed by box 22 in method 20 (FIG. 2). Method 30 further includes the act of obtaining a new attribute value for the display feature attribute data item, in box 34. The new attribute value indicates a modified first display feature. Then, in box 36, the image definition data defining the second image is produced using the new attribute value for the display feature attribute data item so that the second image includes the modified first display feature. As in method 20, method 30 produces a second image having size and shape dimensions substantially identical to the size and shape dimension of the viewing operation region. The result of method 30, illustrated in FIG. 4B, shows the presentation of the second image including the modified first display feature in the viewing operation region 186, in response to the display request from the signal source for display of viewing operation region 186. The second image displayed in viewing operation region 186 replaces the first image segment in the display area. FIG. 4B illustrates the result of method 30 when method 30 produces a second image which shows, in place of the solid outlined figures "x" and "o" originally in the first image segment, figures "x" and "o" each having the new attribute value indicating a "broken" line.

Method 30 operates on a first image model data structure in which a display feature attribute data item functions as a global or common parameter affecting the perception of all, or a common group of, display features in the first image. Modification of the global or common parameter may result in modifying a feature already displayed (e.g., when a parameter value is changed to another value); adding a feature not previously displayed (e.g., when a parameter is turned "on"), or removing a feature previously displayed (e.g., when a parameter is turned "off"). For example, in a text image, if the typeface of all text in the image is determined by the value of a common display feature attribute data item or items, a particular typeface could be changed to a different typeface for all text within the boundary of the viewing operation region by method 30.

Figure 5A:
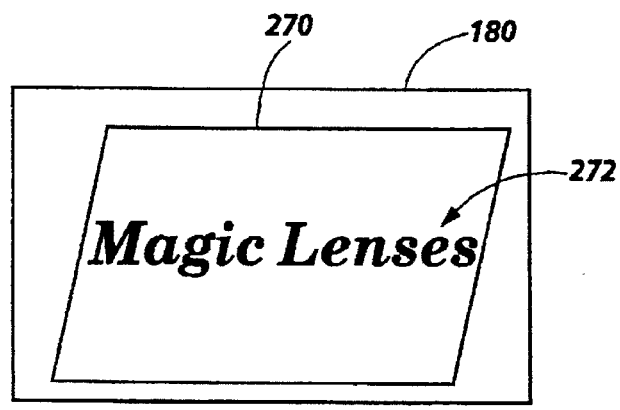
FIG. 5A illustrates a display screen showing an example of a first image rendered by a rendering application from a scene description model data structure having a global parameter for controlling the appearance of a plurality of display features in the rendered image.
Figure 5B:
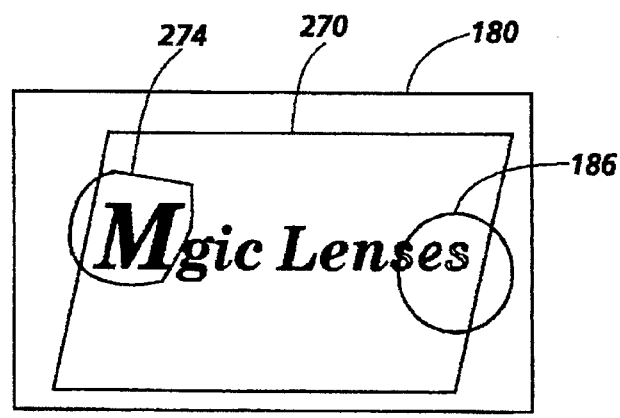
FIG. 5B illustrates a display screen showing the first image of FIG. PG and a second image produced according to the method of the present invention shown in the flow chart of FIG. 3.

FIGS. 5A and 5B illustrate another example of method 30. A rendered text image 272 in window 270 of FIG. 5A has been rendered from a scene description model data structure by a rendering operation stored in the memory of the processor-controlled machine. The scene description includes model data items that describe the components, and their spatial connection and orientation, that make up image 272. The rendering operation also uses data items that function as global parameters for determining certain rendering styles or formats. These single global parameters produce perceived display features throughout image 272. For example, there is a data item which controls the size of the text characters in the image; there is also a data item which controls whether the text characters are to appear in their solid, filled-in form, or in their outline, or "wire-frame" form.

When method 30, in response to the display request to display viewing operation region 186 coextensively with a portion or segment of image 272, produces a second image showing the wire-frame view of an image, method 30 obtains the predetermined new attribute value of "wire-frame", and replaces the present attribute value of "shaded" or "solid" with the new attribute value for the display feature attribute data item controlling the solid-versus-wire-frame view of the image. Method 30 then re-renders image 270 using the rendering application, the scene description model data structure including the model data items that describe the components that make up the text in image 272, and size and shape information about viewing operation region 186 to produce a second image having the size and shape dimensions of viewing operation region 186; the second image shows the wire-frame view of that portion of image 270 corresponding to the first image segment defined by the present viewing position of viewing operation region 186. FIG. 5B illustrates this result, with the second image in viewing operation region 186 showing the outline form of the text characters, and no longer showing them in their filled in, solid form.

Similarly, viewing operation region 274 may be positioned coextensively with another portion or segment of image 272, for producing a second image showing the text within the boundary of viewing operation region 274 scaled larger. In this case, method 30 obtains the predetermined new attribute value indicating the new scaling size for the text, and replaces the present attribute value indicating the current scaling size with the new attribute value for the display feature attribute data item controlling the size of the text in the image. Method 30 then re-renders image 270 using the rendering application, the scene description model data structure including the model data items that describe the components that make up the text in image 272, and size and shape information about viewing operation region 274 to produce a second image having the size and shape dimensions of viewing operation region 274; the second image shows the text scaled larger in that portion of image 270 corresponding to the first image segment defined by the present viewing position of viewing operation region 274.

Each different type of second image view desired from a first image requires a specific set of operations to be performed on the model data structure. A set of operations performed on the model data structure hereafter may be referred to as a "viewing operation". Each distinctive viewing operation may be "associated" with its own viewing operation region so that the display of the specific viewing operation region coextensively with the first image segment will cause the processor 140 to produce the second image using the model data structure according to the associated set of operations and present the second image in the viewing operation region.

4. Operating on a model data structure having objects a. Object-based model data structures A model data structure from which an image can be produced may be composed of a collection of data items describing "objects". An "object" represents a semantic aspect of an application domain (e.g., letters, words, and paragraphs in a word processor; strokes in a drawing system; temporal events and dependencies in a project management system; etc.). Typically, an "object description data item" in the data structure is itself composed of other data items that describe a set of properties of the object. For a particular object, the properties may represent positional and visual attributes of the object that determine how the object will be perceived when displayed, in addition to application-specific attributes used by the application that produced the image. Typically also, each object, along with its properties, is uniquely addressable by a pointer or identifier, and thus objects can refer to each other in their descriptions. Objects or their properties may also describe relations or constraints between other objects. The term "display feature attribute data item" when used in reference to a data item in an object-based model data structure will refer to an object property.

Because the model data structure is organized around object description data items, new objects can be added to the model data structure, to be presented for display at a particular spatial location when the image is produced; an object can be deleted from the model data structure, and therefore from the image produced; and an object can have any one of its properties changed by arbitrary computations. The image produced from such a model data structure may show an object overlapping spatially with another object. For model data structures operated on by an application which presents an editable image, an object can be moved to a new position in space, and the model data structure changed accordingly to have information correctly indicating the new position. Where an application provides for receiving input for performing editing operations, a user may manipulate objects in an image, and the user's input signals, converted to display position information, can be mapped to specific objects in the model data structure in order to allow the user to edit or otherwise manipulate the object-based model data structure.

In one type of object-based model, the object data item descriptions are organized in the model data structure as a simple list, since the objects themselves fully describe how they are to be spatially presented with respect to each other in an image. Such an object-based model data structure is rendered into either a graphics or procedural model data structure, such as the PostScript® page description language, or directly into an image definition data structure (such as a pixel array) in order to guide the display hardware and software to display the objects on the display. PostScript® is a trademark of Adobe Systems.

Other types of object-based models do not include data that fully describe how objects are to be spatially presented with respect to each other in an image, and an application that operates on such object-based models must include instructions for laying out the objects in an image. Typically, the application uses some form of object identification data in the model to determine where an object is to be positioned in the image, effectively linking the object to its position. The method of the present invention is intended to operate on models of this type as well. When explicit object position data in the model is not available to link a displayed object in an original image to an object data item in the model that produced the image, the method of the present invention only requires that object identification data linking the object to its position in the original image be available. Such information is typically available from the application.

Figure 6:
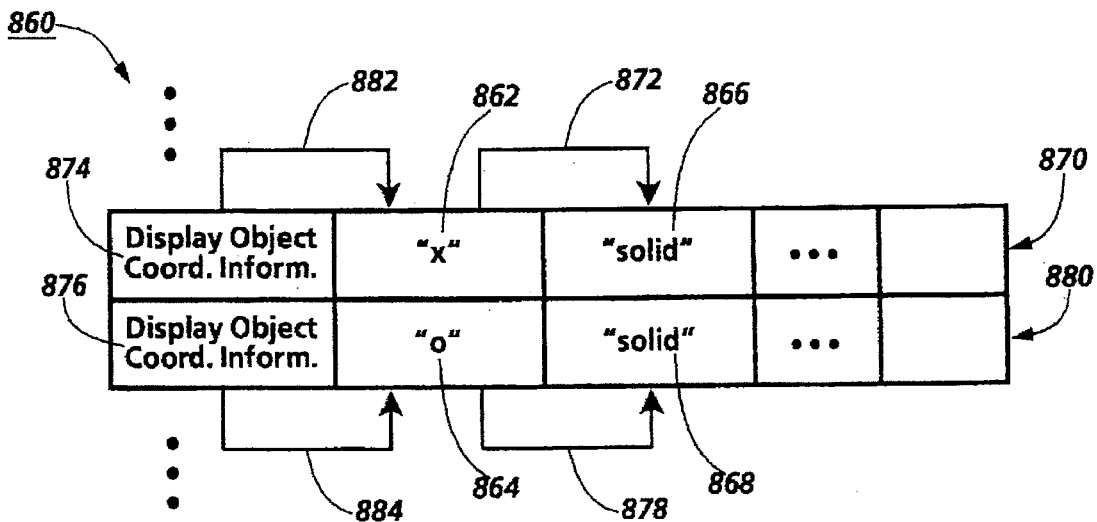
FIG. 6 illustrates the data structure organization of an object-based model data structure on which the method illustrated in FIGS. 6A, 7 and 10 may operate according to the present invention.
Figure 8:
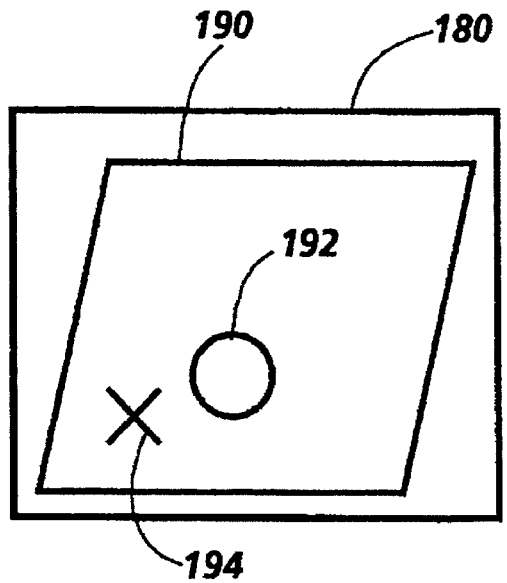
FIGS. 8 and 9 illustrate a sequence of display screens showing the first image and the second image produced according to the method illustrated in FIG. 7.

The method of the present invention which operates on object-based model data structures is illustrated using first image 190 of FIG. 8, which was produced from exemplary object-based first image model data structure 860 of FIG. 6. First image 190 includes a figure "x" in black, solid (or unbroken) lines, labeled as first display object 194. For more effective illustration of the method, first image 190 also includes a figure "o" in black, solid (or unbroken) lines, as a second display object 192. Each display object shows, and in the terminology defined earlier, includes the display feature of solid lines.

FIG. 6 illustrates an example of the data structure organization of an object-based model data structure of the type used by the method of the present invention. Each display object 194 and 192, figures "x" and "o" respectively, in first image 190 represents object description data items 870 and 880, respectively, in first image model data structure 860. Object data items 862 and 864 include information identifying display objects 194 and 192 as figures "x" and "o" respectively. Object data items 862 and 864 "indicate" display feature attribute data items 866 and 868 respectively, each having a present attribute value indicating the display feature when displayed in the display area; in the example used, each of display feature attribute data items 866 and 868 has the value of "solid" indicating the solid lines of figures "x" and "o". Connecting lines and arrows 872 and 878 illustrate the concept that object data items 862 and 864 indicate display feature attribute data items 866 and 868 respectively. The connection between the data items may be implemented using pointers or other linking mechanisms, or by defining the data structure of object description data items 870 and 880 in memory to the method, or in any other manner that accomplishes this connection. First image model data structure 860 also includes object coordinate data items 874 and 876 indicating display object coordinate information about a present object position of display objects 194 and 192 in first image 190. As shown by connecting lines and arrows 882 and 884, object coordinate data items 874 and 876 indicate object data items 862 and 864. Thus, if the position of display objects 194 and 192 in first image 190 can be determined, display feature attribute data items 866 and 868 can be obtained from first image model data structure 860.

b. Presenting a second image using an object-based first model

The method of the present invention may produce a wide variety of second images using an object-based model data structure of the type illustrated in FIG. 6. For example, method 50 described below and illustrated in FIG. 7, produces a second image showing a first display object having a modified first display feature using the object data item in the model data structure that is represented by the first display object in the first image. However, the second image produced using the object data item in the model data structure may also, for example, omit showing the first display object in the image, in effect deleting it from view in the second image. Or the second image may show the first display object replaced with a different output display object. The second image may also show a second display object added to or in addition to the first display object. Moreover, the method of the present invention may also use the object data item in the model data structure that is represented by the first display object to access a second model data structure from which it produces the second image, showing information in the second image from the second model data structure related to the first display object in the first image.

Figure 6A:
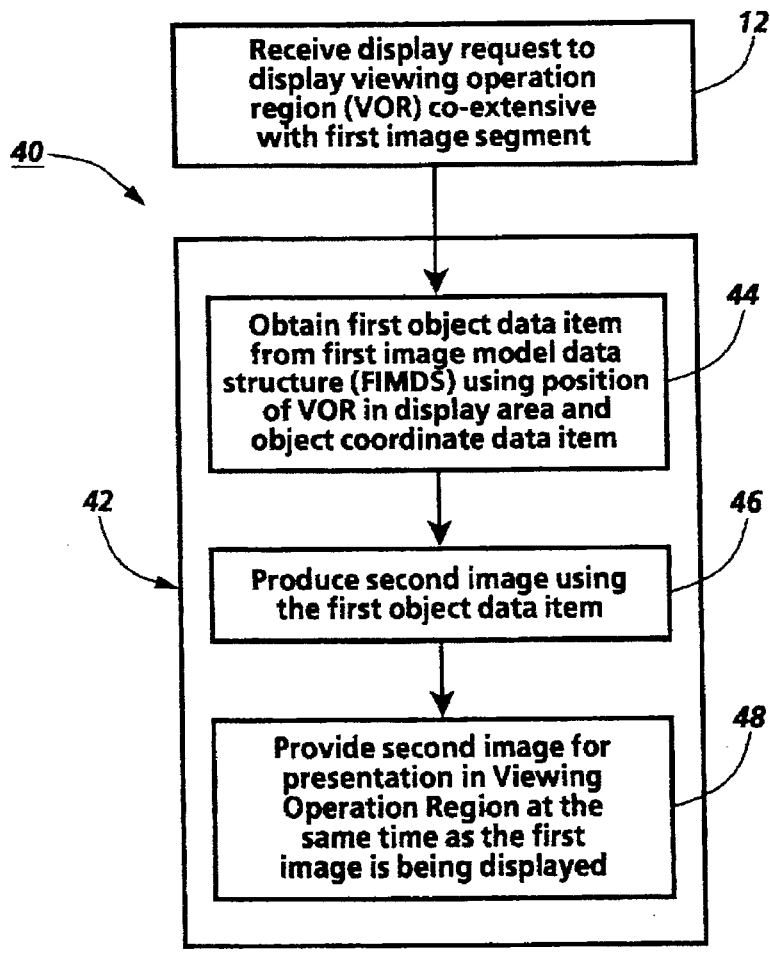
FIG. 6A is a flow chart illustrating the acts of the method of operating a machine according to the present invention which uses object data obtained from an object-based model data structure to produce image definition data defining a second image.

Method 40 of the present invention, operating on an object-based model data structure such as data structure 860 according to the acts illustrated in FIG. 6A, illustrates the very general acts needed to produce a wide variety of second images. The act in box 12 receives a request to display the viewing operation region in a present viewing position in the display area of the machine's display device coextensive with the present image position of a first image segment of a first image. The first image segment includes a first display object in a present object position in the first image segment and representing an object data item in the model data structure.

In response to the display request to display the viewing operation region, method 40 causes processor 140 to perform the component acts shown in box 42. The position of the viewing operation region, since it is coextensive with the position of the first image segment and the present object position of the first display object, determines the object data item from the first image model data structure that must be obtained to produce the second image according to the set of operations associated with the viewing operation region. In box 44, the present viewing position of the viewing operation region in the display area is used to determine the object coordinate data item for the object data item included in the first image segment. The object coordinate data item indicates the object data item in the object-based model data structure, and the object data item to be used to produce the second image is then obtained from the object coordinate data item.

Once the object data item has been obtained, it is used according to the manner necessary to produce the image definition data defining the desired second image, in box 46. As in methods 20 and 30, method 40 produces a second image having size and shape dimensions substantially identical to the size and shape dimension of the viewing operation region, and provides this second image to the display, in box 38, for presentation in the viewing operation region at the same time as the first image is being displayed.

c. Presenting a second image having a modified first display object

Figure 7:
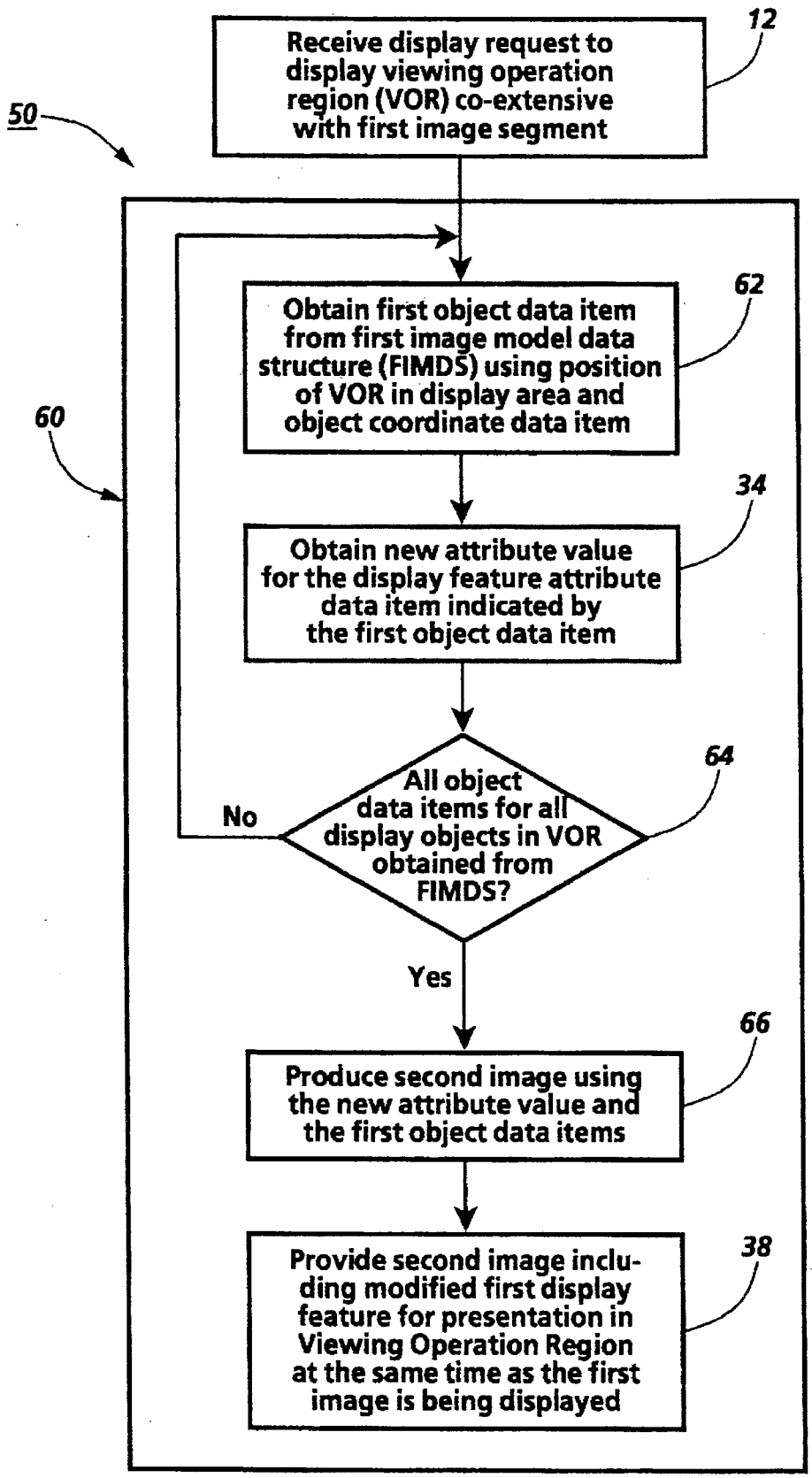
FIG. 7 is a flow chart illustrating the acts of the method of operating a machine according to the present invention which produces image definition data defining a second image including a first display object having a modified first display feature.

Method 50 of the present invention operates on object-based first image model data structure 860 according to the acts illustrated in FIG. 7. Method 50 illustrates a viewing operation that produces a second image including each display object included in the first image segment having an appearance modified from its appearance in the first image. A request to display the viewing operation region in a present viewing position in display area 180 coextensive with the present image position of a first image segment of first image 190 is received, in box 12. The first image segment includes display objects 194 and 192 as shown in FIG. 8.

In response to the display request to display the viewing operation region, method 50 causes processor 140 to perform the component acts shown in box 60. The position of the viewing operation region 186 (FIG. 9), since it is coextensive with the position of the first image segment, determines which display objects in the first image segment are to be included in the second image. Determining the display objects to be included in the second image in turn determines which object data items from the first image model data structure must be obtained to produce the second image according to the set of operations associated with the viewing operation region. In box 62, the present viewing position of the viewing operation region in the display area is used to determine the object coordinate data item 876 for display object 192 included in the first image segment. Object coordinate data item 876 indicates object data item 864, as shown by arrow 884, and so object data item 864 is then obtained from object coordinate data item 876, and display feature attribute data item 868 is obtained from object data item 864. The new attribute value for the display feature attribute data item of each object data item is then obtained, in box 34, in a manner similar to that described with respect to method 30. The new attribute value indicates a modified first display feature and replaces the value "solid" in display feature attribute data item 868 with the value "broken". In box 64, a test is made to see if all object data items represented by display objects in the first image segment have been obtained from the first image model data structure. The method returns to box 62 to complete processing for display object 194, in the same manner as just described for display object 192.

Figure 9:
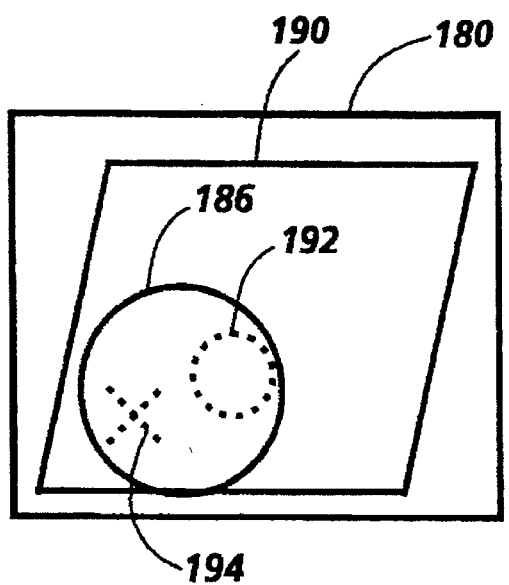

Once processing for all display objects is completed, the image definition data defining the second image is then produced in box 66, using the display object data items 862 and 864 and the new attribute value for the respective display feature attribute data items. As in methods 20 and 30, method 50 produces a second image having size and shape dimensions substantially identical to size and shape dimension of viewing operation region 186, and provides this image to the display, in box 38, for presentation in viewing operation region 186. FIG. 9 illustrates the result of method 50 when method 50 produces a second image which shows figures "x" and "o" each having the new attribute value indicating a "broken" line in place of the solid outlined figures "x" and "o" originally in the first image segment. While this result is perceptually similar to the result illustrated in FIG. 5, method 50 operates on the object data items in first image model data structure 860, while method 30 operates on a global parameter which controls the display of all solid lines in first image 190.

The method of the present invention supports display of a viewing operation region ("VOR") of various shapes and sizes. FIG. 4B illustrates a VOR in the shape of a rectangle, while FIG. 9 illustrates a circular VOR; with the exception of those drawings illustrating more than one VOR, reference numeral 186 will be used in the drawings to designate the viewing operation region throughout regardless of its shape.

d. Selecting objects from the model data structure

Figure 10:
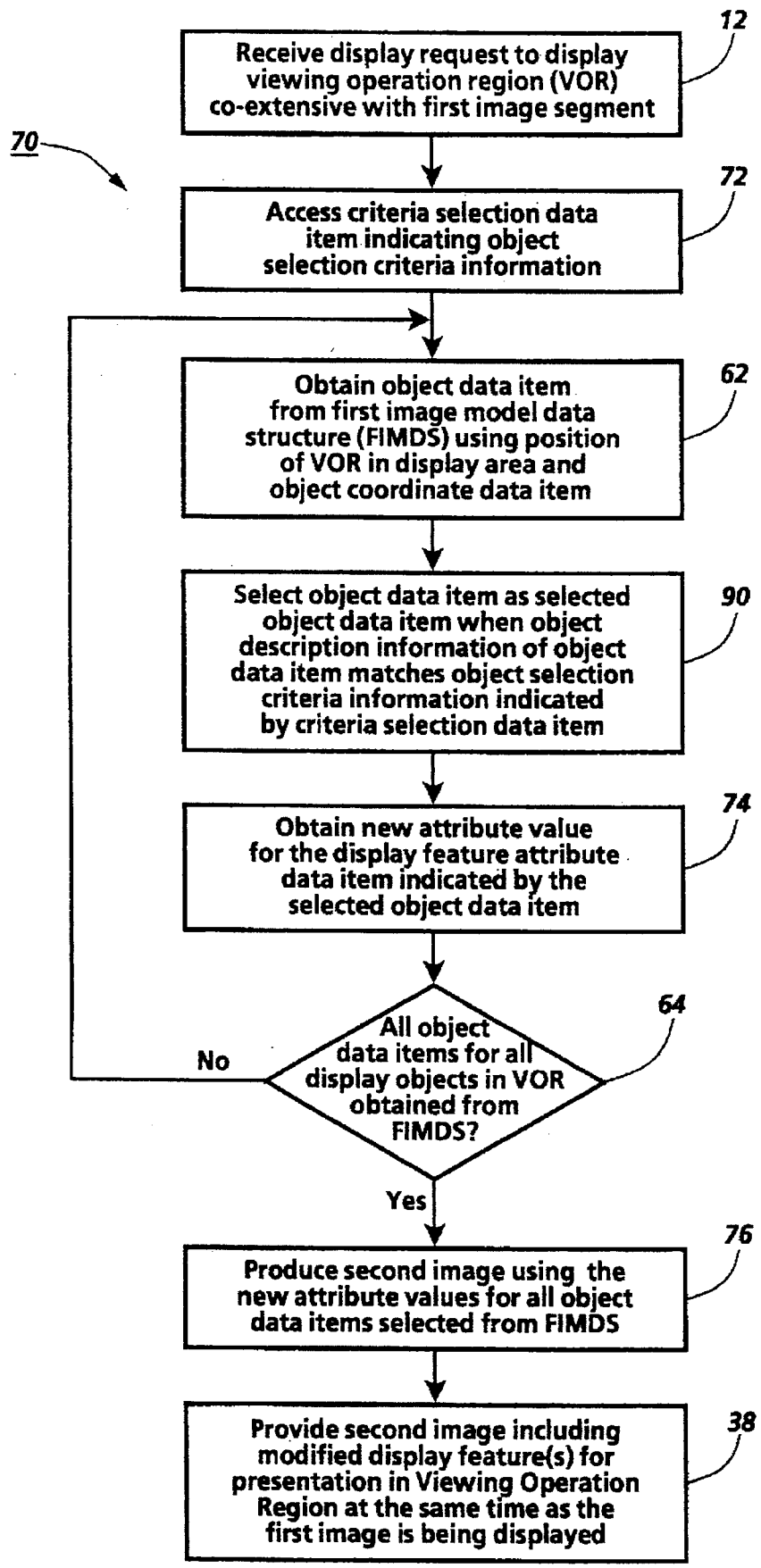
FIG. 10 is a flow chart illustrating the acts of the method of operating a machine according to the present invention which produces image definition data defining a second image including a selected first display object having a modified first display feature.
Figure 15:
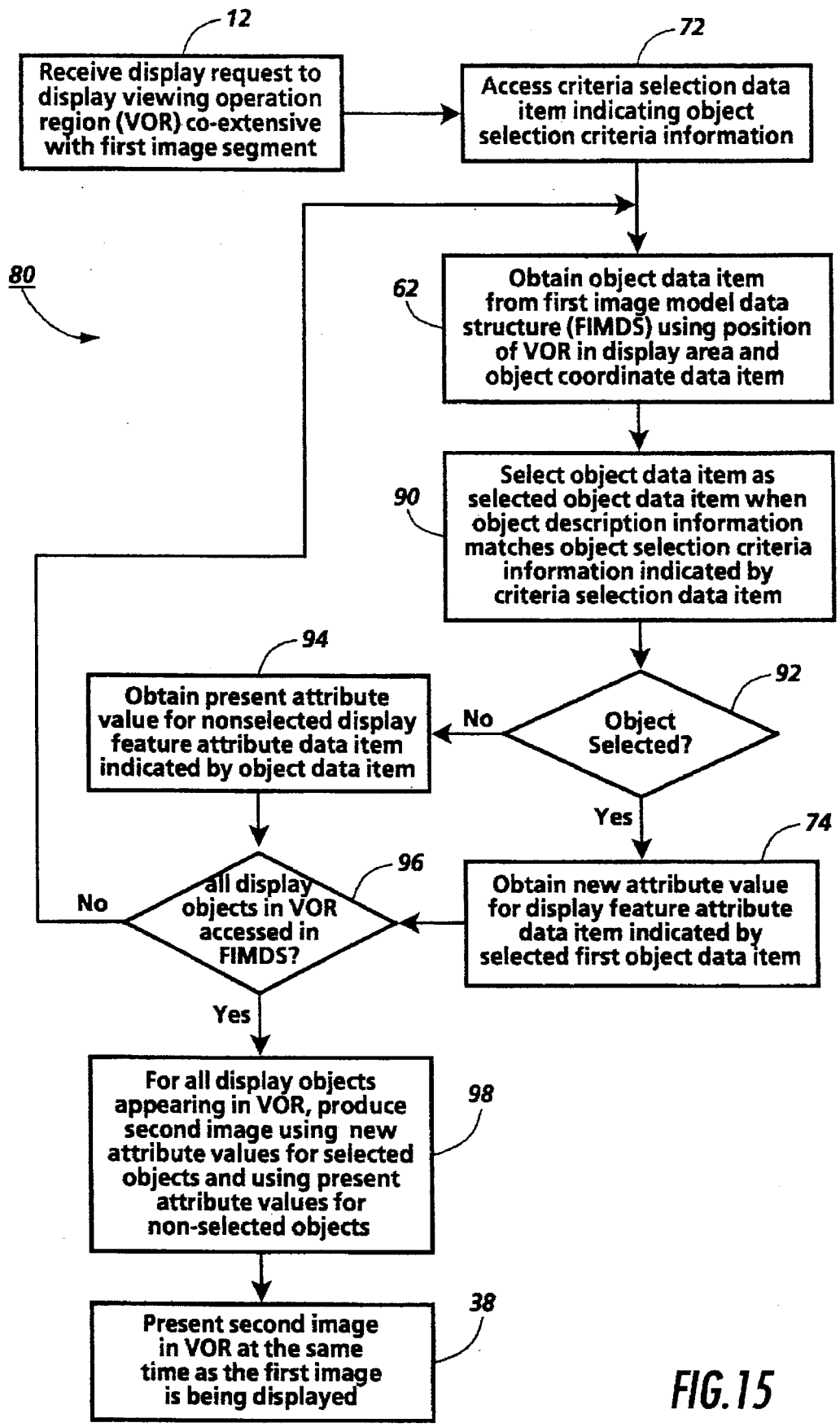
FIG. 15 is a flow chart illustrating a variation of the method of operating a machine illustrated in FIG. 10.

The method of the present invention may also be implemented so as to select certain objects from the first image segment for presentation in the second image having modified first display features. Two variations of this implementation, both of which operate on object-based model data structure 860 (FIG. 6), are illustrated in FIGS. 10 and 15, designated respectively as methods 70 and 80.

Figure 11:
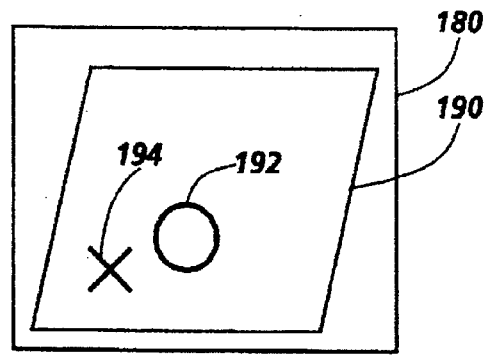
FIGS. 11 and 12 illustrate a sequence of display screens showing the first image and the second image produced according to the method illustrated in FIG. 10.
Figure 12:
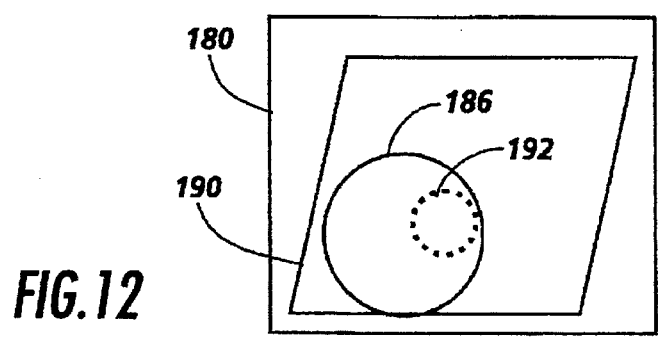

The results of method 70 are illustrated using first image 190 of FIGS. 11 and 12, which was produced from object-based first image model data structure 860 of FIG. 6; data items referenced in this discussion of methods 70 and 80 are illustrated in FIG. 6. In FIG. 11, first image 190 includes objects "o" and "x" in black, solid (or unbroken) lines, labeled as display objects 192 and 194, respectively. Each display object shows, and in the terminology defined earlier, includes the display feature of solid lines. Method 70 operates on first image 190 according to the acts illustrated in FIG. 10. The act in box 12 receives a request to display VOR 186 (FIG. 11) in a present viewing position in display area 180 coextensive with the present image position of the first image segment of first image 190 that includes display objects 192 and 194. As with method 50, the position of the viewing operation region 186, since it is coextensive with the position of the first image segment, determines which display objects in the first image segment are to be included in the second image, which in turn determines which object data items from the first image model data structure must be obtained to produce the second image according to the set of operations associated with the viewing operation region.

In the example illustrated in FIGS. 11 and 12, the viewing operation associated with VOR 186 causes only circular objects to be displayed in VOR 186, and causes the selected circular display objects to have broken lines. In response to the display request in box 12 to display VOR 186, method 70 causes processor 140 to access in box 72, a data item, hereafter called "a criteria selection data item," indicating object selection criteria information about the selection criteria for selecting an object from first image model data structure 860 for further processing by method 70. In box 62, the present viewing position of the viewing operation region in the display area is used to determine the object coordinate data items 874 and 876 for all of the display objects included in the first image segment. The object data items 862 and 864 are then obtained using each object coordinate data item 874 and 876.

In box 90, each object data item obtained in box 72 is selected for inclusion in the second image when the object description information of the object data item matches object selection criteria information indicated by the criteria selection data item. A comparison is made between the object description information and the object selection criteria information. For example, in data structure 860, object data items 862 and 864 contain information indicating that object data items 862 is represented by the figure "x" in first image 190, and object data items 864 is represented by the figure "o". In the example illustrated in FIGS. 11 and 12, the viewing operation associated with VOR 186 causes only circular objects to be displayed in VOR 186. Therefore the object selection criteria information describes "circular objects" so the object data item 864 is selected as a selected object data item.

The new attribute value for the display feature attribute data item of the selected object data item is then obtained, in box 74. The new attribute value indicates a modified first display feature, or, in the illustrated implementation, the broken line feature. The image definition data defining the second image is then produced in box 64, using the display object data item 864 and the new attribute value for the display feature attribute data item. As in the methods previously described, method 70 produces a second image having size and shape dimensions substantially identical to size and shape dimension of VOR 186, and provides this image to the display, in box 38, for presentation in VOR 186. FIG. 12 illustrates the result of method 70 when method 70 produces a second image which shows only figure "o" having the new attribute value indicating a "broken" line in place of the solid outlined figure "o" originally in the first image segment.

Figure 13:
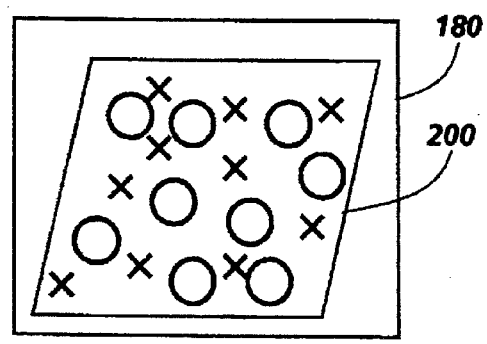
FIGS. 13 and 14 illustrate a sequence of display screens showing another first image and the second image produced according to the method illustrated in FIG. 10.
Figure 14:
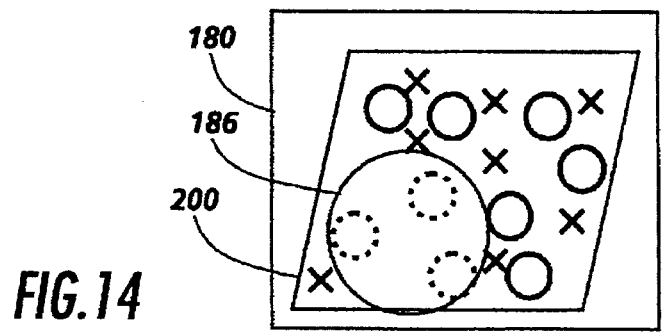

When operated in this manner, method 70 also operates as a delete or "filtering" operation, removing or filtering out display objects from the first image segment that do not meet the object selection criteria information. Thus, method 70 may be used to reduce the detail in a portion of the first image, as illustrated more effectively using detailed image 200 in FIGS. 13 and 14. FIG. 14 illustrates that several figure "x" display objects in the first image segment portion of first image 200 have been removed from the second image in VOR 186.

Figure 16:
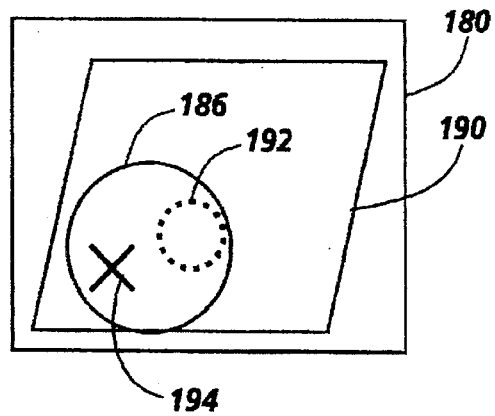
FIG. 16 illustrates a display screen showing the second image produced according to the method illustrated in FIG. 15 when a nonselected display object is shown having its original, unmodified display feature.

Many variations of object selection method 70 may be implemented. FIG. 15 illustrates the acts of one variation designated as method 80, the results of which are illustrated in FIG. 16. Method 80 provides for selecting objects from data structure 860 in the same manner as that of method 70, but it also provides for including in the second image objects not selected according to object selection criteria information; the objects not selected are shown having their original display feature unmodified. Boxes 92 thru 98 illustrate the additional acts performed by processor 140 in order to obtain the desired value for the display feature attribute data item for each display object in the first image segment, and for producing the second image showing modified display features for selected objects and unmodified display features for nonselected objects. FIG. 16 illustrates the result of method 80 when method 80 produces a second image which shows figure "o" having the new attribute value indicating a "broken" line, and figure "x" appearing in its unmodified form.

Figure 17:
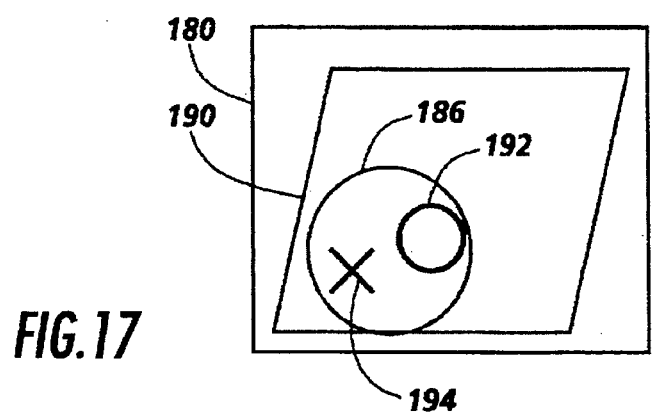
FIG. 17 illustrates a display screen showing the second image produced according to the method illustrated in FIG. 13 when no display object is selected.

When no objects are selected in data structure 860 by method 80 because no objects match the object selection criteria information, the present attribute values are used for the display feature attribute data items indicated by the object data items represented by the display objects in the first image segment, and the display objects therefore appear unmodified. FIG. 17 illustrates this result of method 80, and illustrates that method 80 produces a second image substantially identical to the first image segment and presents the second image in VOR 186. To a user of the machine operated by method 80, the VOR appears to be "transparent", simply revealing the first image unchanged. When method 80 produces a second image showing no changes in the display features of the display objects in the first image segment, this operation may be referred to as a "null" or "identity" operation or transform.

Figure 18:
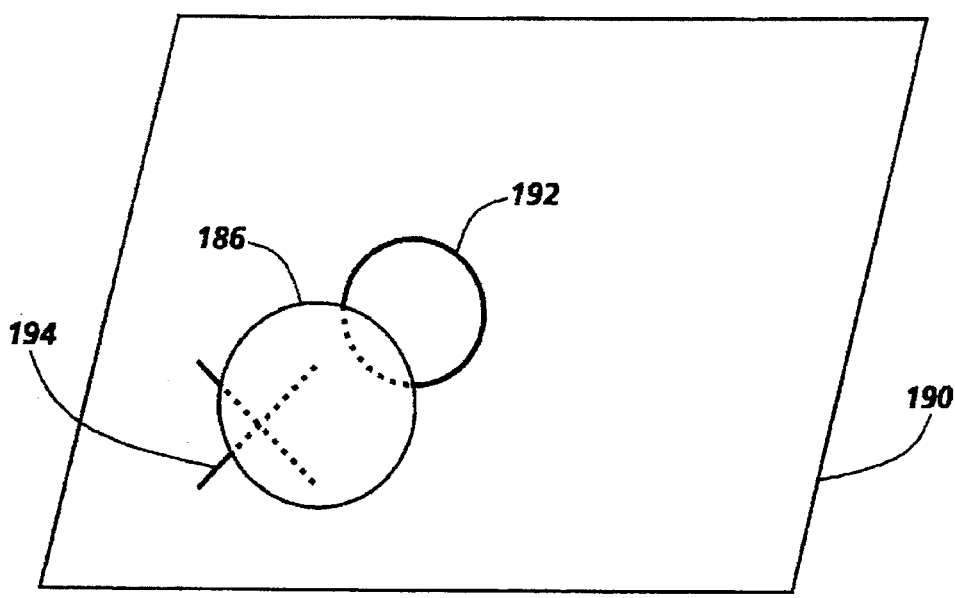
FIG. 18 illustrates first and second images showing display objects included in both images having unmodified display features in the first image and modified display features in the second image so that the second image appears in the spatial context of the first image.
Figure 19:
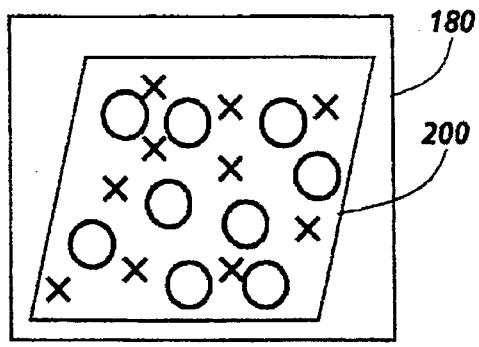
FIGS. 19 and 20 illustrate a sequence of display screens showing another first image and the second image appearing in the spatial context of the first image.
Figure 20:
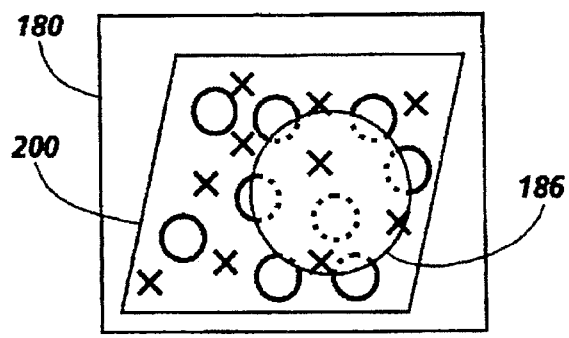

Since method 80 explicitly operates on all display objects included in the first image segment, a display object in the first image may have display positions in display area 180 that are coextensive with display positions that are both inside and outside the display positions of the boundary of VOR 186. FIG. 18 illustrates that the display positions of VOR 186 are coextensive with display positions of display objects 192 and 194 both inside and outside of VOR 186. Method 80 may also be implemented as shown in FIG. 18 so that the portion of the display object selected for modification that falls within the boundary of VOR 186 is shown having a modified display feature, while the remaining portion of the display object in the first image outside the boundary of VOR 186 is shown having an unmodified display feature. FIGS. 19 and 20 illustrate this same implementation variation using more detailed image 200. FIG. 20 illustrates how VOR 186 presents the second image in the spatial context of the first image. It can be seen that, for many images operated on in this manner by the method of the present invention, the viewing operation region appears to function metaphorically to a user as a kind of optical lens, or as kind of model data structure filter. The visual similarity provided by the context of the first image carried over into the second image across the viewing operation region boundary, coupled with the presentation in the VOR of the second image, showing the selected first display objects having modified display features give the appearance of an optical lens performing filtering operations on the information in the model data structure.

e. Highlighting information in the model data structure

Figure 21:
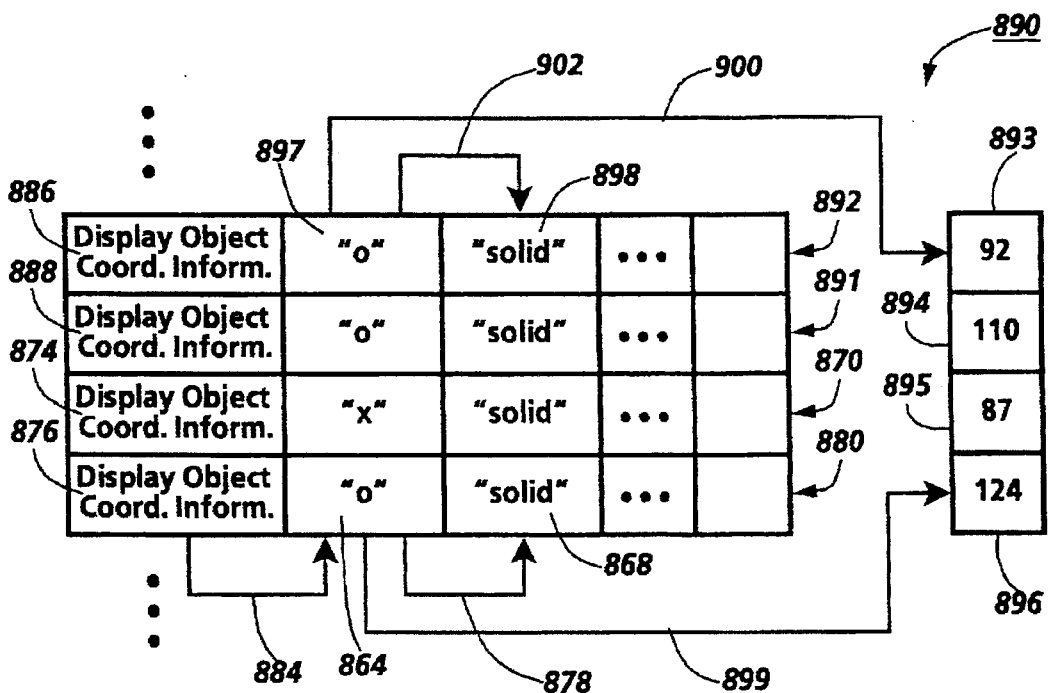
FIG. 21 illustrates an exemplary data organization of the object-based model data structure plus other related data on which the method illustrated in FIG. 25 may operate according to the present invention.
Figure 25:
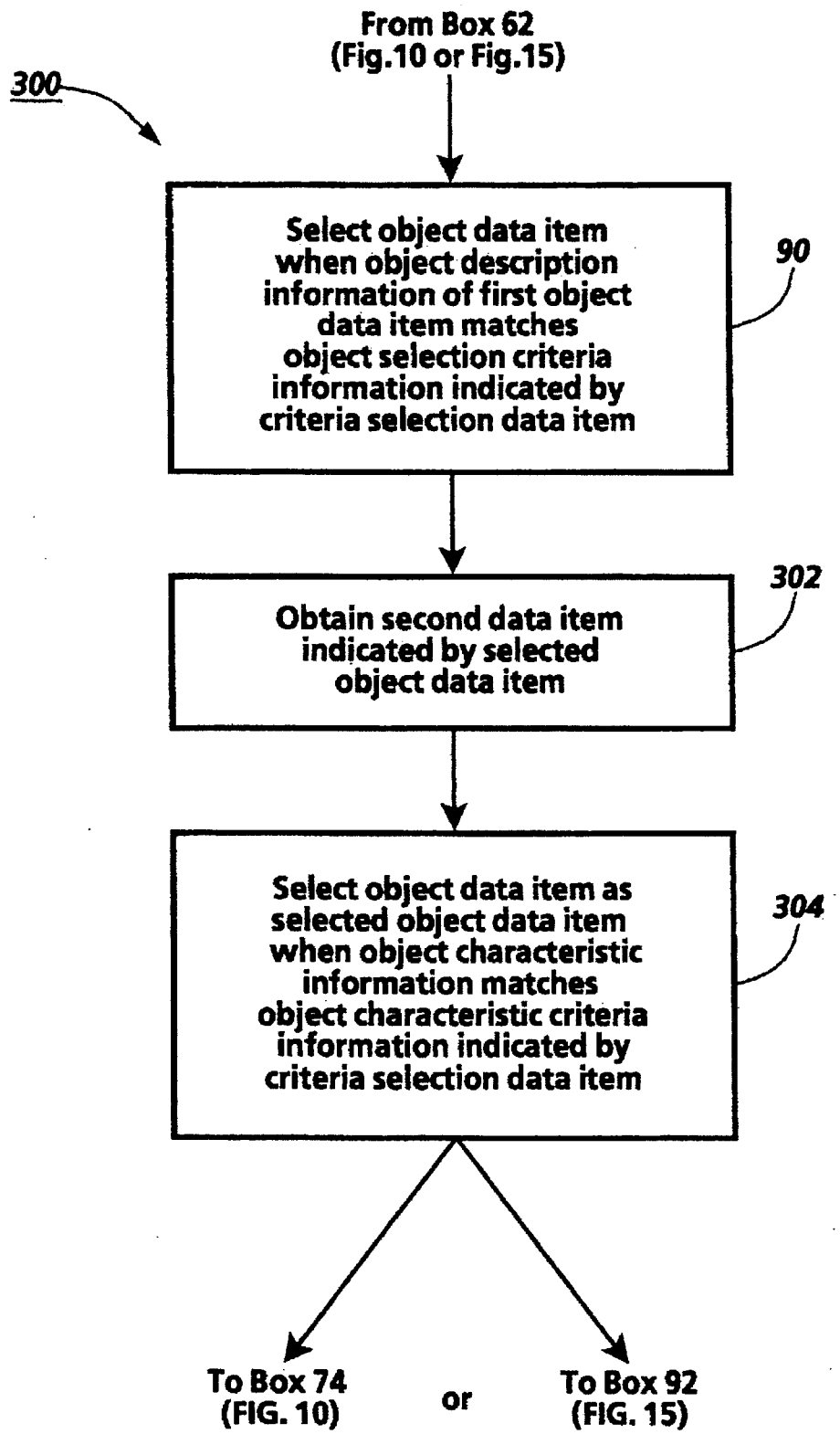
FIG. 25 is a flow chart illustrating a variation of the method of operating a machine illustrated in FIGS. 10 and 15 in which display objects are selected for modification according to additional criteria.

In still another variation of the method of the present invention, the viewing operation region may be used to point out, or highlight, an object in an image that matches both selection criteria for object selection and object characteristic criteria for furthering narrowing object selection. This implementation, which operates on object-based model data structure 890 illustrated in FIG. 21, is shown in FIG. 25 and is designated as method 300.

The data structure organization of object-based model data structure 890 is similar to that of model data structure 860 (FIG. 6). FIG. 21 shows exemplary object description data items 870, 880, 891 and 892 in the data structure. Figure "o" and figure "x" objects 196, 197 and 198 in image 200 (FIG. 22) represent object description data items 892, 880 and 870 respectively in model data structure 890. Connecting lines and arrows 878 and 902 illustrate the concept that object data items 864 and 897 each indicate display feature attribute data items 868 and 898 having a present attribute value of "solid" indicating the solid boundary line of figure "o" when each object is displayed in the display area. Similar indicators exist but are not shown for object description data items 891 and 870.

In model data structure 890, object data items 864 and 897, as shown by connecting lines and arrows 899 and 900, also indicate second data items 896 and 893, respectively. Again, similar indicators exist but are not shown for object description data items 891 and 870. Each of the second data items 893, 894, 895, and 896 has a value, hereafter called an "object characteristic value" indicating object characteristic information about its respectively paired display object. FIG. 21 shows that the value "92" is indicated by object data item 897 (the figure "o" object 196 in image 200), and that the value "124" is indicated by object data item 864 (the figure "o" object 197 in image 200). Similarly, the figure "x" object 198 in image 200 representing object description data item 870 indicates a value of "87". Second data items 893, 894, 895, and 896 may be included in model data structure 890. However, second data items 893, 894, 895, and 896 may also be included in another data structure stored in the memory of the machine and indicated by each respectively paired object description data item in model data structure 890.

Figure 22:
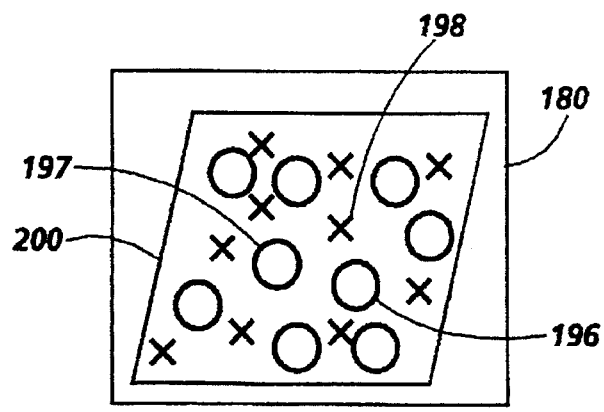
FIGS. 22 and 23 illustrate a sequence of display screens showing the first image and the second image produced according to the method illustrated in FIG. 25.
Figure 23:
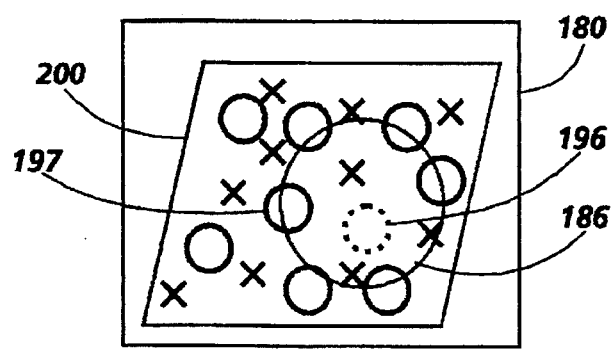

In the example illustrated in FIGS. 22 and 23, the viewing operation associated with VOR 186 first selects circular objects from among all of the objects in image 200, and then further selects, from among the selected circular objects, objects matching certain object characteristic criteria information. In this example, the object characteristic criteria information selects objects indicating second data items having an object characteristic value equal to or less than "100". The matching selected circular objects, only, are displayed in VOR 186 having broken lines.

Method 300 operates on first image 200 and model data structure 890 in a manner similar to methods 70 and 80 in FIGS. 10 and 15 respectively. Object selection in box 90 in each of those methods is followed by the acts illustrated in boxes 302 and 304 in FIG. 25. After the display object is selected according to the object selection criteria information in box 90, the second data item indicated by the selected object data item is obtained in box 302. Then, in box 304, the object characteristic information indicated by the object characteristic value of the second data item is compared to the object characteristic criteria information indicated by the criteria selection data item, and the display object is selected if there is a match. Processing continues with the remainder of method 70 or method 80, as shown.

The results of method 300 are illustrated in FIGS. 22 and 23. In FIG. 22, first image 200 includes display objects 196, 197 and 198, each display object including the display feature of solid lines. FIG. 23 shows the figure "o" object 196, only, displayed in broken (nonsolid) lines as a result of method 300 selecting circular objects having an object characteristic value equal to or less than "100". Display object 197 does not appear modified in the second image in VOR 186 because second data item has an object characteristic value greater than "100". Since VOR 186 displays a second image which in effect highlights objects in first image 200 that meet the object characteristic criteria, and the object characteristic values of the objects are themselves not visible in the image, method 300 provides access to information in model data structure 890 not otherwise visible in first image 200.

Figure 24:
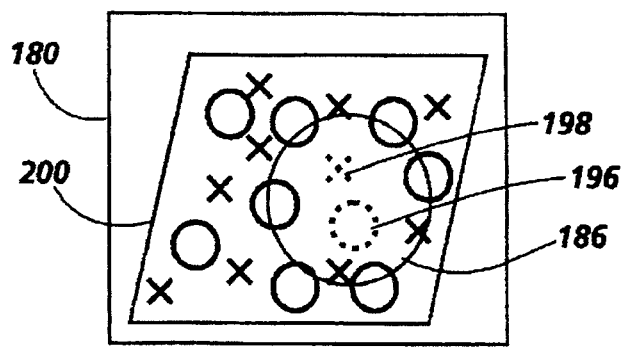
FIG. 24 illustrates a display screen showing the second image produced according to variation of the method illustrated in FIG. 25.

Method 300 is intended to cover a wide range of image object selection and highlighting viewing operations. For example, when the viewing operation associated with VOR 186 operates to select both figure "x" and figure "o" objects having object characteristic values equal to or less than "100", both objects 196 and 198 are highlighted, as shown in FIG. 24. Method 300 may perform object selection using any object characteristic criteria suitable for the data values of second data items indicated by object data items in model data structure 890. Method 300 may also perform any suitable attribute modification for purposes of highlighting selected objects in the second image, including, but not limited to, changing the selected object's color or gray scale level, shape, size, font or type style, or spatial orientation. Additional representative examples of such viewing operations are included in Table 2 below.

C. Description of an illustrated embodiment of a graphical object implementation 1. The system environment for the user interface implementation A current embodiment of the method of the present invention has been implemented as a set of interactive user-controlled functions, or viewing operations, cooperating with the functionality of a graphical object editor application software program which operates in a graphical user interface system environment. Each viewing operation operates on the object-based model data structure of the graphical objects editor, hereafter called the graphical editor data structure, which has structural features similar to model data structure 860 described earlier. The implementation of one of these viewing operations, designated as method, or viewing operation, 400, will be described in detail below. The structure of this programming environment will be described with reference to the simplified functional block diagram of FIG. 26 with the understanding that these functional components are common to a wide variety of machines supporting graphical user interface environments.

The illustrated embodiment has been implemented on a Sun Microsystems SPARCstation 10 computer as a research software prototype application written in the Cedar programming environment, a Xerox proprietary research software environment, utilizing the Cedar programming language, and running on the SunOS UNIX®-compatible operating system. The Cedar programming environment provides application support for a graphical user interface environment including software functions both for presenting and managing images for display in plural workspaces or "windows" in the display area of the display, and for interfacing with at least one pointing device, to be manipulated by a user of the machine. The user uses the pointing device to communicate operational commands to the graphical user interface, and, through the interface, to each software application operating in each window.

The illustrated implementation also operates within the framework of an editing environment known as MMM (Multi-Device Multi-User Multi-Editor. MMM operates as a single window in the Cedar programming environment, and allows for multiple applications, including the graphics editor application, to execute as subwindows within the MMM window. MMM takes events from multiple input devices, such as a mouse and a trackball, keeps track of which device produced which event, and places all events on a single queue. It dequeues each event in order and determines to which application that event should be delivered. MMM applications are arranged in a hierarchy that indicates how they are nested on the screen. Each event is passed to the root application, which may pass the event on to one of its child applications, which may in turn pass the event on down the tree. Mouse events are generally delivered to the most deeply nested application whose screen region contains the mouse coordinates. However, when the user is dragging or resizing an object in a particular application, all mouse coordinates go to that application until the dragging or resizing is completed. Keyboard events go to the currently selected application. Additional information about the MMM environment may be found in Eric A. Bier and Steve Freeman, "MMM: A User Interface Architecture for Shared Editors on a Single Screen" in the *Proceedings of the ACM SIGGRAPH Symposium on User Interface Software and Technology* (Hilton Head, S.C., Nov. 11–13, 1991), ACM, New York, 1991, at pp 79–86.

In the illustrated implementation, the MMM editor is the root application and its window contains all other relevant application windows. In this case, those other applications include viewing operation 400 and Gargoyle graphics editor 120. MMM thus acts as a signal director between viewing operation 400 and application 120. In the illustrated implementation, viewing operation 400 is one of several tools that may be placed on a transparent overlay. The use of viewing of operation 400 in conjunction with the transparent overlay is described in more detail in concurrently filed, copending, and commonly assigned U.S. patent application Ser. No. 08/095,598 entitled "User Interface Having Movable Tool Sheet". For purposes of describing the illustrated embodiment herein, the processing interconnections between the viewing operation 400 and the transparent overlay are not significant and will not be discussed.

In addition, for simplification, the functionality of the MMM environment will be presumed to be incorporated directly into the window management system 112, and references to the "window manager 112" hereafter will presume to include the functionality of the MMM editor in the illustrated implementation.

Figure 26:
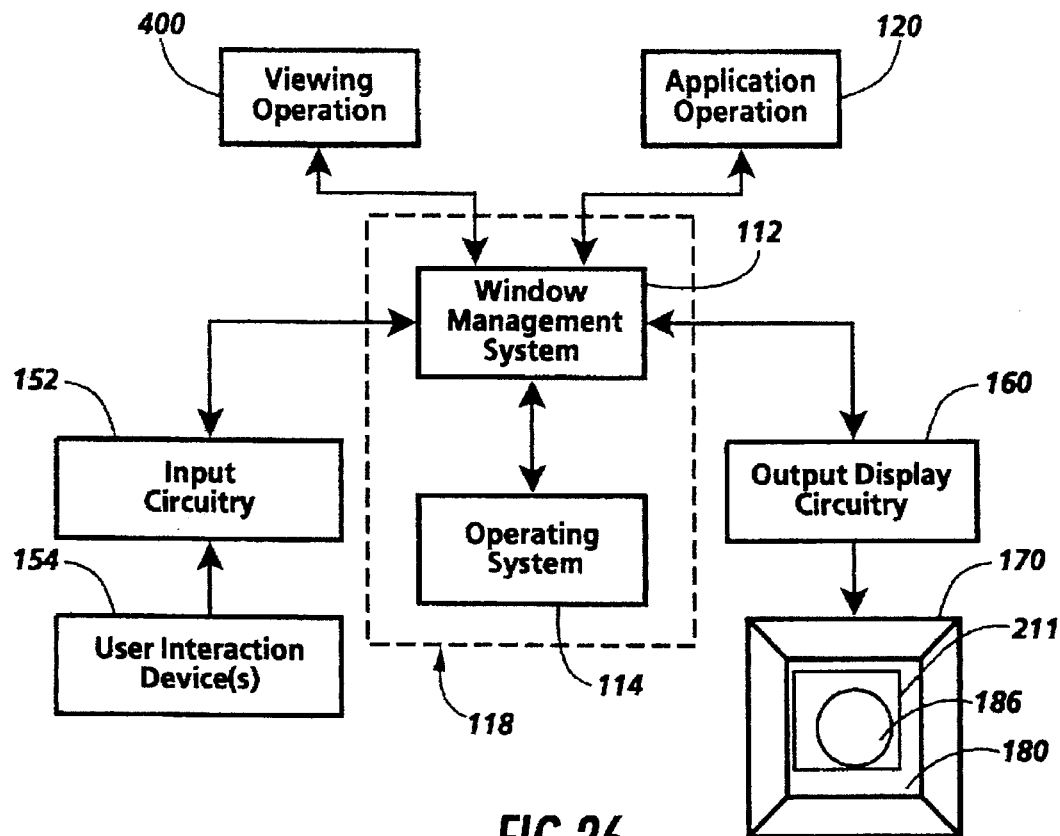
FIG. 26 is a block diagram illustrating the interaction between the systems components of an illustrated embodiment of the method of the present invention.

The underlying structure of the Cedar environment, designated collectively as reference numeral 118 in FIG. 26, is a collection of components that are arranged in hierarchical layers, supporting a well integrated, interactive environment in which lower level modules remain directly available to higher level, or "client" programs, callable as ordinary Cedar language procedures. In addition, a higher level Cedar component can supply a procedure value as a parameter to a lower level service procedure, which in turn can later invoke the higher level component to communicate with it as necessary.

With continued reference to FIG. 26 Cedar environment 118 controls different application contexts controlled by processor 140 (FIG. 46) by separating them physically into different parts of one or more display screens. Application programs, such as the Gargoyle graphics editor 120, in the Cedar programming environment are called "clients" of the environment. The Cedar environment includes a high-level software window management system 112, hereafter called "window manager 112", which provides the necessary window management control for the application client programs that execute on the machine. Window manager 112 allows programmers and programs to create, destroy, move, and realize a hierarchical system of defined individual viewing areas in display area 180 of display device 170 called "windows". Each window is a region whose position and size is managed by the window manager 112, but whose contents are determined by the client application which creates the window. Window manager 112 also permits the client application to create nested subwindows to handle certain lower level functions within top level windows. Window manager 112 redisplays the contents of each window based on client-supplied specifications whenever the window's contents, size, or location changes. Windows are implemented by a client application as a set of window classes. A window class implementation provides operations to initialize a window, to save its contents, to destroy a window, to paint its contents on the display, and so on, and each member of a specific window class shares these same behaviors.

Viewing operation software 400 contains the software instructions for defining and implementing a viewing operation according to the method of the present invention and for interacting with the graphical editor data structure used by Gargoyle graphics editor 120 in order to produce the second image. Viewing operation 400 cooperatively interacts with the functionality of the Gargoyle graphics editor 120, and is a client of window manager 112, as is Gargoyle graphics editor 120. Each application client exchanges data with user interaction device 154 and display 170, via window manager 112 by converting signals received from input circuitry 154 into a series of user input signals for directing control of processor 140 (FIG. 46) to perform the operations of Gargoyle graphics editor 120 and to perform viewing operation 400, including creating and drawing the viewing operation region 186 in window 211, on display 170, in response to request signals from the user.

The Cedar programming environment also includes a high-level, device independent graphics software application known as the Imager that provides high quality two-dimensional display of text, line art, and scanned images. The imaging model for the Imager is based on the Interpress page description language, which is similar to PostScript. The Imager handles all display output for all applications, including window manager 112, as well as for other programs (not shown) implemented in the Cedar environment. The Imager supports the presentation of a variety of image material: text in various fonts, lines and curves of various thicknesses, strokes or enclosed outlines, sampled images, and various color models. Image transformations can scale, rotate, translate, and clip images through simple specifications. The device independent design permits images to be rendered on a variety of devices, some of which include full-color displays, color-mapped displays, black and white displays, and printers.

In the illustrated embodiment, window manager 112 includes input handler software (not shown) which collects, interprets, and parses the input data stream of user input requests and data into appropriate input signals for further action. Two modes of input handling are provided by window manager 112. In one mode, input signal management produces a single serial buffer of time-stamped input events from supported input devices, which in turn may be independently extracted by an application client if needed for processing a particular user event or response. In the second mode, called the Terminal Input Processor (TIP), input signals are interpreted based on specifications that are parsed into TIP tables (not shown). For each event, or event sequence, a TIP table entry specifies a sequence of action tokens that represent the semantics of the event. In the MMM framework of the illustrated embodiment, the functionality of the TIP is handled in MMM, and Cedar's TIP is not used.

In the illustrated embodiment, a three-button mouse provides the primary method for a user to send signals to viewing operation 400 requesting the display of VOR 186. The mouse is connected in a conventional manner to user input circuitry 152. However, user interaction device 154 may include any suitable device for interacting with the viewing operation region 186 and other objects displayed on display device 170, including but not limited to pointing and cursor control devices for two- and three-dimensional displays, such as a light pen, track ball, joystick, or data glove device, a touch screen display, and alphanumeric devices such as a keyboard. Alternatively, the user interaction device 154 may be a speech recognition device for speaking input, or a location sensing device for gestural input.

Additional information regarding the Cedar programming environment may be found in D. Swinehart et al., "A Structural View of the Cedar Programming Environment, ACM *Transactions on Programming Languages and Systems*, Vol. 8, No. 4, October 1986, pp. 419–490, and in W. Teitelman, "A Tour Through Cedar", *IEEE Software*, Volume 1, No. 2, April, 1984, pp. 44–73, both of which are hereby incorporated by reference herein. Additional information regarding the Gargoyle graphics editor may be found in K. Pier et al., "An Introduction to Gargoyle: An interactive Illustration Tool", *Proceedings of the Intl. Conf. on Electronic Publishing, Document Manipulation and Typography*, (Nice, France, April) Cambridge University Press, 1988, pp. 223–238, which is also hereby incorporated by reference herein.

Figure 26A:
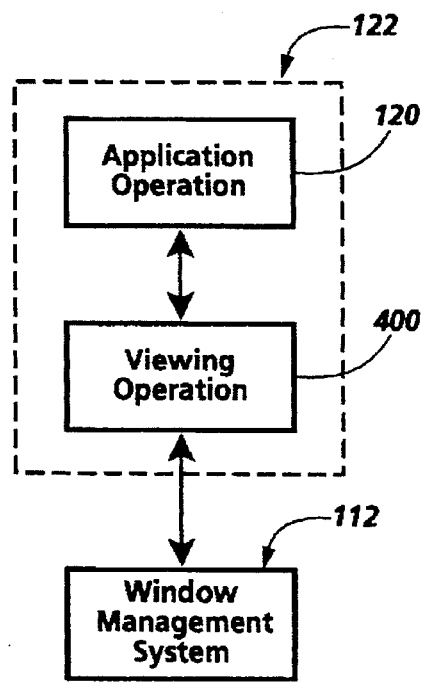
FIG. 26A is a variation of the block diagram in FIG. 26 illustrating an alternative implementation of the method of the present invention.

In the illustrated embodiment, method 400 is implemented as a separate application, and the MMM editor handles any interaction between application 120 and method 400. However, as shown in FIG. 26A, the method of the present invention may also be implemented as a functional enhancement to application 120 which interacts with window management system 112 in graphical user interface environment 118 as collective entity 122. Method 400 may be implemented in this manner to operate in any of the variety of graphical user interfaces currently available for computer workstations and other types of machines having processors and displays, including personal computers, fully-featured copier-duplicators, production publishing machines, and image reproduction machines. The method of the present invention may be implemented in a variety of hardware and software environments that provide the window management and graphics software support functions equivalent to those described herein with respect to the illustrated embodiment.

2. A graphical object implementation

Figure 27:
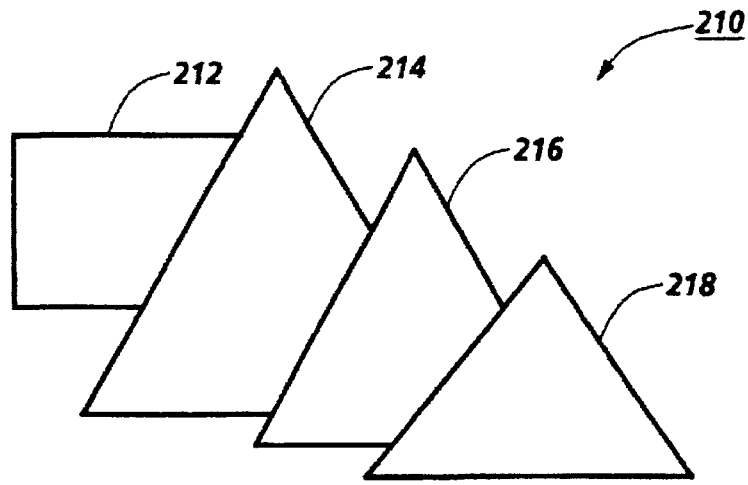
FIG. 27 illustrates a first image operated on by the illustrated embodiment of the method of the present invention.
Figure 28:
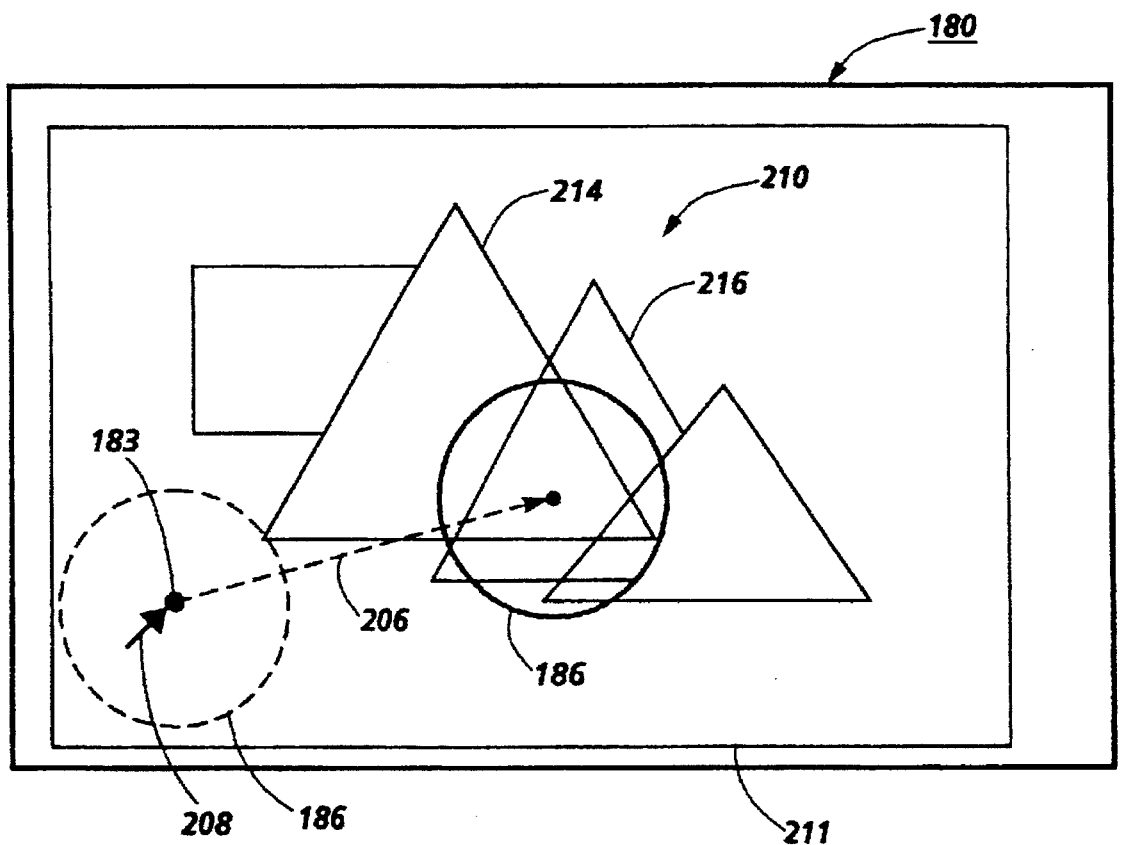
FIG. 28 illustrates a display screen showing the second image produced according to the method of the illustrated embodiment shown in the flow charts of FIGS. 29 and 30.

FIG. 27 shows first image 210 on which viewing operation 400 will operate. First image 210 includes display objects 212, 214, 216, and 218. These display objects have the appearance of being arranged in a front-to-back overlapping order, and of having an interior fill color, so that the objects are opaque, frontmost triangle 218 thus obscuring a portion of triangle 216, which in turn obscures a portion of triangle 214, and so on. FIG. 28 illustrates image 210 in window 211 in display area 180. Graphical object editor 120 permits a user of the editor to select and manipulate display objects in image 210, changing their spatial orientation within window 211, interior or exterior boundary color, boundary line thickness, size, angle relationships between the sides, and other similar display feature attributes. Graphical object editor 120 uses a graphical editor data structure that includes, for each object in an image, its x-y coordinates relative to a program-defined window or other display medium, its orientation in space, its size, and its shape.

Figure 29:
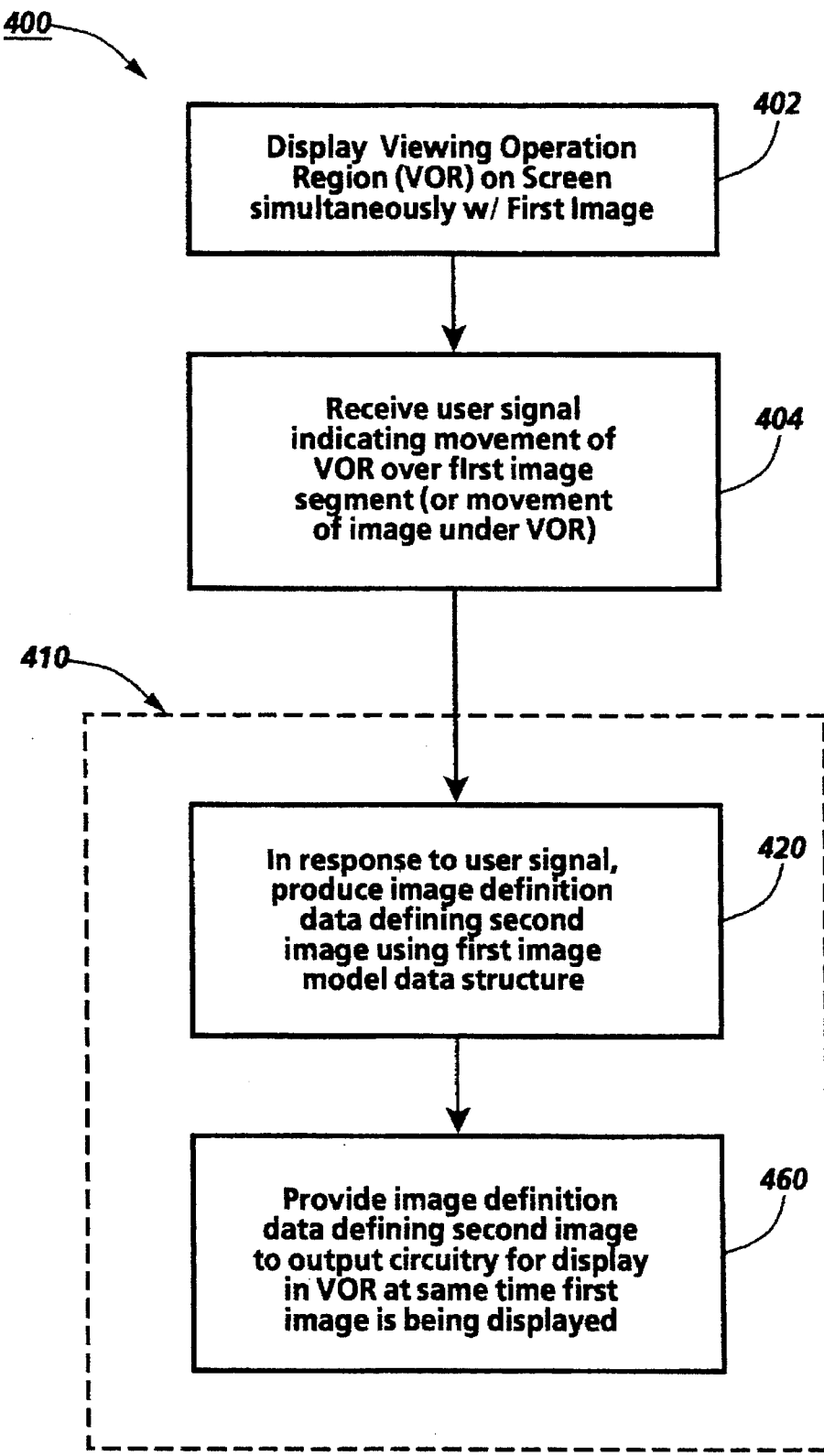
FIGS. 29 and 30 are flow charts illustrating the acts of the method of the illustrated embodiment.

FIG. 29 illustrates the acts comprising the illustrated embodiment of the method of the present operation designated as viewing operation 400 in FIG. 26. Viewing operation 400 in the illustrated embodiment performs the operation of revealing all the edges of objects that fall within the boundary of VOR 186, in effect changing the display feature attribute data item that controls whether an object appears opaque, for each object in the model data structure within the boundary of VOR 186. VOR 186 may be colloquially referred to as the "xray" VOR, giving the appearance to the user of revealing hidden display features only within the boundary of the VOR. Method 400 first displays VOR 186 in display area 180, in box 402. FIG. 28 illustrates the initial position of VOR 186 as a dotted-line-bounded circular region. For purposes of illustration, VOR 186 is displayed in a portion of display area 180 which has a present viewing position that is not coextensive with any position of first image 210 having a display object.

a. The user interaction

In the illustrated embodiment, the window containing first image 210 and the viewing operation region each act as a "selectable unit". A selectable unit is a display feature that is perceived as a bounded display area that can be selected. For example, in many graphical user interfaces, small display objects representative of data structures, functions, or input and output devices, known as "icons", are selectable units. The term "select," when used in relation to a selectable unit, means an action by a user that uniquely indicates the selectable unit. The user can, for example, use a pointing device such as a mouse to select a selectable unit by indicating its position and clicking a button on the pointing device.

Figure 31:
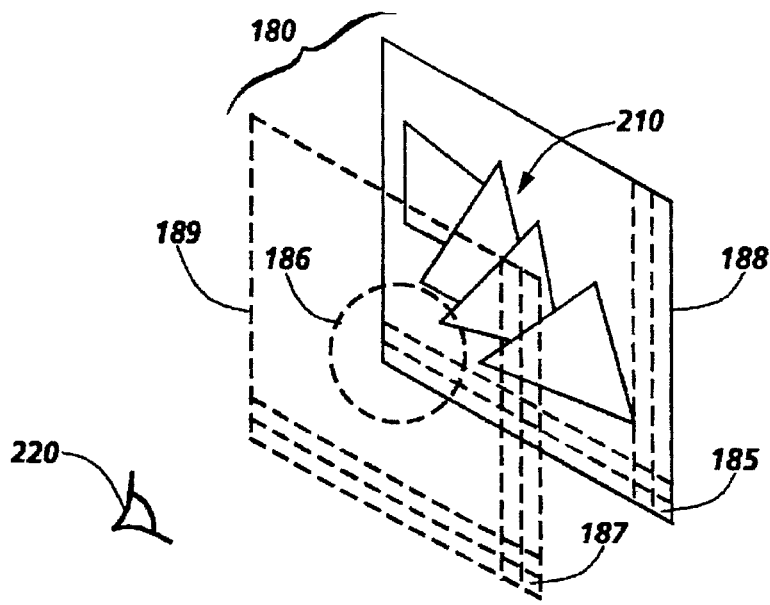
FIG. 31 illustrates the two image planes of the display area implemented in the illustrated embodiment.

In box 404 of FIG. 29, the user interacts with either selectable unit VOR 186 or window 211 containing first image 210 to position VOR 186 in a present viewing position in display area 180 coextensively with a first image segment of first image 210. VOR 186 in two-dimensional display area 180 has the appearance in the illustrated embodiment of being in a different image plane than that of first image 210, creating the appearance of a 2.5 D image display area. FIG. 31 illustrates this concept, showing the 2.5 D display area from the perspective of human user 220 having two image planes 189 and 188. User interaction consists of using the machine's pointing device to move tracking symbol or cursor 181 (FIG. 28) either to window 211 containing first image 210 or to the viewing operation region window 186, and attaching the cursor to the selected unit in some conventional manner, such as by pressing a mouse button. In FIG. 28, cursor 181 is attached to VOR 186 at position 183, but it can be attached at any other suitable point in or at the edge of VOR 186.

With reference again to FIG. 31, once the cursor is attached to the selected unit, the user then moves either window 211 containing first image 210 in image plane 188 "under" VOR 186 in image plane 189, or moves VOR 186 in image plane 189 "over" a portion of first image 210 in image plane 188. Since each image position 185 in image plane 188 corresponds to an image position 187 in image plane 189, as a result of the user's interaction, VOR 186 will be positioned coextensively with a first image segment of first image 210. In FIG. 28, dotted line 187 shows the movement of VOR 186 to a position over a portion (segment) of first image 210. The user's interaction results in a request signal being generated, requesting the display of VOR 186 in a present viewing position in display area 180 coextensive with a present image position of a first image segment of image 210. The request signal includes the x-y display coordinate position of VOR 186 in display area 180 and is passed to viewing operation 400 which, along with window manager 112, controls the display processing.

b. Response to the user request signals i. Copying and modifying the model data structure.

In response to the user's movement action, method 400, in box 410 of FIG. 29, produces image definition data defining the second image using the graphical editor data structure, in box 420, and, in box 460, provides the image definition data defining the second image to output display circuitry 160 for display in VOR 186 in display area 180 at the same time as first image 210 is being displayed in window 211.

Figure 30:
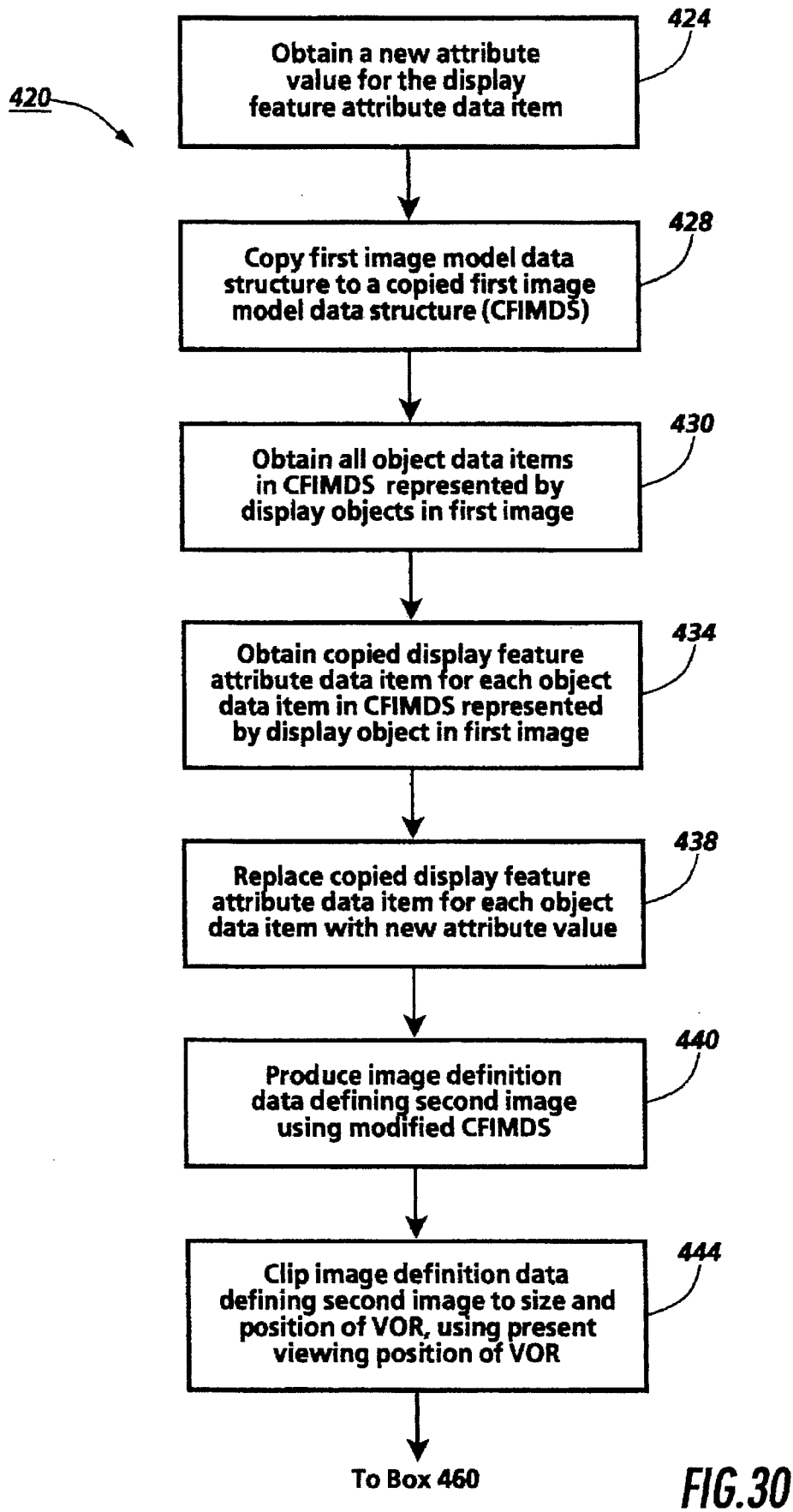

FIG. 30 illustrates the acts comprising box 420 in more detail. With respect to the illustrated embodiment, method 400, in box 424, obtains the new attribute value needed to produce the modified second image. Method 400 shows the outline of all objects located in the first image segment, regardless of each object's front-to-back orientation with respect to other objects. Thus, method 400 changes the display feature attribute data item that controls whether an object has a fill color in the image, and changes any object having a fill color to an object having no fill color. In this simple implementation, the act in box 424 is accomplished by using a predetermined value coded directly into the software routine for changing the data structure, and so need not be a distinctly separate step. However, more complex changes may require a separate procedure to obtain or compute the new attribute value from data contained elsewhere in viewing operation 400, or in the model data structure, or in a second data structure located in the memory of the machine.

Method 400 then copies the graphical editor data structure to an identical second model data structure, in box 428, and then, in boxes 430, 434, and 438, obtains each object data item from the copied data structure, locates the display feature attribute data item controlling the object's fill color, and replaces it with the new attribute value indicating an object having no fill color. In addition, since some objects may not have been specified with a distinctly separate outline, method 400 makes sure that each object has a visible edge outlined in the second image. This portion of method 400 is implemented using an existing procedure from the graphical object editor application 120 that takes as its arguments the graphical editor data structure and a pointer to one or more procedures for performing operations on the model data structure; viewing operation 400 calls the application procedure using as arguments the copied model data structure and the pointer to a procedure for changing the fill color in the data structure to "no fill color", and the called procedure in the graphical object editor application 120 then makes the changes to the copied model data structure using the designated modification procedure.

Method 400 then produces image definition data defining a second image using the copied and modified data structure, in box 440. The second image is thus a modified version of the entire first image. Viewing operation 400 also determines the size and position of VOR 186, in box 444, in order to determine the size and position of the second image. Viewing operation 400 transfers control to graphical object editor application 120 at the point where application 120 produces the image definition data defining first image 210. In the case of the graphical object editor in the illustrated embodiment, this involves rendering the second image into a pixel data structure using the copied and modified model data structure and clipping it to the size and location of the VOR. The second image data is then provided to the display for presentation in VOR 186 substantially simultaneously as first image 210 is repainted in window 211.

FIG. 28 illustrates the second image in VOR 186. The second image shows the complete outline of triangle 214 in VOR 186. The second image also shows the portion of the complete outline of triangle 216 that falls within the boundary of VOR 186. The remainder of the outline of triangle 216 remains hidden outside the boundary of VOR 186. As can be seen from the results of method 400 in FIG. 28, when the second image is substantially similar to the first image segment except for a relatively small perceived modification, the user's perceptual system will integrate the content of the first image with the content of the second image in the spatial context of the first image. The VOR will then have the appearance to a user of appearing to be substantially transparent. This apparent transparency also occurs when the second image is identical to the first image segment, which may occur, as noted in the discussion accompanying FIG. 17 above, depending on the functionality of the operations associated with the VOR.

ii. Subsequent user movement of the VOR

The illustrated embodiment contemplates that the user, in subsequent user interaction with VOR 186, may move VOR 186 from its present viewing position over first image 210 to a new viewing position for display of a different second image showing the modified view of the new first image segment positioned under VOR 186 in the new viewing position. For improved processing efficiency, once the copied graphical editor data structure has been changed so that no objects in first image 210 have fill colors, the copied and modified model can be cached in memory for use when VOR 186 is moved over a different portion of image 210. When VOR 186 is moved in this manner, method 400 retrieves the copied and modified model from memory, determines the new clipping region defined by VOR 186, and calls application 120 to produce the second image using the previously changed copied model data structure and the new clipping region definition.

Method 400 must also detect when changes are made to the model that invalidate the cached modified copy. If the cached copied model created when the user last moved the viewing operation region no longer represents the current state of the graphical editor data structure, in the next movement of the viewing operation region, method 400 must copy the model again, perform the operation on the model to create the second image, and replace the previously cached copied model with the newly copied model.

Method 400 also calls application 120 to restore the previously modified portion of first image 210 which was the image segment under VOR 186 in its prior viewing position, hereafter called the "prior selected first image segment". Application 120 provides to the display image definition data defining the prior selected first image segment for display in the prior viewing position simultaneously with the display of the new second image in VOR 186.

Figure 32:
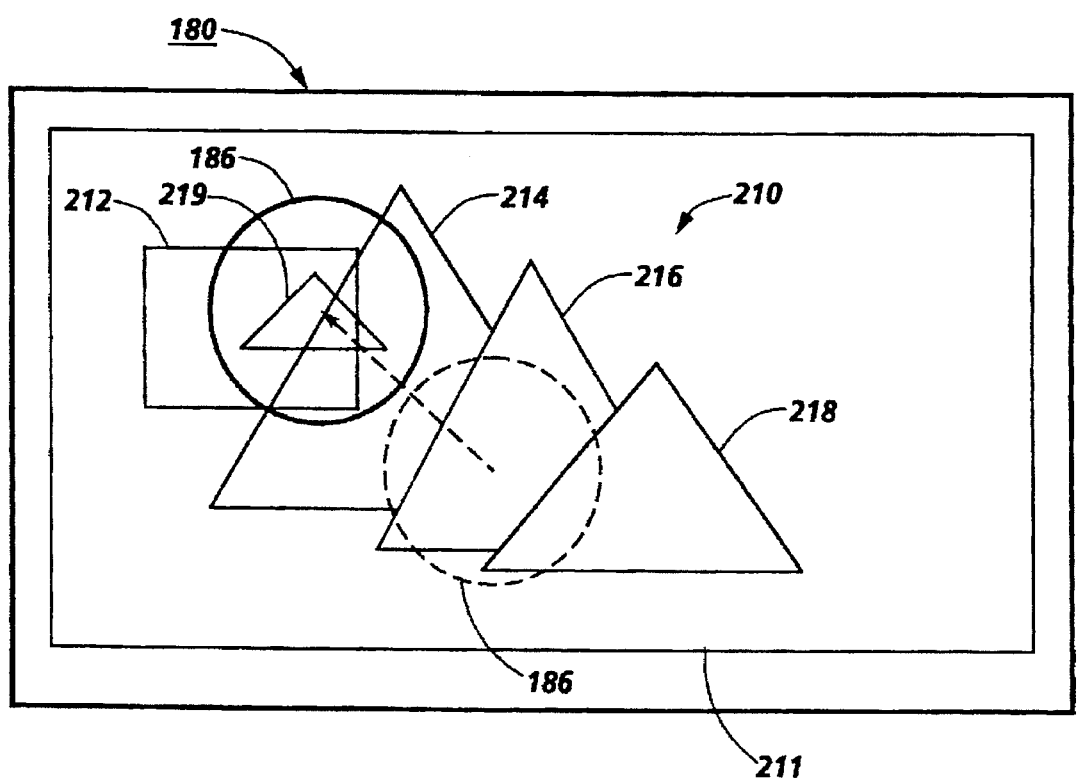
FIG. 32 illustrates a display screen showing another second image produced according to the method of the illustrated embodiment shown in the flow charts of FIGS. 29 and 30.

FIG. 32 shows VOR 186 moved to a new position over portions of rectangle 212 and triangle 214. The prior position of VOR 186 is shown as the circular region with the dotted line boundary. It can be seen that the portions of the border of triangle 214 visible in FIG. 28 are no longer visible in FIG. 32 once VOR 186 has been moved away. In its new position, VOR 186 shows a second image having the entire boundary of rectangle 212, and also having triangle 219, which was not visible at all in the original image 210 shown in FIG. 27.

iii. Performance considerations

It is clear from the description of the operation of the invention according to method 400 that, even when the copied model data structure is cached in memory for performance considerations, method 400 always operates on a model data structure to produce the image definition data (pixel data) defining the second image. The illustrated embodiment neither stores nor operates directly on the image definition data structure to produce the second image. This aspect of the invention has important consequences when two or more viewing operations are composed together.

In the illustrated embodiment, method 400 responds to the user's request signal whenever VOR 186 is positioned coextensively with a first image segment of first image 210. The illustrated implementation does not depend, therefore, on the receipt of a signal from the user indicating a final position of the VOR in display area 180, such as by releasing a mouse button, as is customary in many graphical user interfaces that use the pointing device to perform a "drag and drop" action. As long as the user is moving the VOR anywhere over the first image (or is moving a first image under the VOR), the method responds to the user signal and produces the second image for display in the VOR. In practical terms, some user movement signals in the input event queue are discarded during the processing time needed to produce the second image and repaint the display, but display of the second image segment in the VOR occurs with sufficient speed during movement of the VOR that it appears to the user that the VOR presents a smoothly and continuously changing second image showing a modified first display feature with each change. Thus, the VOR, appearing almost transparent as it moves across the first image, provides the metaphor to the user of being an optical lens or a filter presenting a different view of the first image within its boundary as it moves across the first image.

For very complex modifications to the first image that are likely to require significant processing time, the illustrated embodiment could result in perceptible jumps of the VOR as the user moves it over the first image because the processor is unable to produce the second image at a sufficient rate to present a smoothly changing second image. In this case, the method could be implemented using the "drag and drop" behavior, requiring the user to signal when the VOR has reached a "final" position over a portion of the first image for which a modified second image is desired. In this alternative implementation, the method could repaint only the boundary of the VOR as it moves across the first image to its final position, and present the second image only when the VOR is in its final position.

c. Operating on multiple first images

Figure 33:
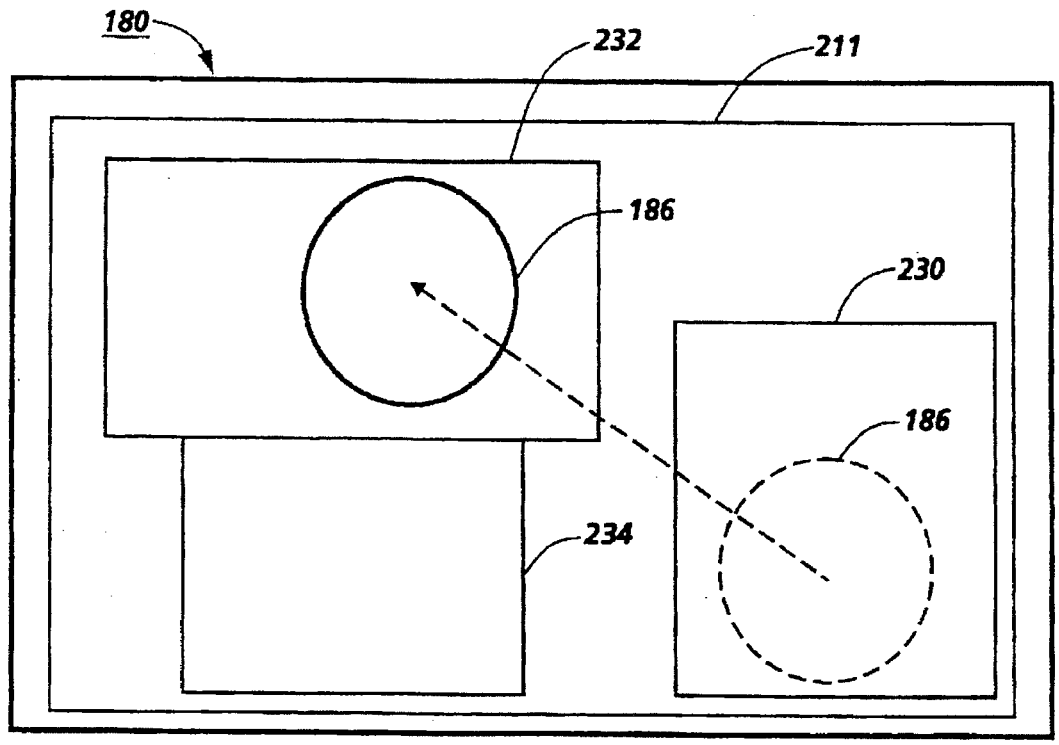
FIG. 33 illustrates a display screen showing a variation of the illustrated embodiment capable of producing second images from first images in multiple subwindows.

Graphical editor application 120 (FIG. 26) and Cedar programming environment 118 (FIG. 26) support the implementation of multiple subwindows in an application window. The illustrated embodiment also operates on multiple images displayed in subwindows of window 211, as shown in FIG. 33. Subwindows 230, 232 and 234 each contain images (not shown) produced by application 120. Each image is produced from a different respective model data structure stored in the memory of the machine. Graphical editor application 120 tracks the position of each subwindow in window 211 using image identification data stored in the machine's memory. For each image displayed, the image identification data indicates the respective one of the first image model data structures that produced the image. VOR 186 may be moved over any of the subwindows to produce a modified second image, as shown by the dotted line arrow in FIG. 33. Alternatively, a subwindow may be moved under VOR 186 to produce a second image in VOR 186. In this subwindow environment, method 400 uses the present image position of the first image in display area 180 to access the image identification data and identifies the first image model data structure that produced the first image positioned coextensively with the viewing operation region.

As already noted, method 400 may save a copied model data structure in memory once it has been changed according to the viewing operation. In the multiple subwindow environment, each copied model data structure for each subwindow image may be saved in a table with appropriate indexing. The table must include data showing when each model data structure was last updated by application 120, since the user may also be interacting with the model using the functions of application 120 as well as interacting with VOR 186. When the table data indicates that a model data structure has been updated since method 400 last operated on the model, method 400 must produce a new copied model data structure for storing in the table for the appropriate subwindow image.

d. Operating with multiple viewing operation regions on a single first image

Because the method of the present invention operates on a model data structure to produce a second image with respect to the spatial positioning of the viewing operation region over the first image, more than one viewing operation region, each with a different associated viewing operation, may be positioned over a single image to produce distinctly different second images. The second image produced from the operation of each viewing operation is spatially restricted to the viewing operation region, thus permitting multiple and distinct views of the first image to be displayed simultaneously. FIG. 5B illustrates two VORs 186 and 274 over text image 270.

Figure 34:
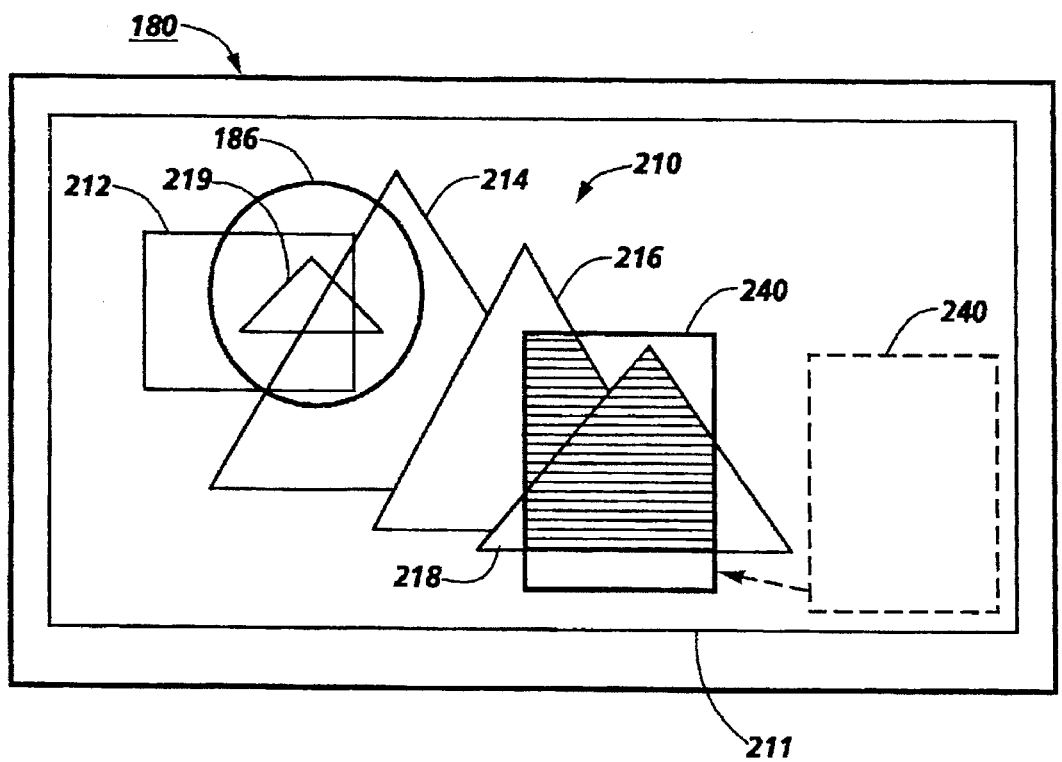
FIG. 34 illustrates a display screen showing a variation of the illustrated embodiment capable of producing multiple second images from a first image.

FIG. 34 also illustrates multiple viewing operation regions over a single image. FIG. 34 shows VOR 186 positioned over first image 210, and also shows rectangular VOR 240 moved over first image 210 via dotted line 242. The viewing operation (method 400 described above) associated with rectangular VOR 240 colors objects that are within the boundary of VOR 240 with a blue fill color, shown as the lined pattern in the interior of the portions of triangles 216 and 218, while the viewing operation associated with VOR 186 operates as described above with reference to FIGS. 28 and 32 to produce a second image showing the outlines of the portions of all objects located within the boundary of VOR 186. Each viewing operation operates on the graphical editor model data structure as illustrated in FIGS. 29 and 30, or in the alternative manner illustrated by the acts in FIG. 35 and discussed below. Where multiple model data structures exist for a given application, both viewing operations need not operate on the same model data structure, and may each operate on different models, even when positioned over first image 210 at the same time.

3. An alternative implementation using a standard graphics language data interpreter as the model As noted earlier in the discussion accompanying FIG. 44, an application may produce or operate on an intermediate data structure during its processing which is also defined to be a model data structure for purposes of describing this invention. In Cedar programming environment 118 (FIG. 26), the graphical objects editor application 120 utilizes a graphics language or page description language describing how the image objects in first image 210 are integrated and arranged in the displayed image. The graphics language model contains procedure calls to graphics primitive procedures, typically stored in a procedure library in memory, that an interpreter or other body of software, also stored in memory, executes to produce the image definition data, such as pixels, needed to display the image. It also contains data that defines the current state of global parameters such as the current position, transformation, color, line weight, etc. In the illustrated embodiment, the graphics language is called Interpress. In Cedar, the Interpress implementation can be divided into two sections: the Interpress interpreter, which parses the language, and the Imager, which implements the graphics primitives used in the language. Applications typically interact directly with the Imager to produce displayed images. The Imager is designed such that the implementation of the graphics procedures can be easily modified. Each procedure in the Imager takes as a parameter a "context" which contains a pointer to the set of procedure implementations and a pointer to the data that defines the current state, as well as additional parameters specific to that procedure. The Imager procedure is executed by calling the implementation supplied by the context with the supplied parameters.

Figure 35:
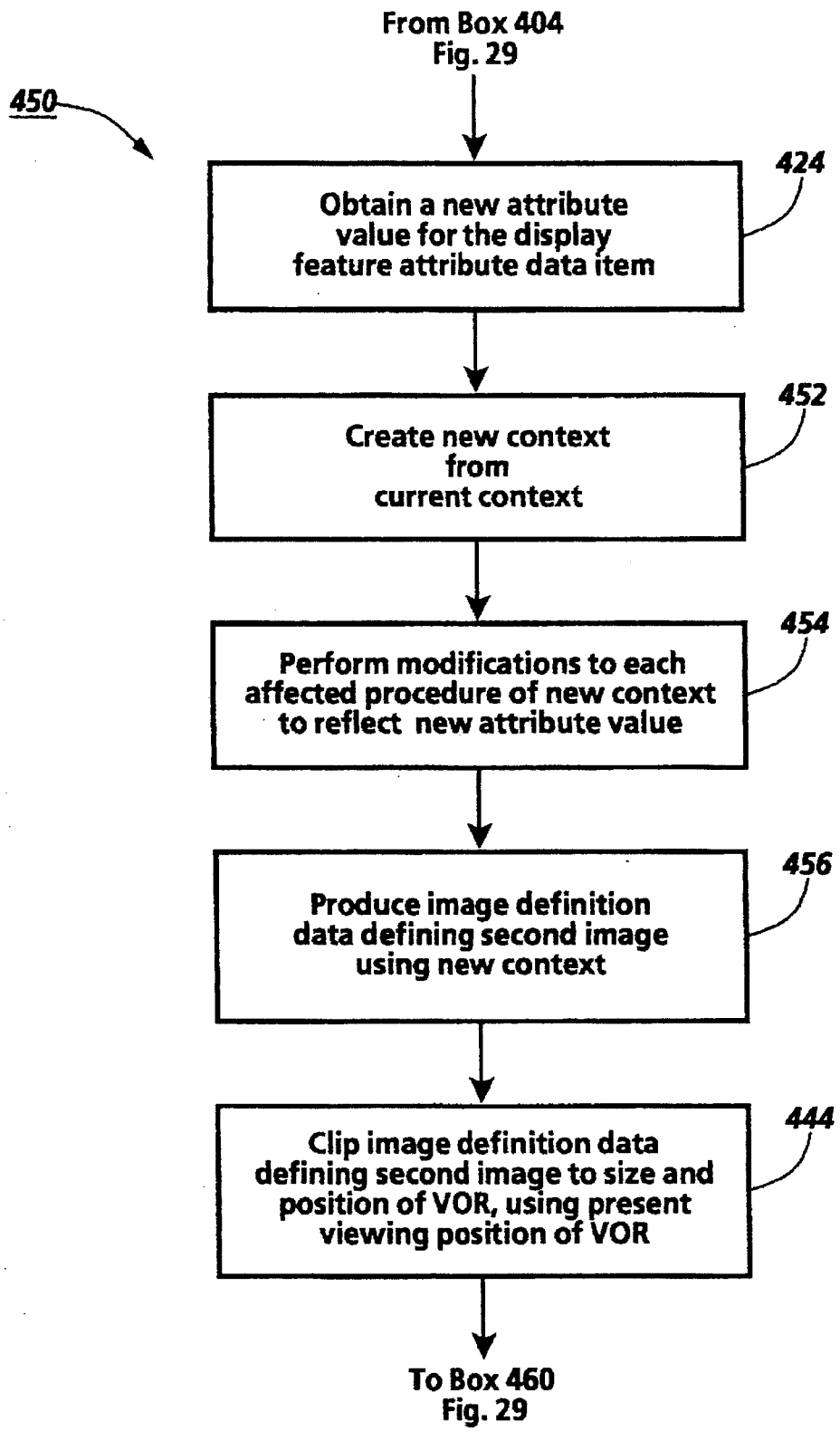
FIG. 35 is a flow chart illustrating the acts of another implementation of the method of the illustrated embodiment.

The illustrated embodiment of method 400 (FIGS. 29 and 30) may be alternatively implemented to modify the Imager context to produce the desired second image in viewing operation region 186. This alternative implementation, operating on a graphics language model, is shown in FIG. 35 as act 450, and functionally replaces the acts performed in box 420 of FIG. 30. To produce a second image having the entire boundary of each display object in first image 210 revealed, method 450 provides a modified implementation for the set of graphics primitive procedures that application 120 uses to produce the image definition data defining the appearance of the display objects in first image 210. The modified implementation consists of modified procedure calls to Imager primitives which, when interpreted, produce the desired modification in the second image of having the entire boundary of each display object revealed.

Turning now to FIG. 35, the new attribute value for the display feature attribute data item that determines whether an object has a fill color in first image 210 is obtained, in box 424. Method 450 then produces a new context from the current context of application 120, in box 452. For each procedure for which a modified implementation is needed, method 450 then executes instructions, in box 454, that perform modifications to those procedures, and stores them in the modified context. In some cases, this modification involves computing or obtaining new parameters for the context or for other input parameters used by the procedures. In other cases, the modifications desired are more elaborate, and additional processing is needed to produce the desired change in the image; this new functionality is also included in box 454. In box 456, the new, second image is produced using the new context to display the application data structure. Interpretation of the modified procedure calls results in the second image being produced having the modified display features. Then, in box 444, the second image is clipped to the size and position of VOR 186 prior to display. As noted above, in this implementation alternative, method 450 includes modifications for each Interpress procedure that affects an object's fill color, and for each procedure that draws lines.

A similar implementation may be used for any other suitable graphics or page description language, such as the PostScript® page description language.

A significant advantage of operating on a standard graphics or page description language as the model data structure is that the viewing operation can operate successfully over a large number of model data structures created by many different applications that use the standard implementation for display. In this form, the method may be used in a manner similar to that of software utility, or as extension of the machine operating system's user interface, as described more fully below in Part D.

From an implementation and performance perspective, the alternative embodiment of method 450 may require more code modifications to graphics primitives than the coding required to implement method 400 which copies the entire model. In addition, when viewing operations are combined, as when a VOR associated with one viewing operation is moved to overlap or coincide with a VOR associated with another viewing operation, processor performance and the time required to produce the combined, or composed, second image may be unacceptable, since the final second image involves multiple computations as each second image is produced by each individual viewing operation, prior to composing. The method for composing viewing operations to produce a composite second image in the viewing operation region is described in copending, concurrently-filed, commonly-assigned U.S. patent application Ser. No. 08/096, 193, now U.S. Pat. No. 5,479,603, entitled, "Method and Apparatus for Producing a Composite Second Image in the Spatial Context of a First Image", incorporated by reference herein.

4. The graphical object implementation using object selection

Method 400 or method 450 may be modified to perform the object selection and highlighting functions discussed above in Parts B.3.c. and d. with respect to methods 70 (FIG. 10), 80 (FIG. 15) and 300 (FIG. 25). For example, in implementing method 70, instead of showing the outlines of all objects in image 210, the illustrated embodiment may be modified to show only the outlines of rectangular objects, so that when the VOR passes over the triangular objects in image 210, and there is no rectangular object positioned within the boundary of the VOR, the second image shows no objects at all. When the VOR passes over any portion of the rectangular object, the second image will only show the portion of the outline of the rectangular object positioned in window 210 coextensively with the position of the VOR.

Similarly, in implementing method 80 in the same manner to show only the outlines of rectangular objects, the illustrated embodiment may be modified so that when the VOR passes over the triangular objects in image 210, and there is no rectangular object positioned within the boundary of the VOR, the second image is identical to the first image segment, showing the triangular objects with outlines hidden. When the VOR passes over any portion of the rectangular object, the second image will show the portion of the outline of the rectangular object positioned in window 210 coextensively with the position of the VOR, and continue to show the triangular objects with outlines hidden.

Method 400 could also be implemented to include the highlight selection functions illustrated in method 300 of FIG. 25. For example, the viewing operation of method 400 could be modified to show only the outlines of triangular objects having a red fill color. Method 400 would be modified to make two selections according to the criteria selection information of "object=triangle" and "fill color=red." In FIG. 32, if only triangle 216 has a red fill color, then when the VOR passes over the triangular objects in image 210, the second image would only show the portion of the outline of triangle 216 positioned within the boundary of the VOR; none of the hidden outlines of the other triangles or the rectangle would be shown in the second image since these would not be selection criteria.

As discussed earlier, implementing selection criteria as part of the viewing operation associated with a VOR provides a powerful mechanism for exploring data in a model data structure. In addition to selecting, or filtering, objects from a model for viewing within the boundary of a VOR as described in the discussions accompanying FIGS. 15 and 25, and as illustrated in FIGS. 20, 23, and 24, criteria selection functions may be used to provide a user with visual information about the relationships between an object in a model and other data in the same model, or in another model linked to the first model. For example, if the graphical editor data structure operated on by method 400 (FIG. 29) also indicated data about each triangular object that was not perceptible in image 210, a criteria selection function could be used to find and display the data associated with each triangle positioned within the boundary of the VOR. This data could be related to the triangle in a wide variety of ways; for example, the data could be related to the triangle's structural characteristics, if image 210 in FIG. 29 were an engineering drawing.

5. Facilitating user interaction with objects in the object-based model

As noted above in the discussion accompanying FIG. 26, the illustrated embodiment of the present invention is implemented to cooperate with application 120 and interacts with window management system 112 in graphical user interface environment 118. Viewing operation software 400 in FIG. 26 contains the software instructions for defining and implementing a viewing operation according to the method of the present invention and for interacting with the graphical editor data structure used by Gargoyle graphics editor 120 in order to produce the second image.

FIG. 32 illustrates the ability of method 400 to provide a view of first image 210 in the second image displayed in VOR 186 that includes triangular object 219 previously not perceptible in first image 210, as shown in FIGS. 27 and 28. In the Gargoyle graphics editor 120 environment, triangle 219 is an editable object that the user may wish to interact with to change its position, alter its size or shape, or to perform any of the functions permitted by application 120.

Figure 47:
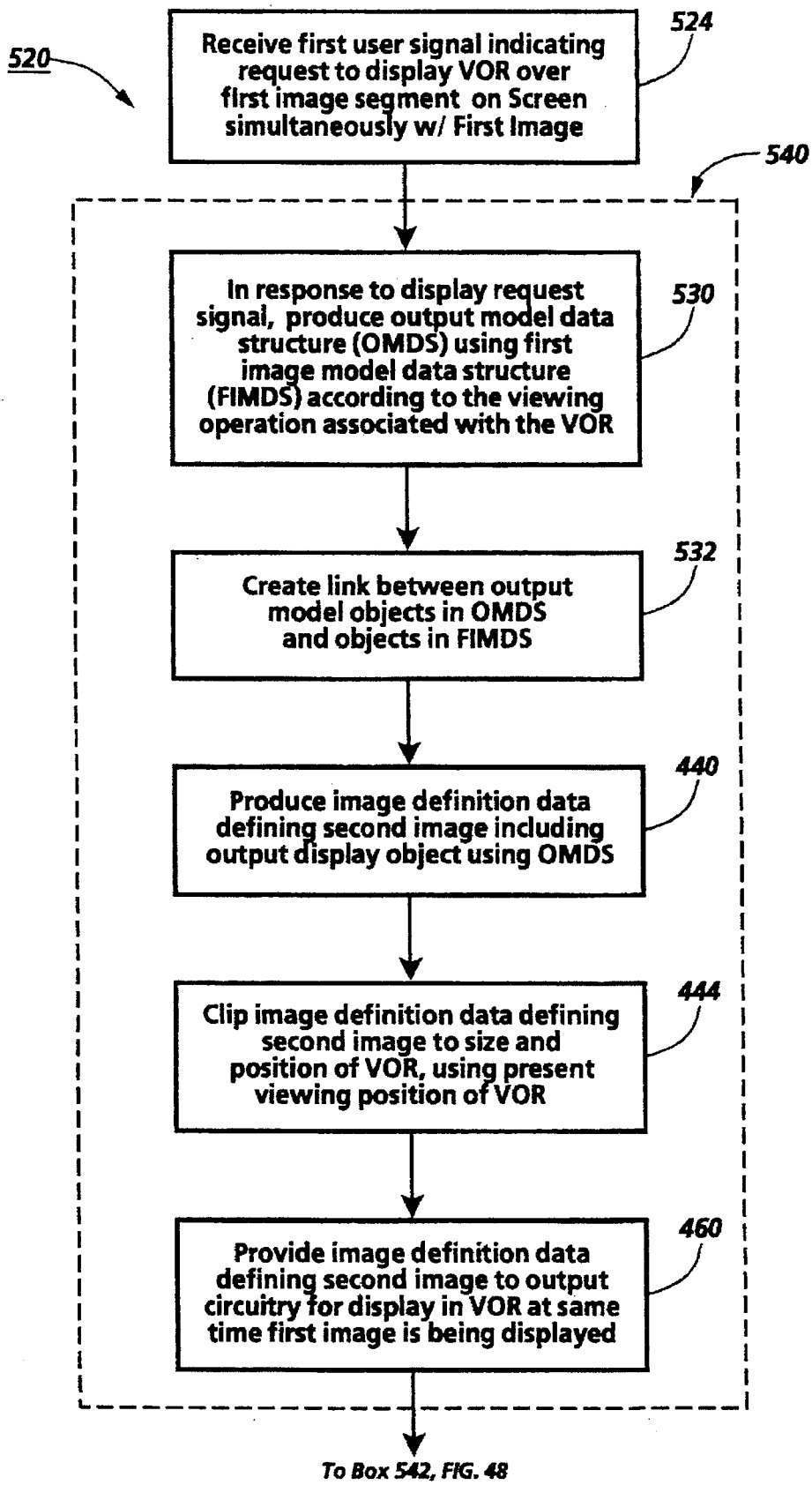
FIG. 47 is a flow chart illustrating another set of acts for producing the second image displayed in the viewing operation region illustrated in FIG. 32.
Figure 48:
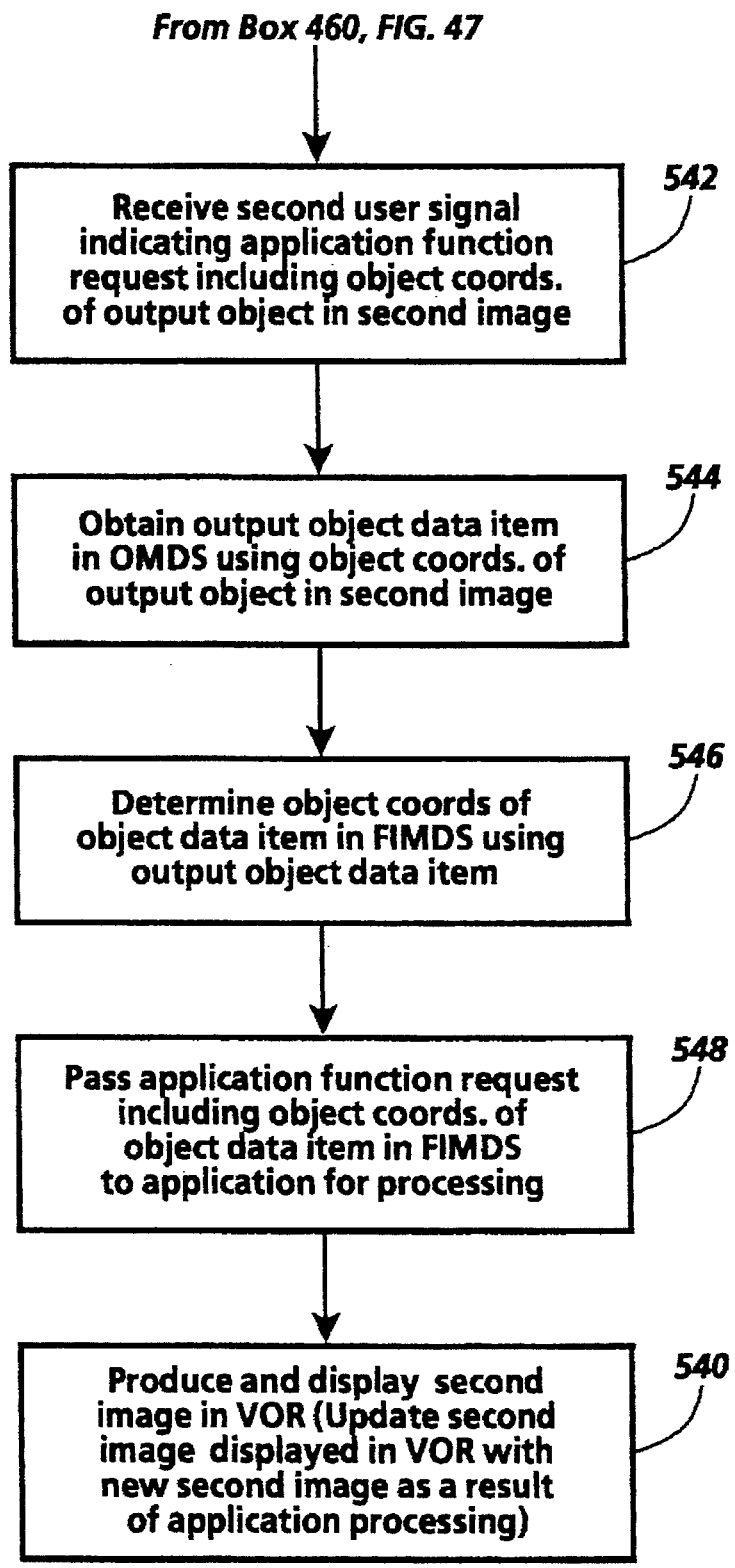
FIG. 48 is a flow chart illustrating the acts for user interaction with an object included in the second image displayed in the viewing operation region according to the method of the present invention, as illustrated in the screen displays in FIGS. 50–52.

FIGS. 47 and 48 illustrate an implementation 520 of the method of the present invention method in which the viewing operation produces a second image that includes an output display object with which the user is able to interact in order to access data in the original model. The result will be illustrated using FIG. 32. The acts illustrated in FIG. 47 utilize the model-in, model-out implementation previously described in the discussion accompanying FIG. 30 to produce the second image. A request is received, in box 524, to display the viewing operation region in a present viewing position in the display area of the machine's display device coextensive with the present image position of a first image segment of a first image. The request signal includes the x-y display coordinate position of VOR 186 in display area 180 and is passed to viewing operation 400 which, along with window manager 112, controls the display processing.

Figure 49:
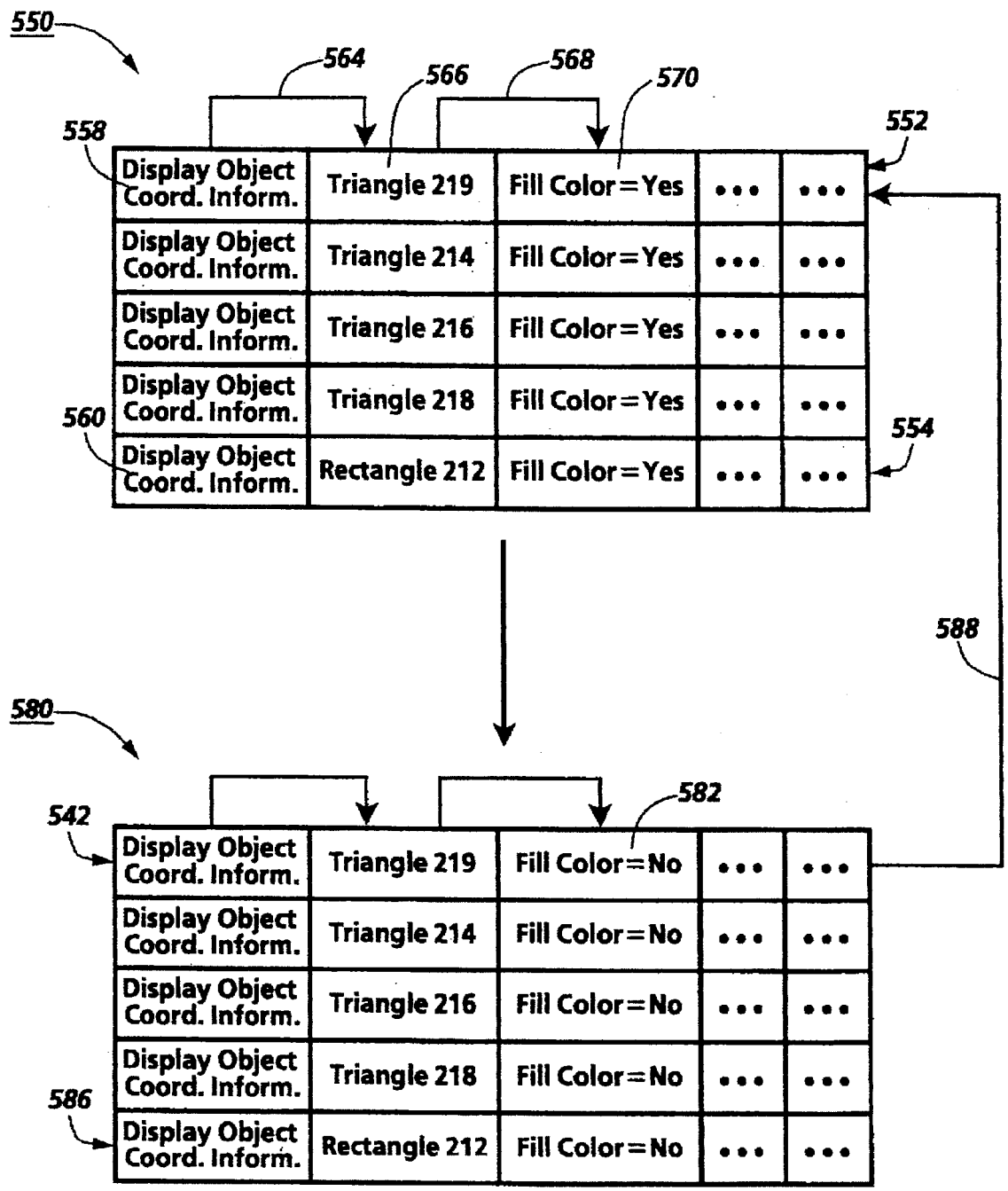
FIG. 49 illustrates modifying an exemplary model data structure according to the method illustrated in FIG. 47.

In response to the display request to display the viewing operation region, method 520 produces, in box 530, an output model data structure using the first image model data structure, mapping a first object data item in the first model to an output object data item, and creating a link between the first object data item and the output object data item, in box 532, so that access to the first object data item can be maintained through the output object data item. In the example of FIG. 32, the method copies the graphical editor data structure to an identical copied model data structure. FIG. 49 illustrates original graphical editor data structure 550 from which first image 210 in FIG. 32 was produced. Each object data item is then obtained from the copied data structure, the display feature attribute data item controlling the object's fill color is obtained, and the present value for the display feature attribute data item is replaced with a new attribute value indicating an object having no fill color. Additional details of this viewing operation are described above in the discussion accompanying FIG. 30. FIG. 49 illustrates the copied, modified data structure 580, showing the link 588 created between triangle 219 in output model 580 and triangle 219 in original model 550. The link between the two models may be a specially created data item such as a pointer from the output model back to the corresponding object in the original model, or the link may already exist in a copied data item, such as an object identification data item, or via the display object coordinate information.

Method 520 then produces image definition data defining a second image using the copied and modified data structure, in box 440. The second image is thus a modified version of the entire first image. Viewing operation 400 also determines the size and position of VOR 186, in box 444, in order to determine the size and position of the second image. Viewing operation 400 transfers control to graphical object editor application 120 at the point where application 120 produces the image definition data defining first image 210. In the case of the graphical object editor in the illustrated embodiment, this involves rendering the second image into a pixel data structure using the copied and modified model data structure and clipping it to the size and location of the VOR. The second image data is then provided to the display for presentation in VOR 186 substantially simultaneously as first image 210 is repainted in window 211.

Figure 50:
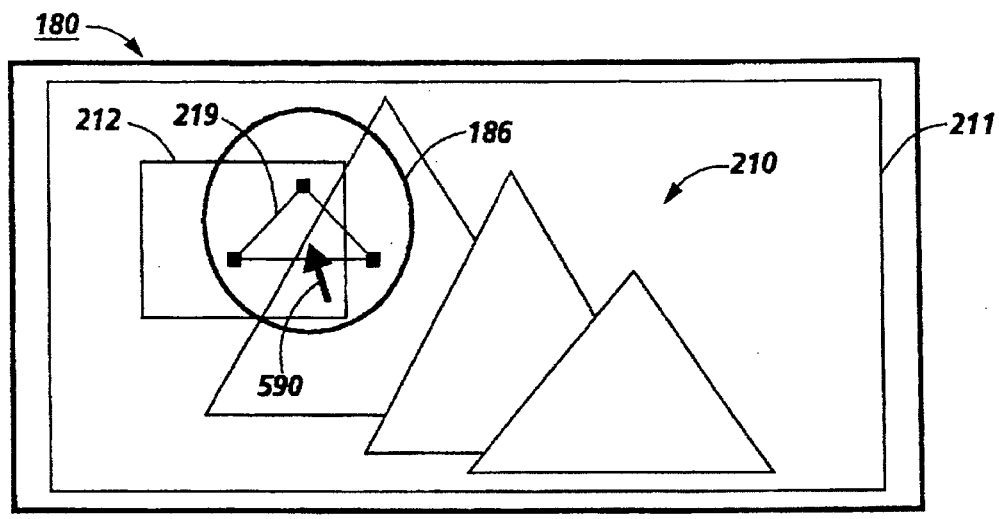
FIGS. 50, 51, and 52 illustrate a series of display screens showing the results of user interaction with an object included in the second image displayed in the viewing operation region according to the method of the present invention illustrated in FIGS. 47 and 48.
Figure 51:
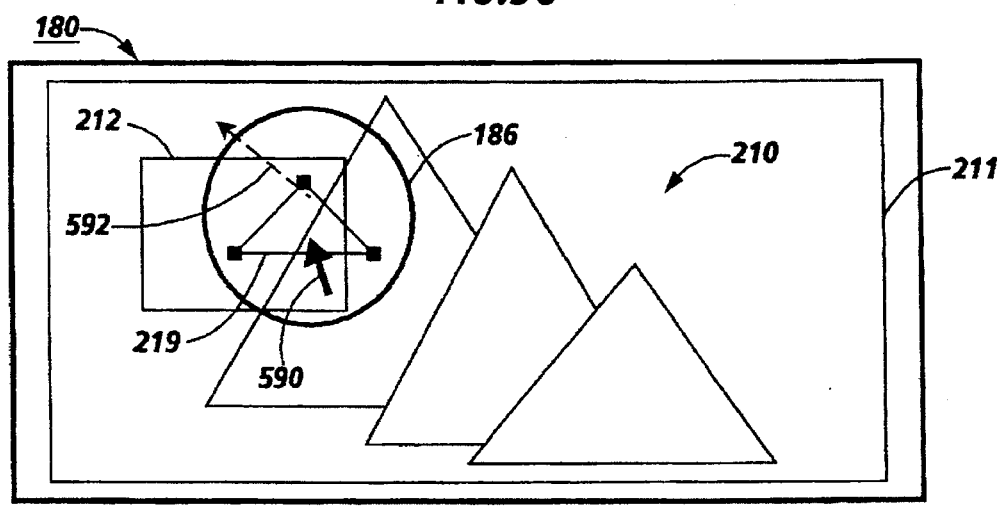
Figure 52:
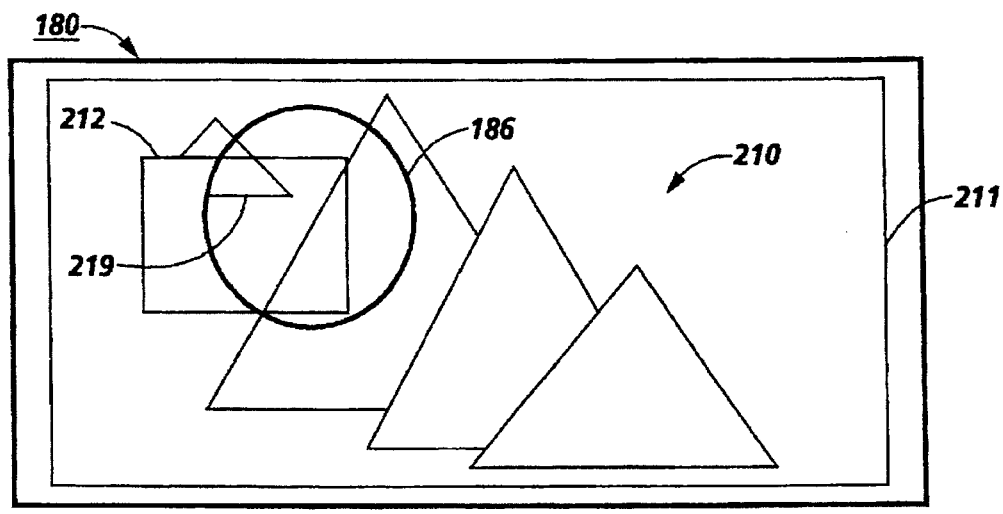

Once the output object, triangle 219 in this case, is displayed to the user in the second image displayed in VOR 186, the user is able to access it via the functions provided by application 120 (FIG. 26). FIGS. 50, 51, and 52 show screen displays illustrating such an interaction. FIG. 48 illustrates the further acts of method 520 for implementing this interaction. In the case of the illustrated graphical editor, in FIG. 50 the user positions cursor 590 in VOR 186 to select triangle 219 using a pointing input device such as a mouse, generating signals indicating a selection request that are received by processor 140, in box 542. The signals representing the x-y screen coordinates in display area 180 generated by the user's selection with the mouse are then used to obtain the output object data item in the output model, in this case, to obtain triangle 219 in output model 580, using the display object coordinate information in data structure 580 and the output object position of triangle 219 in the second image. Then, in box 546, the display object coordinates 558 of triangle 219 in first model 550 are determined using link 588 to access first model 550. In the case of a viewing operation that does not alter display object coordinates when it creates the output model, either the object position of triangle 219 in the second image or the object identification of triangle 219 in the second model 580 can be used to access the first model 550, and the determination step of box 546 is trivial. However, as will be illustrated below, if the transformation alters the coordinates, the determination step of box 546 becomes nontrivial.

The display object coordinates of triangle 219 in the first model are then passed to application 120, in box 548. These coordinates are used by application 120 according to the functionality defined in the application. In graphical editor 120, selection is acknowledged to the user by means of showing small points at the corners of the selected object, and producing the first image showing the selected object. The selection requires the application to change an object property in object description data item 552 representing triangle 219 in model 550. Since triangle 219 is within VOR 186, the change to the perception of a display object in the second image requires method 520 to update the second image, in box 540, by producing and displaying the second image again.

Since model data structure 550 has been changed, in the model-in, model-out implementation illustrated in method 520, a new copy of the first image model data structure must be made; thus, the flow chart in FIG. 48 illustrates that all of the component steps in dotted line box 540 in FIG. 47 are repeated to provide an updated second image in VOR 186. There are processing efficiency alternatives to making a complete new copy of the model whenever it is somehow changed, either as a result of the user's interaction or by some other means. Changes that are made to the first model 550 may be simultaneously made to the output model 580 as well, or some combination of making changes to and using reference pointers with the existing, modified copy of the first model may be implemented so that the existing, modified copy contains substantially the same information that a new copy would contain.

FIGS. 51 and 52 illustrate another example of interacting with triangle 219. FIG. 51 illustrates a user using cursor 590 to select and move triangle 219 to a new position along dotted line 592. The x-y coordinates indicating the starting and ending positions of the cursor movement are received by the processor and passed to the application for processing. The selection and movement requires the application to change model data structure 550 to change the display object coordinate information in data item 558 to reflect the new position of triangle 219. Again, since model data structure 550 has been changed, a new copy must be made (or the alternative approach described above may be used), and the component steps in dotted line box 540 in FIG. 47 are repeated in order to show the updated second image in VOR 186, in FIG. 52, illustrating triangle 219 in its new location, without the selection points, signifying that it is no longer selected. Note that, as a result of the user's movement, the portion of triangle 219 outside of VOR 186 remains hidden behind rectangle 212.

Figure 53:
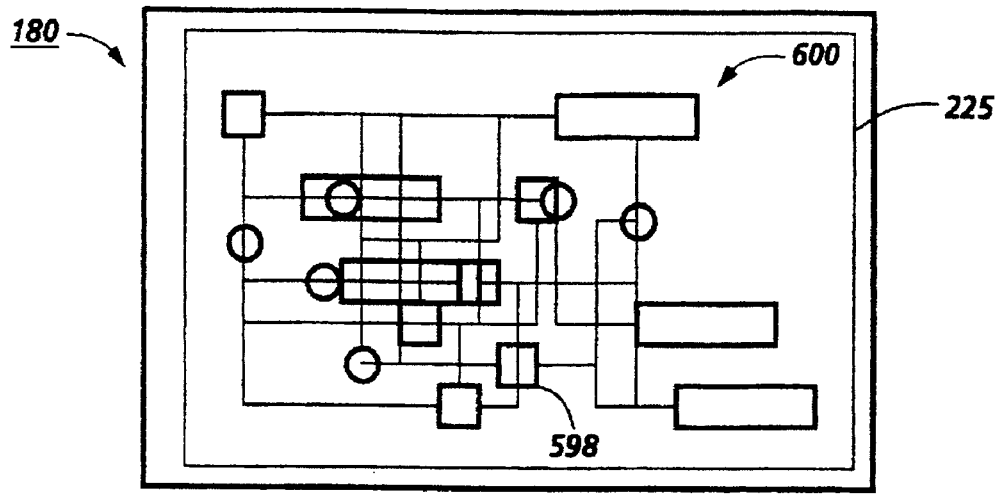
FIGS. 53, 54, 54A and 55 illustrate another series of display screens showing the results of user interaction with an object included in the second image displayed in the viewing operation region according to the method of the present invention illustrated in FIGS. 47 and 48.
Figure 54:
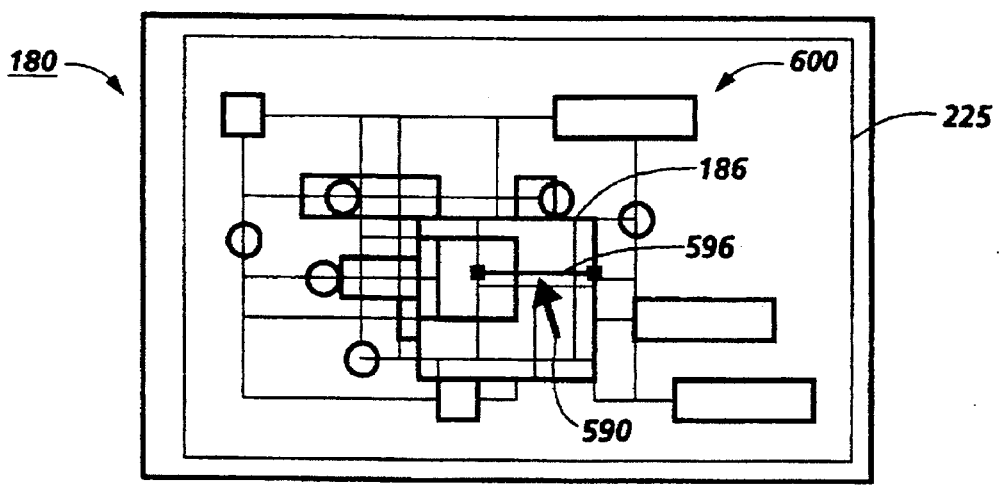
Figure 54A:
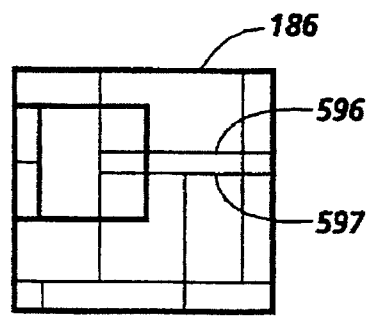

Method 520, like the other method implementations previously discussed, is intended to encompass a wide variety of viewing operations, and is not limited to the illustrated embodiment in which a display feature attribute data item is modified. In some cases, a first image may simply contain too many or very small details that prevent a user from perceiving display objects clearly or at all, or prevent the user from directly accessing those display objects with a pointing device. FIGS. 53, 54 and 54A illustrate another example of how method 520 may be used to facilitate the user's interaction with data and information in a model data structure. FIG. 53 illustrates image 600 containing a complex, detailed diagram of interrelated and connected objects. The method of the present invention may be used to enlarge the scale of a portion of image 600 to permit closer inspection and interaction with individual objects. In FIG. 54, the viewing operation associated with VOR 186 scales the objects in image 600 to appear larger. FIG. 54A shows the second image displayed in VOR 186 including enlarged detail of a segment of image 600, and showing two connecting line objects 596 and 597, where only one seems to appear in the first image 600 shown in FIG. 53. Using the enlarged detail, the user is able to position cursor 590 to select line object 596 for further manipulation. In order to select line 596, box 546 of FIG. 48 must include processing for finding the display coordinates for line 596 in the first model by performing the inverse scaling transformation on the x-y coordinates of line 596 in the second image, and use those coordinates to access the line object in the first model. Similarly, if an object is rotated or skewed or otherwise changed in orientation by a viewing operation, the inverse transformation must be applied to the coordinates of the object the user interacts with in the second image in order to access it in the original model.

Figure 55:
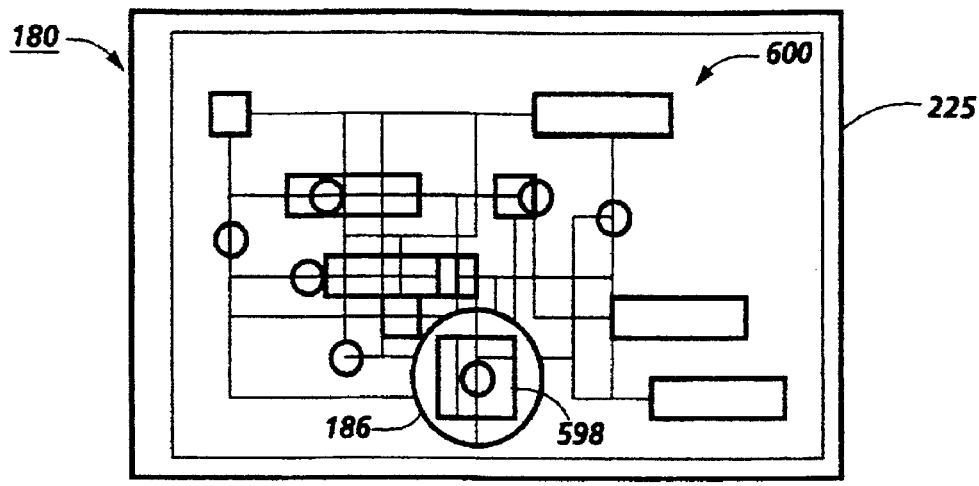

The steps illustrated in method 520 may also be modified to make use of viewing operations that employ object selection or object highlighting, as described above accompanying the discussion of the flow charts in FIGS. 15 and 25. For example, the viewing operation associated with a viewing operation region may select only a specific type of display object and show related detail objects that are not otherwise perceptible in the original image for only the selected object. FIG. 55 illustrates a viewing operation associated with VOR 186 that selects the square objects in FIG. 53, such as object 598, enlarges the scale of the object, and shows interior detail objects.

The steps illustrated in method 520 may also be modified to implement certain features of the application only in the spatial domain of the viewing operation region. For example, graphics editor 120 has a "grid" feature which the user may control independently to cause a regularly spaced pattern of dots to appear in subwindow 211 to aid the user in spacing and positioning graphical objects in an image. The grid display feature is typically controlled by a data item that functions as a global parameter for turning the grid pattern "on" or "off". A viewing operation associated with the viewing operation region may be implemented so as modify the grid display feature data item to "on" in order to show the grid only within the boundary of the viewing operation region, and then permit the user to interact with application 120 to make use of the grid within the VOR boundary to manipulate objects in the image. Once displayed in the VOR boundary, the grid may be fixed in position relative to the image, and when a VOR is moved from one position to another over the image, the grid may be made to appear fixed relative to the image, but still only displayed in the VOR, while the VOR moves to a new position over a new image segment.

The steps of method 520 may be further modified to show output display objects in a second image that are mapped from a second model data structure linked to the first model, both models being capable of being operated on by the application. For any first display object included in the first image segment under the VOR, a second object data item indicated by, or linked to or pointed to, by the first object data item represented by that first display object may be accessed and mapped to the output model from which the second image is produced.

Method 520 also supports providing user interaction with output display objects in composite images produced from composing viewing operations. Using the model-in, model-out method for composing viewing operations described in the copending application, 08/096,193, now U.S. Pat. No. 5,479,603, entitled, "Method and Apparatus for Producing a Composite Second Image in the Spatial Context of a First Image", as long as the output model created by a viewing operation maintains the necessary link back to the objects in the input model that were mapped by the viewing operation to the output model, then the coordinates of an output display object selected in a composite image may be passed for processing to the application. If an object is enlarged, rotated, skewed or otherwise changed in orientation by any one of the viewing operations resulting in the composite image, the inverse transformation for each such viewing operation must be applied, in the reverse order of composition, to the coordinates of the object the user interacts with in the second image in order to access it in the original model.

The nature of the functional interaction the user has with output display objects in the second image is determined by the functionality of the application, since method 520 passes the user's functional request signals directly to the application. Thus, the method of the present invention may provide a powerful enhancement to the functionality of an application by providing additional access to data in a model data structure.

6. Using viewing operations and viewing operation regions for temporally and spatially bounded "what-if" model changes The illustrated embodiment of method 400 shown in flowcharts 29 and 30 and illustrated in FIGS. 32 and 34 provide a user of the method with the ability to apply spatially and temporally bounded changes, via a viewing operation associated with a viewing operation region, to a model data structure, and to view the impact and affect of those changes within the context of an entire original image to which the changes were applied. The effect of the changes may be to reveal objects previously not perceptible in the original image, as in the case of the method 520 (FIGS. 47 and 48), or it may be to simply change the appearance of the image within the boundary of the VOR, as illustrated in FIG. 34 in VOR 240 which changes the fill color of objects to blue. Associating the ability to spatially and temporally change the model with a user-specified region that defines the spatial context of the change provides the user with the ability to formulate "what-if" scenarios with an image, in order to view the impact of contemplated changes without actually applying the changes to the model. Most commonly, such changes are likely to include changing a display feature attribute of a display object, such as illustrated in FIGS. 32 and 34 and already described. However, it is intended that the method of the present invention also include changes to a model such as adding objects to the model, deleting certain objects from the model, and replacing an existing display object representing data in the model with a different display object. In the context of a graphical editor environment, such changes provide the user with enhanced artistic or information content control over the final image to be created by allowing a spatially and temporally bounded previewing of changes before they are actually applied to a model.

Figure 59:
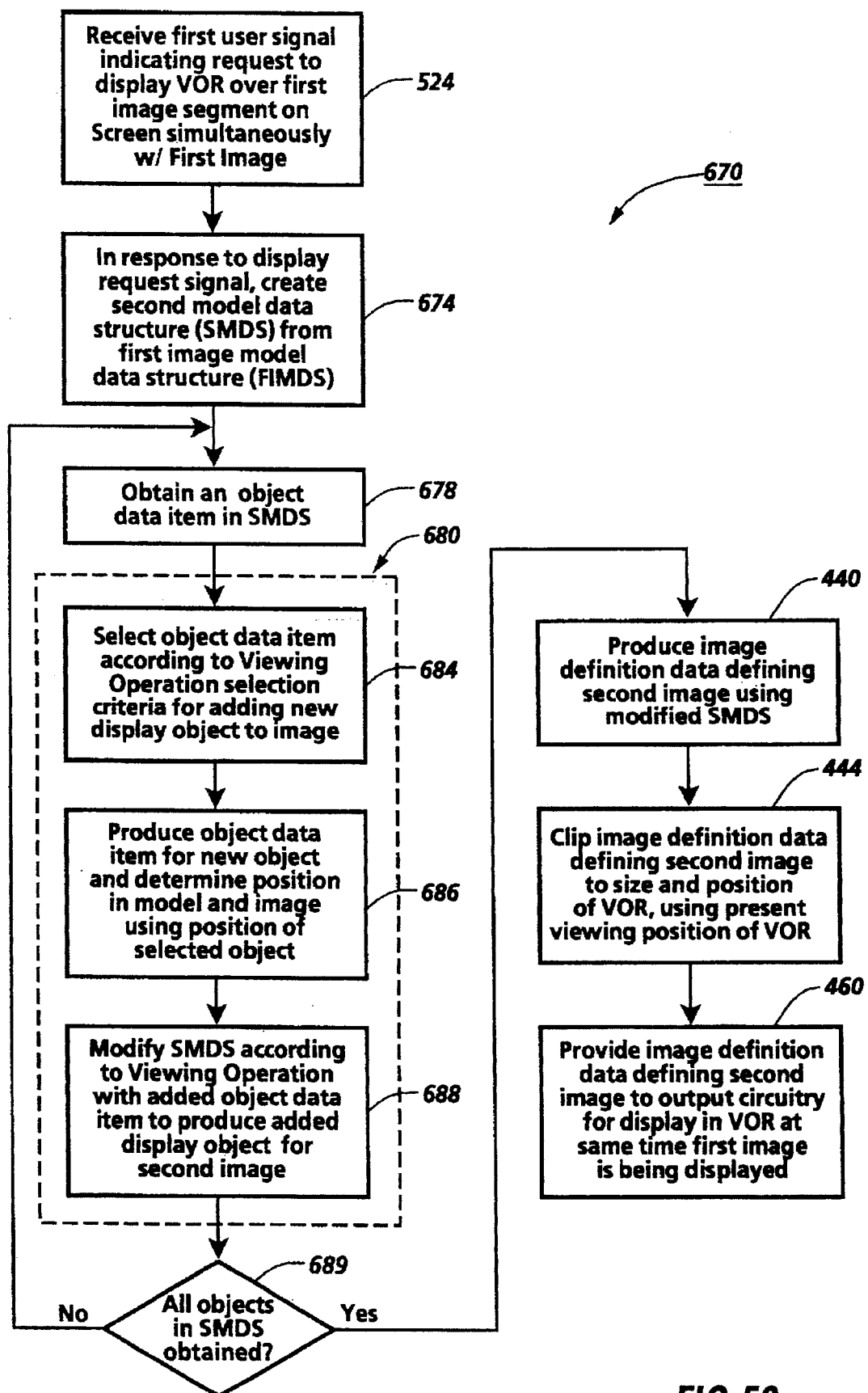
FIG. 59 is a flow chart illustrating the set of acts for producing the second image displayed in the viewing operation region illustrated in FIGS. 60, 61, and 62.
Figure 63:
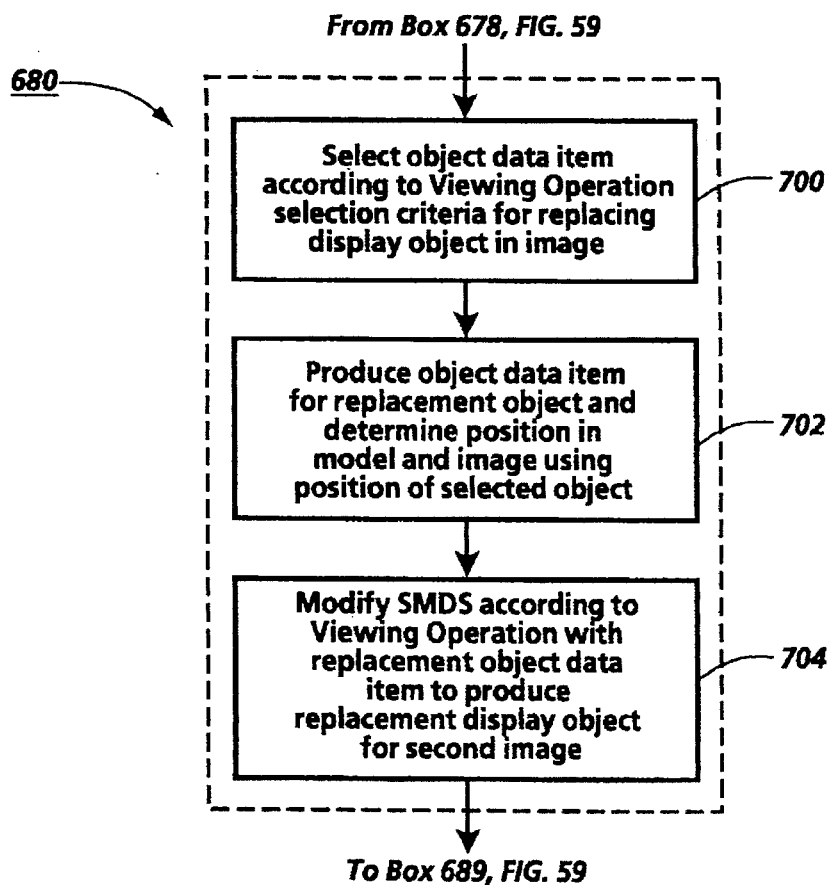
FIG. 63 is a flow chart illustrating an alternate set of acts for box 680 in FIG. 59 for producing the second image displayed in the viewing operation region illustrated in FIG. 65.
Figure 64:
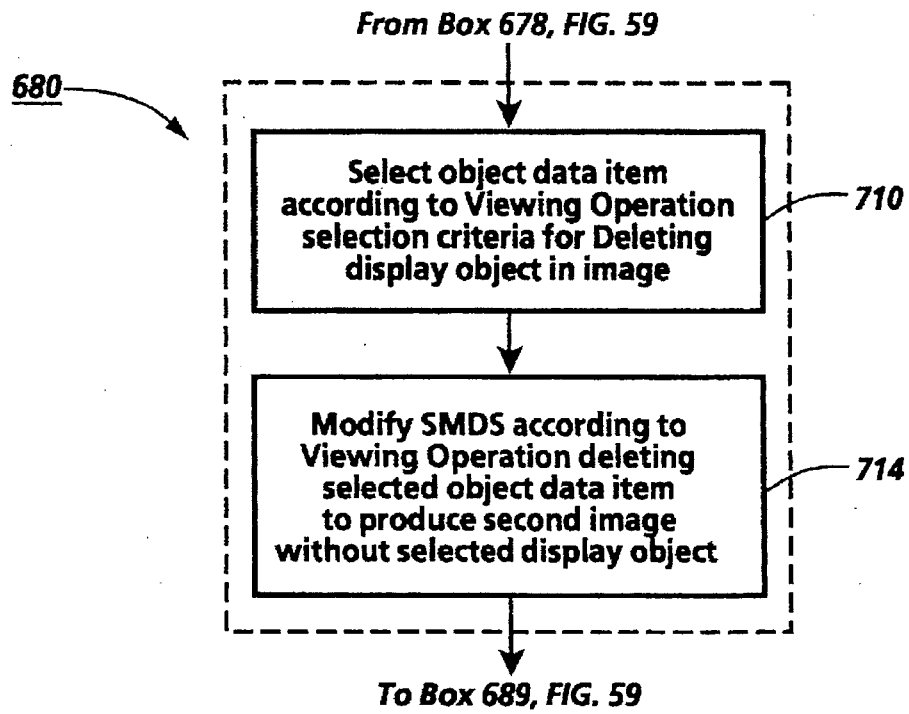
FIG. 64 is a flow chart illustrating an alternate set of acts for box 680 in FIG. 59 for producing the second image displayed in the viewing operation region illustrated in FIG. 66.

In this environment, the functionality and features of method 400 (FIGS. 29 and 30) and method 520 (FIG. 47) may be extended to include implementation 670 shown in the flowcharts in FIGS. 59, 63, and 64. FIG. 59 illustrates the set of acts for producing a second view of an original image that includes a second display object added to a first display object included in a first image segment. The result is shown in the display screens illustrated in FIGS. 60 and 61. The acts illustrated in FIG. 59 utilize the model-in, model-out implementation previously described in the discussion accompanying FIGS. 30 and 47.

With reference to FIG. 59, a request is received, in box 524, to display the viewing operation region in a present viewing position in the display area of the machine's display device coextensive with the present image position of a first image segment of a first image. The request signal includes the x-y display coordinate position of VOR 186 in display area 180 and is passed to viewing operation 400 (FIG. 26) which, along with window manager 112, controls the display processing. The viewing operation associated with the VOR in this illustrated implementation maps display objects in the first image to a second image showing the display objects having added drop shadows.

In response to the display request to display the viewing operation region, a second model data structure is created, in box 674, from the original image's model, the graphical editor data structure in this case. The second model functions as a copied first image model data structure, but need not necessarily be a full copy of the original model. Various implementation efficiencies associated with the requirements of the viewing operation may be used to create the second model. These include techniques such as using reference pointers to object data items in the original model that are not modified by the viewing operation, or creating a list of only modified or unmodified object data items from the original model, or creating an entire copy of the model when that implementation is the most efficient for the viewing operation. Combinations of the techniques may be used as well. Reference to the second model hereafter, then, will refer to a second model that functions as a copy of the first model but which may be implemented using any suitable technique for accomplishing the effect of copying the first image model.

Then, in box 678, each object data item is obtained from the second model. In the set of boxes in dotted line box 680, processing for adding the drop shadows to the display objects in the first image segment is performed. Each object is compared to selection criteria in box 684 for selection as an object to which a drop shadow is to be added. In box 686, the object data item representing the new display object (the drop shadow object) is produced, and, in box 688, the second model data structure is modified for the selected object according to the viewing operation in order to produce a second image having a drop shadow added to the selected display object. The viewing operation contains operations, or utilizes operations in the supporting application, for producing the necessary data items for modifying the second model. These modifications may include modifying object data items in the second model that relate to the display of an object having an added drop shadow to accomplish, for example, correct positioning and orientation of the drop shadows and of surrounding objects. The viewing operation may utilize other data objects in the first image model data structure to produce the desired effect, or may obtain data items from in a second model linked to the first model in order to produce the desired effect.

Then, after determining that all objects in the second model have been obtained and compared for selection, in box 689, image definition data defining a second image is produced using the copied and modified data structure, in box 440. The second image is thus a modified version of the entire first image. The size and position of VOR 186 is also determined, in box 444, in order to determine the size and position of the second image. Control is then transferred to graphical object editor application 120 (FIG. 26) at the point where application 120 produces the image definition data defining first image 210. In the case of the graphical object editor in the illustrated embodiment, this involves rendering the second image into a pixel data structure using the copied and modified model data structure and clipping it to the size and location of the VOR, in box 444. The second image data is then provided to the display, in box 460, for presentation in VOR 186 substantially simultaneously as first image 210 is presented in window 211.

Figure 60:
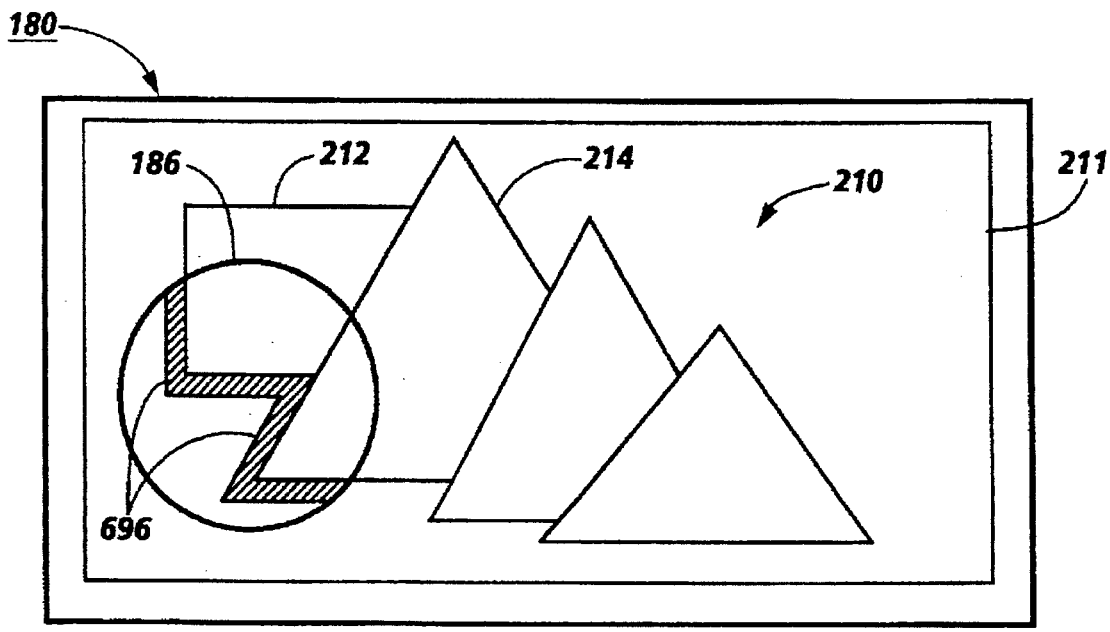
FIGS. 60 and 61 illustrate a series of display screens showing the results of the method of the present invention illustrated in FIG. 59 and having a viewing operation that adds drop shadows to image objects.
Figure 61:
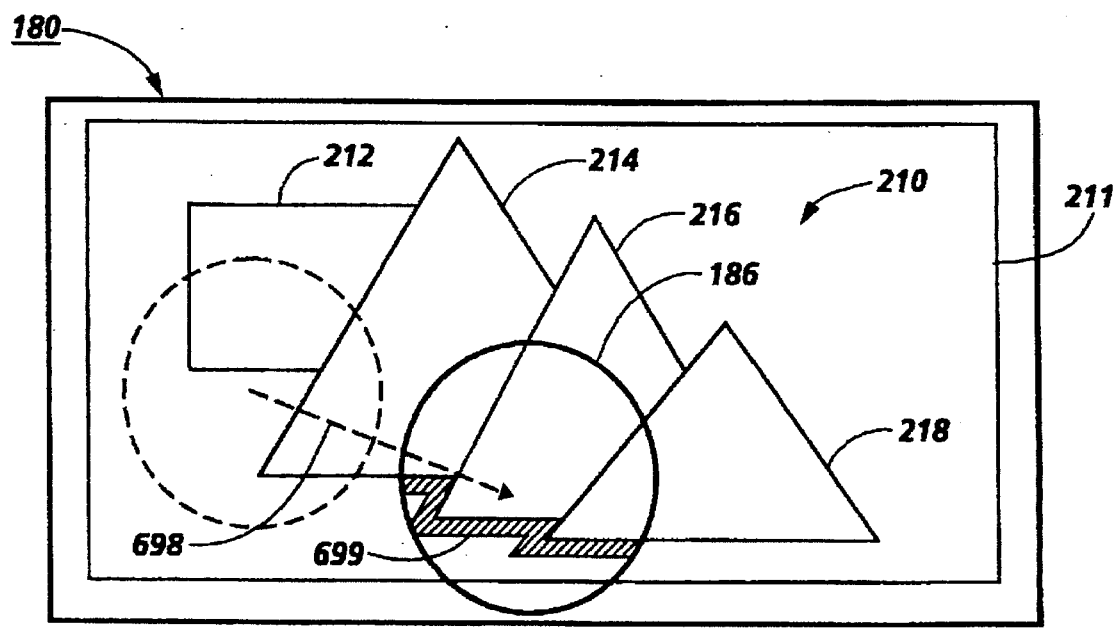

FIG. 60 shows rectangle 212 and triangle 214 in image 210 having drop shadows 696 added within the boundary of VOR 186 as a result of performing method 670. VOR 186 may now be positioned anywhere over image 210 in order to see the effect of applying drop shadows to the objects in image 210. In FIG. 61, VOR 186 is moved along dotted line 698 to a new position, the steps of method 670 are repeated, and the second image displayed in VOR 186 shows drop shadows 699 added to triangles 214, 216 and 218. As mentioned earlier, the copied and modified model data structure may be stored in the memory of the machine, and, as long as no intervening changes have been made to the first image model data structure, only steps 440, 444, and 460 of method 670 need be repeated for subsequent movements of the VOR over image 210.

Figure 62:
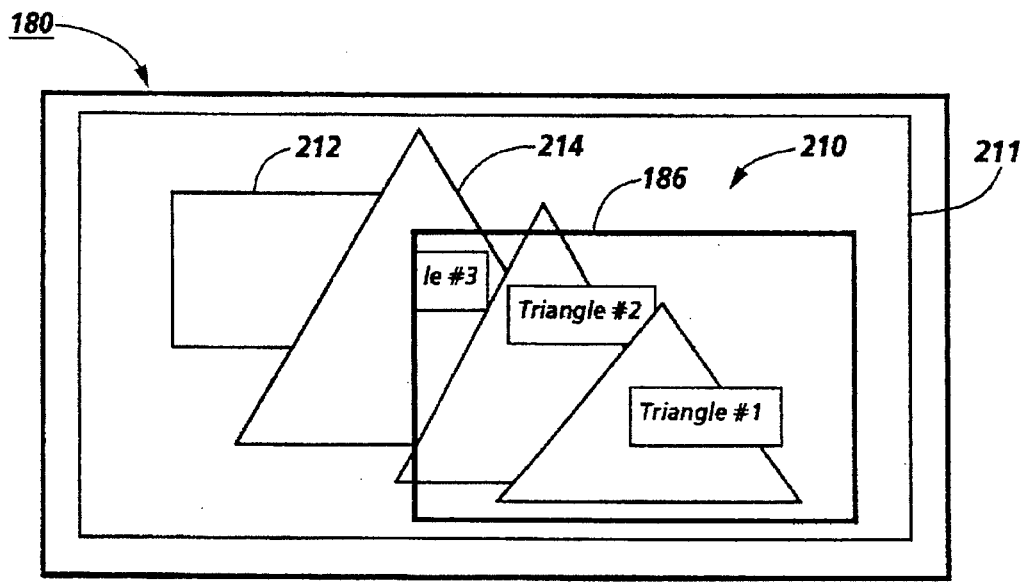
FIG. 62 illustrates a display screen showing the results of the method of the present invention illustrated in FIG. 59 and having a viewing operation that adds text labels to image objects.

Method 670 is intended to encompass a wide variety of viewing operations that add new display objects to an image. FIG. 62 illustrates another example of method 670 in which the viewing operation associated with VOR 186 adds labels to objects in first image 210.

In some examples of added objects, the second model may only contain the added objects, and the rendering of the image in box 440 may include rendering the first image using the original model as the second image in the VOR, and then rendering the second image again using the second model. In the case of the label example in FIG. 62, this would have the effect of placing the labels on top of all objects in the second image.

Figure 65:
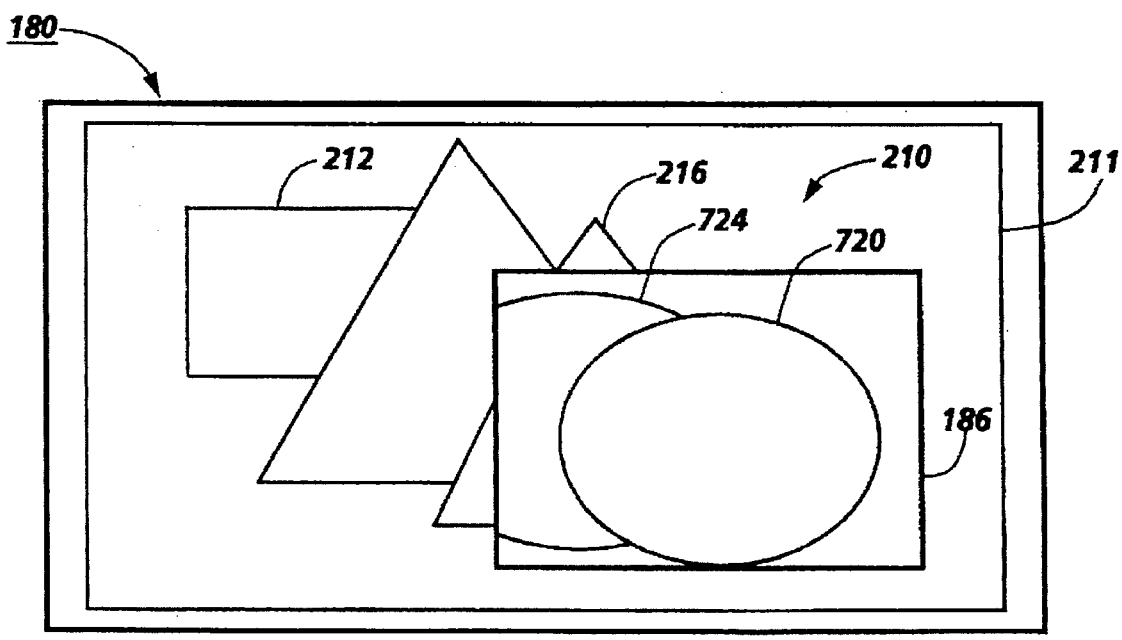
FIG. 65 illustrates a display screen showing the results of the method of the present invention illustrated in FIGS. 59 and 63 and having a viewing operation that replaces first image objects with new objects.

FIGS. 63 and 64 each illustrate an alternate set of acts for box 680 in FIG. 59 for performing different viewing operations on the second model data structure. In FIG. 63, the viewing operation replaces a selected object in the second model with a different object. After selecting an object data item in the model for which a replacement object is to be produced in the second image, in box 700, an object data item represented by the replaced object in the image is produced in box 702. Then, the second model is modified to include the replacement object data item and to incorporate any other changes needed to replace the selected display object. The viewing operation associated with VOR 186 in FIG. 65 replaces triangular display objects with ellipses. The portion of triangle 216 within the boundary of VOR 186 is replaced by ellipse 724, and triangle 218 (see FIG. 61) has been entirely replaced with ellipse 720.

Figure 66:
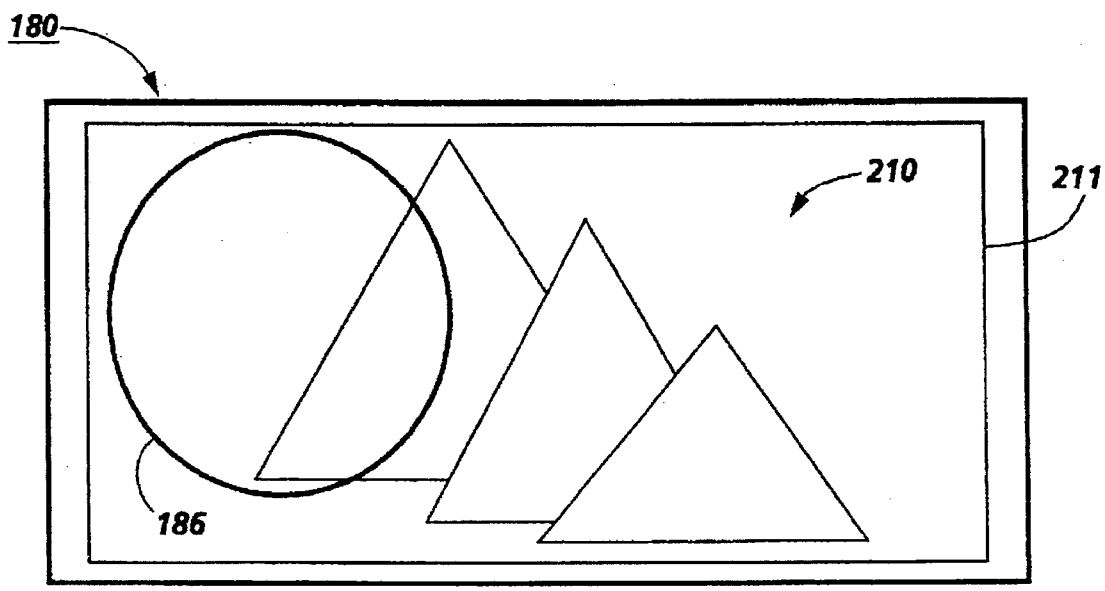
FIG. 66 illustrates a display screen showing the results of the method of the present invention illustrated in FIGS. 59 and 64 and having a viewing operation that deletes a first image object.

The acts generally illustrated in FIG. 64 modify the second model data structure to delete objects selected by the viewing operation from an original image. FIG. 66 shows rectangle 212 deleted from the second image within the boundary of VOR 186.

The combination of adding, deleting and replacing objects in a first image, along with changing display feature attributes, may be incorporated into a viewing operation associated with a VOR to achieve a wide range of temporally and spatially bounded artistic and illustrative effects in the second image displayed within a VOR, and method 670 is intended to encompass all such effects. For purposes of illustration only and not limitation, such effects in the graphical illustration domain may include converting an image segment from a rendered drawing into a line drawing, such as in scientific illustration; producing artistic vignette effects in the second image; and adding borders or fancy fonts to the second image. In addition, method 670 may also serve as a feature for enhancing the design capabilities of an application by permitting the temporally and spatially bounded addition, deletion, or replacement of design elements, surface features, and object properties to an image. Moreover, method 670 may also be applied to other domains as well, such as the text and spreadsheet domains.

7. User selection of an input parameter and user interface implementation details a. User selection of input parameters for viewing operations In the method of the present invention illustrated in the graphical user interface environment of FIG. 26 as functionally cooperating with an application, such as the graphical object editor, the user may be permitted to interact with the viewing operation associated with the VOR by using conventional techniques such as sliders, buttons, software dials and so forth, that are arranged around the VOR or that the user may cause to appear, such as a dialogue box. The user's interaction may affect or modify the operation of the viewing operation by specifying an operating parameter, such as providing the new attribute value that is to be used to change the first display feature in the graphical editing example illustrated in FIG. 32. The user can specify the attribute value before moving the VOR to a new position, or after the method of the present invention has produced and displayed the second image in the VOR, the user can subsequently specify a new attribute value to be used to produce a different second image in the VOR positioned in the same present viewing position. For example, in the illustrated embodiment, the second image in FIG. 32 reveals the hidden lines of objects within the boundary of the VOR. This viewing operation could be implemented to accept from the user a line parameter such as "solid" versus "broken" or a line thickness parameter.

Figure 56:
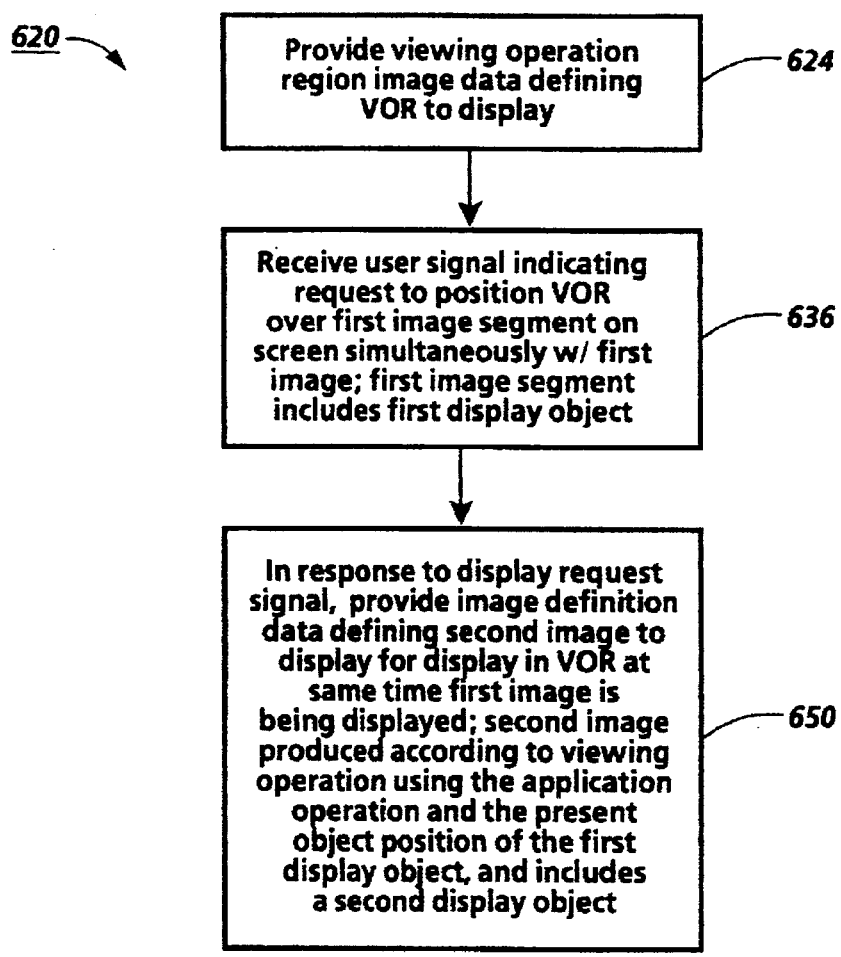
FIG. 56 is a flow chart illustrating the set of acts for producing a second image for display in the viewing operation region according to an implementation of the method of the present invention as an enhancement to a user-directed application.

The method of the present invention may also be implemented to permit a user to specify a display object in the first image, using the selection processing function of the application, as an input parameter to the viewing operation associated with a VOR on which the viewing operation is to operate. When the user specifies a selected display object as the input parameter may be implemented in any one of at least three ways. FIG. 56 illustrates another variation of the method of the present invention. In method 620, a viewing operation region is provided to the output circuitry for display, in box 624, in a first position in the display area simultaneously with the display of the first image. The VOR has a viewing operation associated with it defining a mapping between the display object in the first image and image definition data defining a second image including a second display object. Next, the user supplies a request signal changing the position of the VOR to a present viewing position over a first image segment including a first display object in the first image. In response to this signal data, the method then provides, in box 650, the image definition data defining the second image to the display, producing the second image according to the mapping defined by the viewing operation, using the application operation and the present object position of the first display object in the display area.

Figure 57:
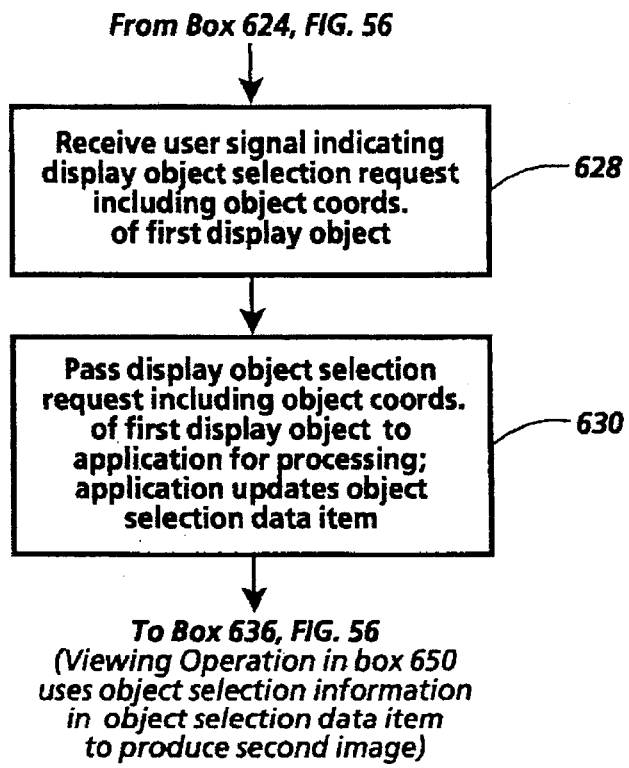
FIGS. 57 and 58 are flow charts illustrating alternative additional acts for selecting a display object in an original image as an input parameter to the viewing operation.
Figure 58:
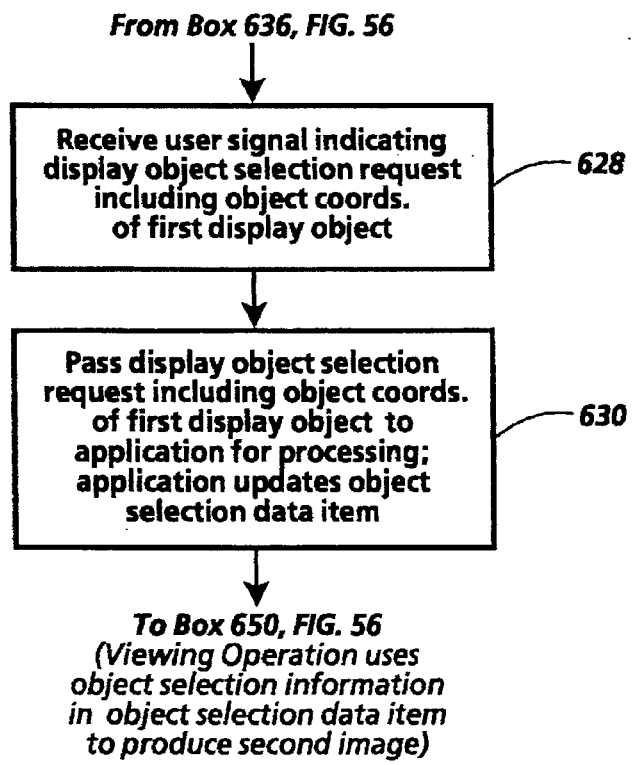

FIGS. 57 and 58 illustrate two alternatives for selecting the display object on which the viewing operation is to operate. In the first one illustrated in FIG. 57, the user may select a display object using the application selection processing prior to positioning the viewing operation region over a first image segment. In this variation, before the VOR is positioned over a first image segment, a user selection signal is received, in box 628, indicating a display object selection request and including the present object position of the first display object. The user selection signal is then passed to the application for standard selection processing, in box 630. This may include, for example, changing the color of the selected object to show that it has been successfully selected. The application then updates an object selection data item indicating the coordinates of the selected object. Processing then continues with the operation in box 636, where the user positions the VOR over a first image segment including the selected display object. Processing in box 650 includes obtaining the object selection data item indicating the coordinates of the selected object for use by the viewing operation.

In the second variation illustrated in FIG. 58, the VOR is positioned over a first image segment including the first display object, in box 636. However, processing for providing the second image in box 650 does not begin until a display object in the first image segment has been selected by the user. FIG. 58 illustrates the same acts as FIG. 57 but in a different processing sequence.

In still a third variation for selecting an input display object as an input parameter, the viewing operation region itself may have a perceivable selection display feature or predetermined position associated with it. The perceivable selection display feature may be an arrow, or a caret, or some other symbol. When the user positions the VOR in a present viewing position coextensive with the present position of the first image segment, the user selection request is determined to be the display object located at the position of the perceivable selection display feature in the VOR, or located relative to a predetermined fixed position in the VOR, such as at the geometric center or the upper right corner of the VOR. The viewing operation may optionally provide confirmation to the user of the selected display object, such as by highlighting the selected display object.

In a system providing for multiple viewing operation regions, each viewing operation region having a different viewing operation associated with it, a uniform selection mechanism can be easily achieved and learned by the user when each viewing operation region follows the same selection method.

b. User interface implementation details

In the illustrated embodiment, the VOR is implemented in a subwindow and can be manipulated like other subwindows using conventional window manipulation techniques. For example, the VOR can be re-sized by the user, and otherwise moved in any conventional manner. A mouse click can be used to select an unselected VOR, and to deselect a selected VOR.

To accommodate other useful functionality, a series of displayed features operating as buttons can be implemented for hiding a displayed VOR from view (i.e., making it "invisible"), when the user wants to view the first image without the VOR in the display area, and for exposing a previously hidden VOR. The method may also support an irregularly shaped VOR, with buttons for drawing a new shape and adding or subtracting it to the VOR as currently shaped. There may also be buttons for creating a VOR and associating it with its desired functionality using conventional menu techniques, and for deleting a VOR from the display area.

The user signal indicating the re-sizing or reshaping of the VOR, or the input of a parameter to the method, will also then cause the method to produce image definition data defining the second image again, the second image conforming to a new size, or shape, or showing a modified display feature resulting from using the input parameter provided by the user.

D. Implementation as an independent application in a window environment

Figure 36:
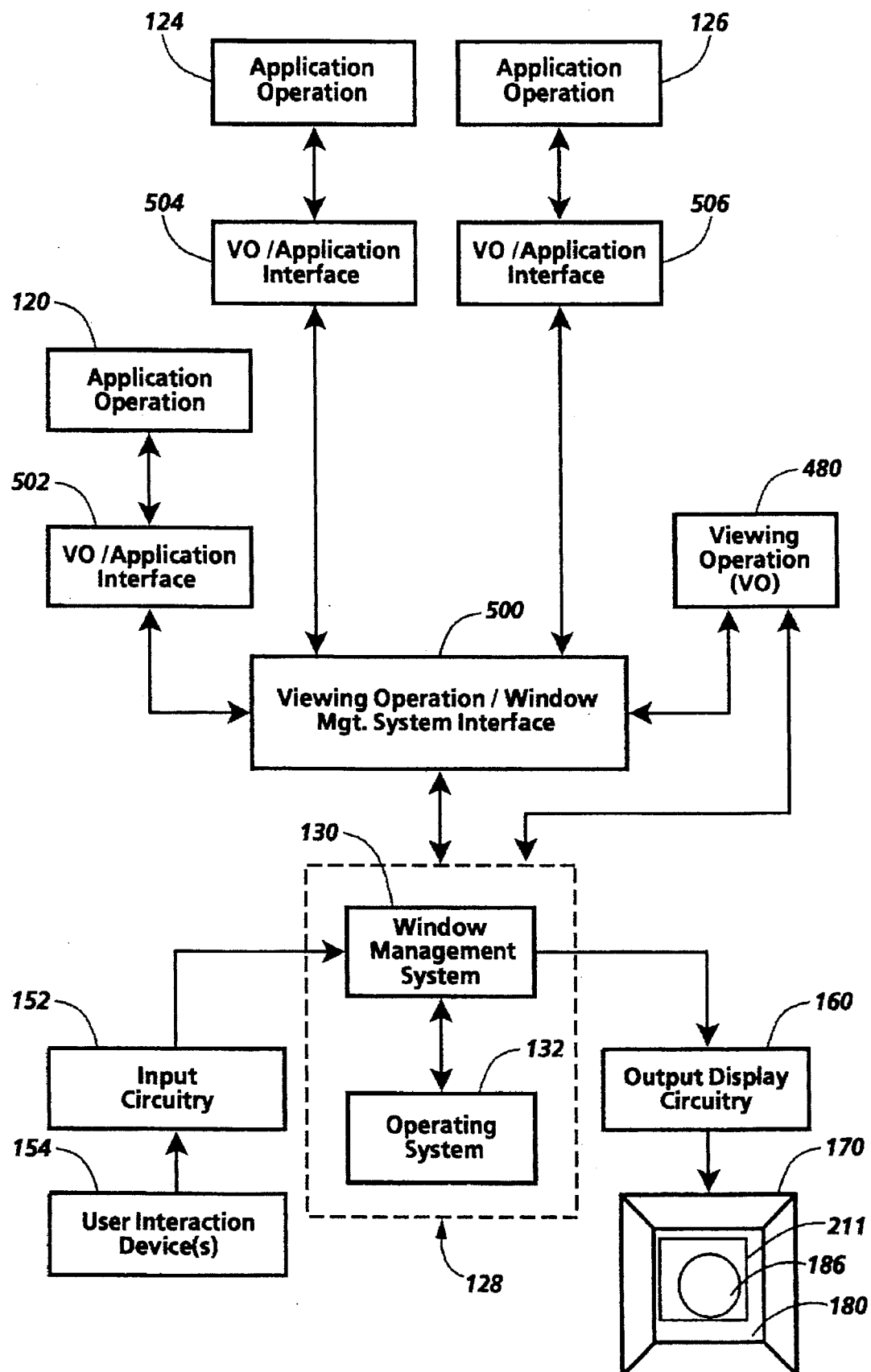
FIG. 36 is a block diagram illustrating the systems components of an alternative embodiment of the method of the present invention operating as an independent application in a multiple-window, window management environment.

FIG. 36 illustrates another systems environment in which the method of the present invention is intended to operate. Operating system environment 128, which includes operating system 132 and window management system 130, is a conventional or standard operating system environment supporting a graphical user interface. Examples of operating system environment 128 may include, but are not limited to, personal, workstation, and mainframe computer operating systems provided by Apple Computer, Microsoft, Hewlett Packard, Sun Microsystems, IBM, Next, Digital Equipment Corporation, and Unix Systems Laboratories. The method of the present invention is also intended to operate in operating system environment 128 where an industry standard software user interface platform, such as the X Window System® (a trademark of Massachusetts Institute of Technology), is provided as window manager 130.

Figure 37:
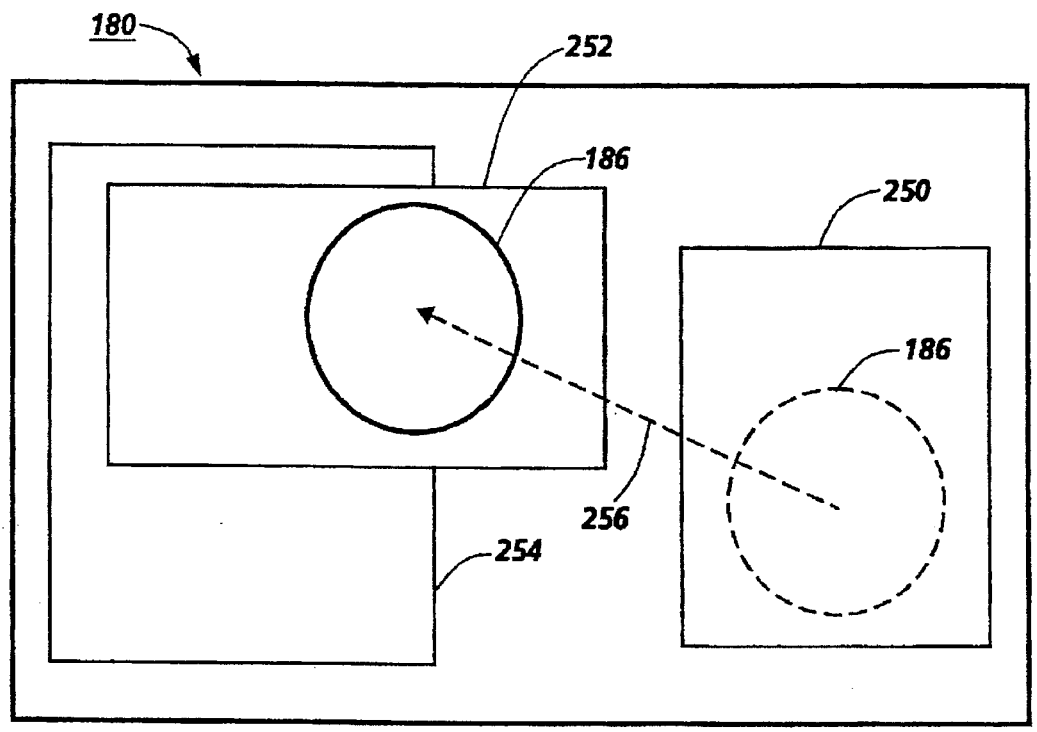
FIG. 37 illustrates a display screen generally showing the multiple windows of the alternative embodiment illustrated in FIGS. 36 and 38.

FIG. 37 illustrates display area 180 in the multi-window, multi-application environment 128 of FIG. 36. Applications 120, 124, and 126 are representative applications capable of being executed by the processor of the machine in which environment 128 resides, and, when executing, show the results of their execution in separate windows 250, 252, and 254 respectively in display area 180 of the connected display device (not shown), each application interacting with window management system 130 to display results in its respective window. Each application is said to "execute in" or "run in" its respective display window. Window management system 130 receives user input signals and directs them to the appropriate application, and controls the display of images in the appropriate window. As an alternative to implementation as a functional enhancement to a specific one of the applications, FIG. 36 shows the functionality of the method of the present invention, designated as method or viewing operation 480, implemented as a separate application, independent from the other applications executing in environment 128.

FIG. 36 also shows Viewing Operation ! Window Management System Interface 500 (hereafter, "window manager interface 500"). Window manager interface 500 is a software component of the implementation of method 480 that contains window management functionality not included in window manager 130 and necessary for method 480 to interact with any one of applications 120, 124, and 126. Window manager interface 500 also includes application identification information concerning the identity, memory location, and model data structure for each application executing in environment 128. Initiation of method 480 in environment 128 causes initiation of window manager interface 500, which first builds a data structure for the application identification information for each application executing in environment 128, and subsequently keeps this data structure updated. Window manager interface 500 communicates between viewing operation 480 and an application, and passes communications between window manager 130 and an executing application. In this implementation, a viewing operation region is a window in which viewing operation 480 executes, and a user interacts with it in the same manner as with other windows.

Window manager interface 500 also keeps track of the location of VOR 186 associated with viewing operation 480. When multiple viewing operations are implemented in environment 128, window manager interface 500 tracks the location of each associated VOR, and notifies each executing viewing operation when a VOR has changed position in display area 180, since a change in position of one VOR may require another viewing operation to repaint, and thus produce a new second image in, the VOR associated with it. Window manager interface 500 may itself be implemented so as to provide a window in display area 180. It is important to note also that the functionality of window manager interface 500 may be incorporated directly into window manager 130 by the supplier of window manager 130.

FIG. 36 also shows Viewing Operation/Application Interfaces 502, 504, and 506. Each of these interfaces is a software component that must be provided for an application executing in environment 128 so that method 480 may communicate, through window manager interface 500, with the application, in the application's terminology, when a user moves VOR 186 over the image produced by the application in the application's window. When an application is opened for execution and a window is created for its image, the application must notify window manager interface 500 so that window manager interface 500 can update the application identification information data structure.

Returning now to FIG. 37, viewing operation region 186, associated with viewing operation 480, is shown in a prior viewing position over window 250 as a circular region with a dotted line boundary. In the multi-window, multi-application environment 128, VOR 186 may be moved along line 256 to be positioned coextensively with the position of an image in window 252. Viewing operation 480 is capable of operating on the model data structure of at least one of the applications 120, 124, and 126 executing in environment 128. Although not shown in FIG. 37, a user may also select any one of windows 250, 252, or 254, and move the selected window under VOR 186.

Figure 38:
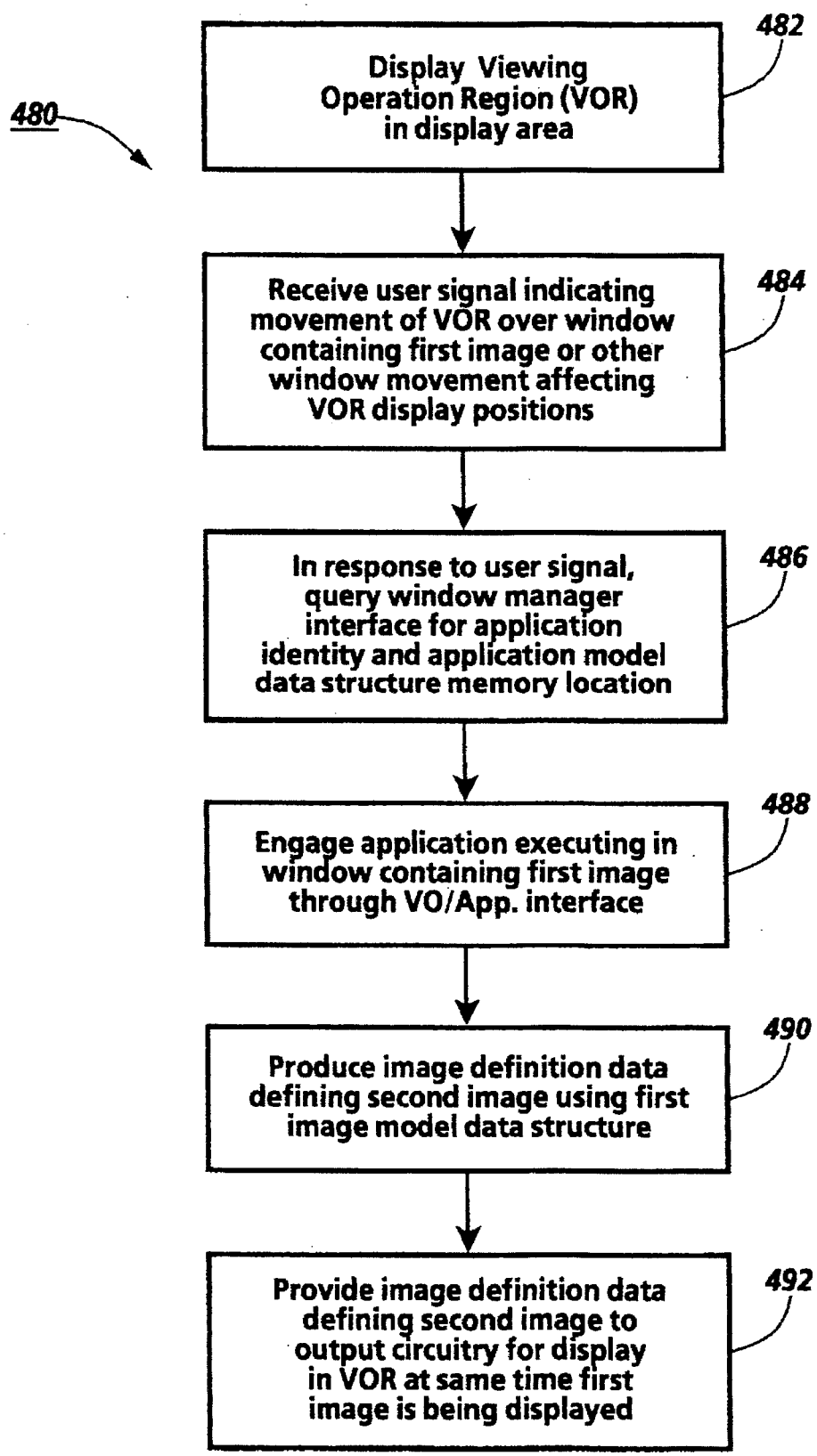
FIG. 38 is a flow chart illustrating the acts of the method as implemented in a multiple window embodiment.

FIG. 38 illustrates the acts of viewing operation 480 in multi-window, multi-application environment 128. When a user opens or otherwise invokes the execution of method 480, the viewing operation region is displayed in display area 180, in box 482. Next, in box 484, a signal is received indicating that the VOR has been moved, or that the movement or re-sizing of another window currently displayed has affected the current position of the VOR. In typical window system environments, whenever a window moves or is re-sized in the display area, window manager 130 identifies all of the windows affected by the moved or re-sized window and instructs each affected application to repaint its associated image in the window for the portion of its window affected. In the case of the present invention, repainting all affected windows includes repainting the image in VOR 186 associated with viewing operation 480, when any portion of the display area coextensive with VOR 186 is affected by an operation on a window. When the viewing operation region is positioned coextensively with a segment of the image in an open window, such as shown in FIG. 37 with VOR 186 positioned over window 252, repainting VOR 186 causes the viewing operation to produce the second image. Implementation in the multi-window, multi-application environment 128 illustrated in FIG. 36 thus requires that method 480 query, in box 486, window manager interface 500 to provide the identity of and access to the model data structures of the application that produced the image in window 252 when selected VOR 186 associated with viewing operation 480 moves over application window 252 (or when a selected application window is moved under VOR 186.)

Method 480 next receives the information it needs from window manager interface 500 and engages, in box 488, with application 124 executing in and associated with window 252, including the image to be operated on. Viewing operation 480 then produces, in box 490, image definition data defining the second image, using at least one data item from the model data structure of application 124 executing in window 252, according to any of the methods for producing a second image previously described for showing a display feature related to the data item from the model data structure of application 124. Viewing operation 480 communicates with application 124 via VO/application interface 504 to produce image definition data defining the second image, which is then provided to the display for display in VOR 186. When method 480 is ready to provide image definition data defining the second image to the display, it instructs application 124, via interface 504, to draw the second image in VOR 186, the window associated with viewing operation 480. Interface 504 handles the communication with application 124 to paint the second image in a window (VOR 186) other than its own window.

E. The machine and software product of the present invention

Figure 39:
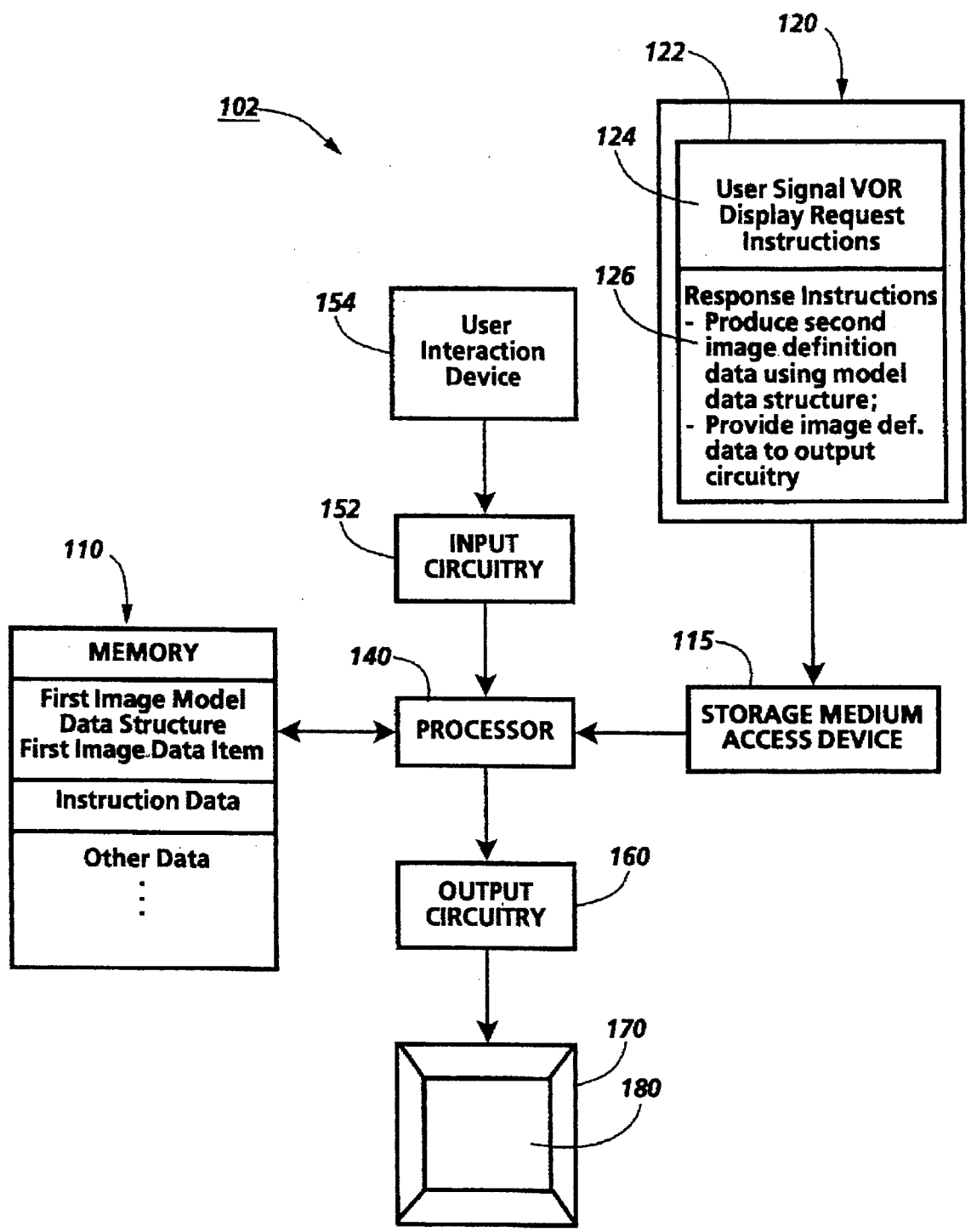
FIG. 39 illustrates a software product including a data storage medium for use in operating a representative processor controlled machine according to the method of the present invention.

The machine of the present invention includes a processor that is operated according to any of the methods previously described. The components, characteristics, and configuration of two machines 100 and 101 have been described above in the discussion at part A.3 accompanying FIGS. 45 and 46. FIG. 39 illustrates still another machine configuration of the present invention. Components of machine 102 in FIG. 39 that are functionally similar to machine components in machines 100 or 101 have the same reference numerals, and will not be described further here. Note that when the method of the present invention is implemented in a machine in which the user input device is a pointing or positioning device that eliminates the user's dependence on a keyboard device for the entry of signals, the machine of the present invention may be a pen- (stylus-) based computing machine, or a small, notebook- or palm-sized processor-controlled machine having a small display area for which a keyboard component is not suitable or not included.

Machine 102 includes storage medium access device 115. Storage medium access device 115 provides data from a data storage medium to processor 140. FIG. 39 also shows software product 120, an article of manufacture that can be used in a system that includes components like those shown in FIG. 39. Software product 120 includes data storage medium 122 that can be accessed by storage medium access device 115. Data storage medium 122 could, for example, be a magnetic medium such as a set of one or more floppy disks or PCMCIA memory storage, an optical medium such as a set of one or more CD-ROMs, or any other appropriate medium for storing data. Data storage medium 122 stores data that storage medium access device 115 can provide to processor 140. In addition to data storage medium 122, software product 120 includes data stored on storage medium 122. The stored data include data indicating user signal VOR display request instructions 124, which can be executed to display the VOR coextensively with a first image segment, as shown, for example, in box 12 in FIGS. 2, 3, 7, 10 or 15. The stored data also include data indicating response instructions 126, which can be executed to produce and provide second image definition data for display in the VOR, such as shown in box 22 in FIG. 2, or in the variations of method 20 shown in box 40 in FIG. 3; box 60 in FIG. 7; and in FIGS. 10, 15, 25, 29, 30, 35 or 38.

F. Functional domains of viewing operations

It is intended that the method of the present invention operate on object-based model data structures associated with any display-based application, including, but not limited to, spreadsheet applications, text editors, multi-media editors, paint programs, solid modeling applications, circuit editors, and meeting support applications. Table 2 below provides examples suitable for implementing the method of the present invention in the broad, general functional domains of three-dimensional rendering, two-dimensional rendering, and text or document manipulation. These domains cross many application areas such as, for example, computer aided design and manufacturing, engineering design, map display, desktop and graphical arts publishing, and architectural design. This list is not intended to be exhaustive, and numerous other implementations not specifically mentioned above and in Table 2 are clearly intended to be encompassed by the method as defined by the appended claims.

TABLE 2

Other Implementation Examples

| Functional Domain | Viewing Operation Examples |
| --- | --- |
| Three-dimensional image rendering | Modify shading models: e.g., flat, smooth, add highlights, line drawing; Modify surface properties: e.g., textures, colors, metals, plastics; |

TABLE 2-continued

Other Implementation Examples

| Functional Domain | Viewing Operation Examples |
| --- | --- |
| | Modify number of bounces in ray tracing; Modify camera model; Modify illuminant outside visible spectrum: e.g., x-ray view, infrared, uv; Provide cutaway view; Provide exploding view; Remove level of detail from original 3-D image; Provide 3D surface rotation from 2D model; Provide 3D extrusion from 2D model |
| Two-dimensional image illustration | Modify line display features; e.g., line weight, dash style ends and joints, color; Modify fill display features: e.g., color, texture; Modify object ordering, layering; Modify color display features: e.g., lighten, darken, change palettes, clip to gamut; Make geometric transformations: e.g., scale, rotate, skew, offset; Modify object shapes, as in U.S. Pat. No. 5,133,052; Provide cutaway view; Provide exploding view; Remove level of detail from original 2-D image; Provide 2D drawing from 3D model |
| Text/Document Modification | Modify typographic display features: e.g., font size, face (bold italic, etc.), line and letter spacing; Look up definitions, antonyms, synonyms, etc. |

Figure 67:
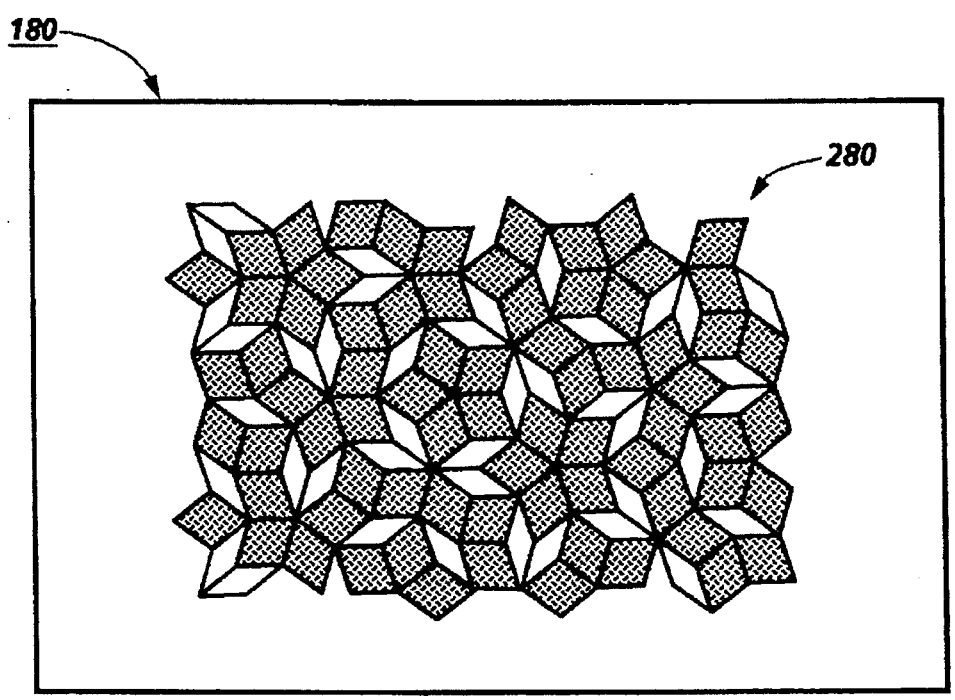
FIGS. 67 and 68 illustrate a type of exploding view that may be provided using the method of the present invention.
Figure 68:
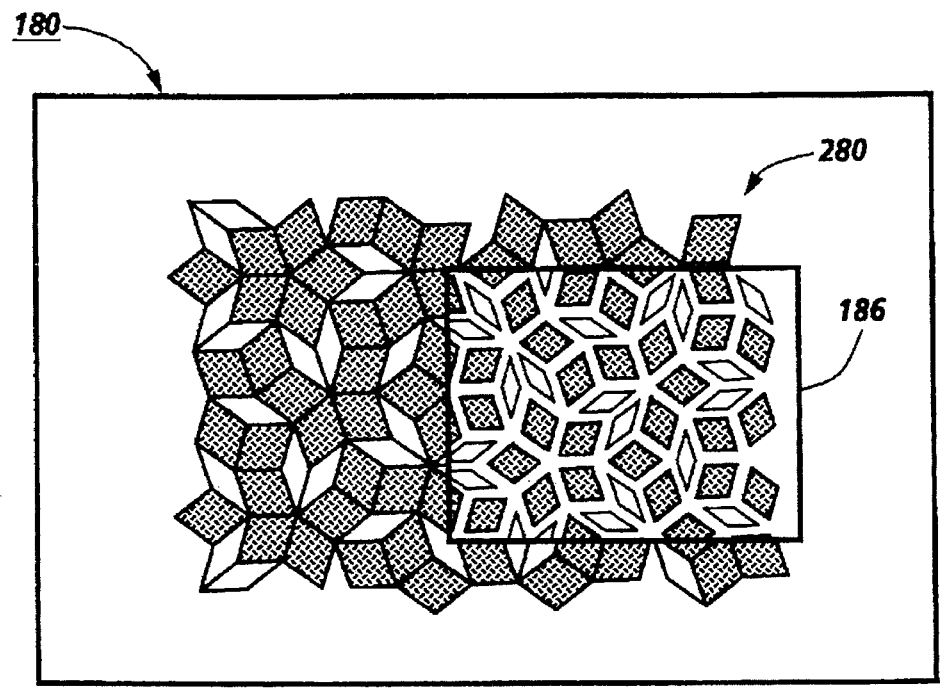

Exploding and cutaway views are two particularly effective and powerful examples of the utility of the present invention. FIG. 67 illustrates image 280, an abstract geometric arrangement of tiles. FIG. 68 illustrates VOR 186 over a portion of image 280 showing a type of exploding view of the elements in image 280. The viewing operation associated with VOR 186 in FIG. 68 follows the general steps outlined in the description: it copies the original model, and scales each object around its own center; the viewing operation then renders the image again and clips it to the size of the VOR. Another method for rendering an exploding view is to copy the model and translate each object along a line or axis, and then re-render and clip to the VOR.

Figure 69:
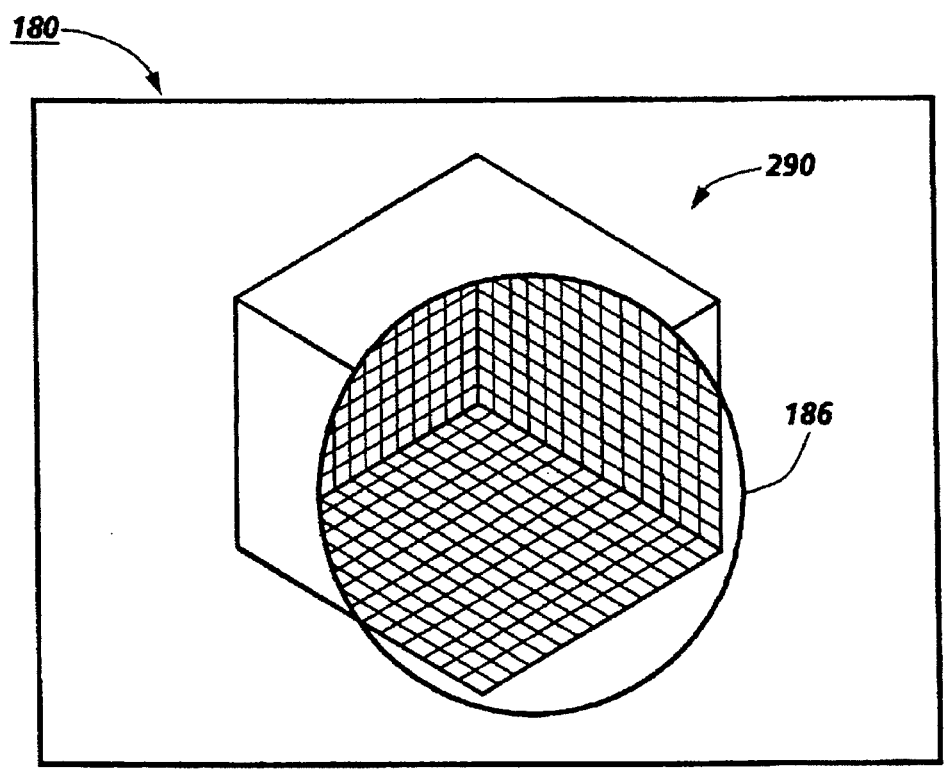
FIG. 69 illustrates a cutaway view of a three-dimensional image that may be provided using the method of the present invention.

FIG. 69 illustrates a cutaway view in VOR 186 of 3-D image 290. The scene description for the cube in image 290 includes information about the interior surface properties of the cube that the viewing operation associated with VOR 186 access and re-renders.

G. Miscellaneous Considerations

1. Display request signals from non-user sources

As discussed above in Part B.1 with respect to method 10, request signal data is received from the signal source, in box 12, indicating a display request to present an output producing region displayed in a present viewing position in the display area coextensive with a present image position of a first image segment of a first image. In the illustrated embodiments, the request signal data is generated by a machine user who uses a pointing device to manipulate the output producing, or viewing operation, region in the display area in order to position it coextensively with a first image segment.

The method of the present invention may also include request signal data received from and generated by other signal sources. For example, once a machine user has positioned a viewing operation over a first image, and, in response, the viewing operation has produced a second image from the model data structure, the viewing operation region may be left in its present viewing position, and a second image may be produced in response to request signal data received from the application signaling that the model data structure has been changed, so that an updated second image is produced in the viewing operation region when the model data structure has been edited. In another example, the second image may be produced according to the passing of time.

In still another example, the entire method of the present invention may be automated to be initiated and performed in response to non-user request signal data received from and generated by, for example, the application or the operating system. In such an implementation, the application or the operating system may initiate the method of the present invention in response to a certain processing condition, such as an error condition.

2. Viewing operation regions

Figure 40:
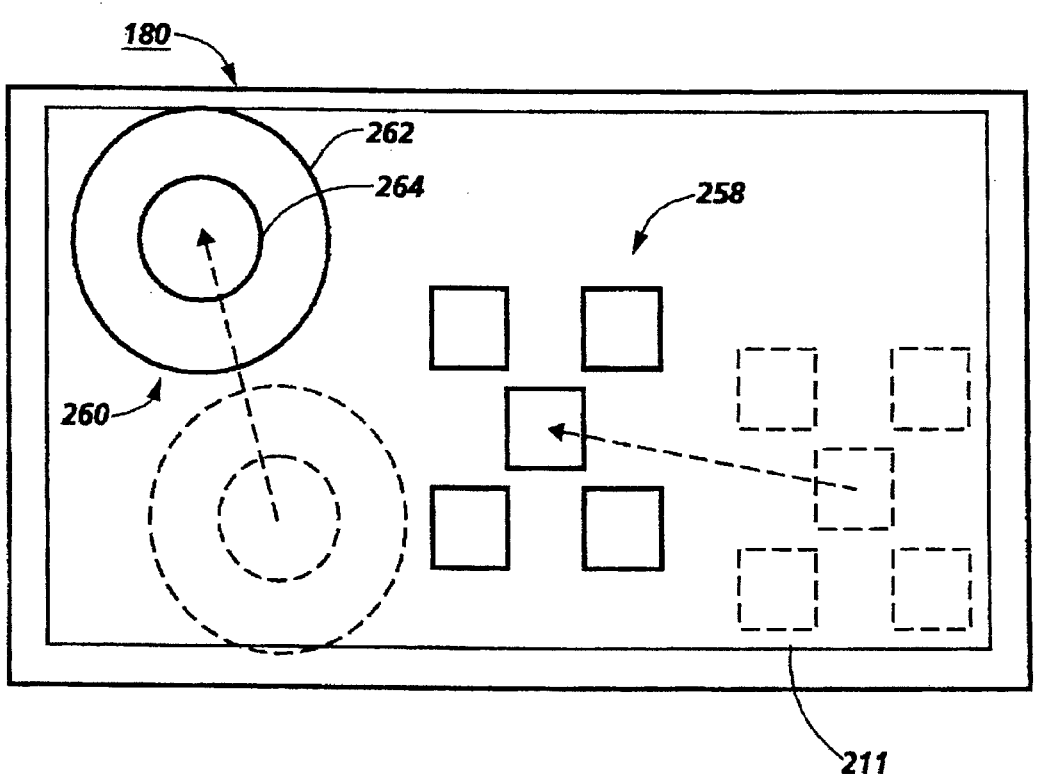
FIG. 40 illustrates a display screen showing different configurations of a viewing operation region.

The viewing operation region is a display feature perceptible as a coherent unity having at least one distinguishable outline and at least one bounded area. The distinguishable outline defines and distinguishes the portion, or segment, of the first image for which a second image is produced from the remainder of the first image for which a second image is not produced. In the drawings, the exemplary viewing operation regions are illustrated as rectangular or circular bounded areas with an explicitly drawn boundary line. However, the viewing operation region may have a topologically complex boundary, need not be a fixed or predetermined shape, and need not have an explicitly drawn border as long as it is perceptible as a coherent, distinguishable bounded area. Thus, in the illustrated embodiments in which the user interacts with the VOR, the VOR must be sufficiently perceptible to the machine user for the user to locate the VOR in the display area and to attach the tracking symbol or cursor. In addition, the VOR need not be a single bounded area, but may be two or more contiguous or noncontiguous bounded areas that function together as a single bounded area would. FIG. 40 shows VOR 258 and VOR 260 in display area 180 to illustrate the variety of shapes that the VOR may have. VOR 260 is bounded by both exterior circular boundary 262 and interior circular boundary 264; the region inside boundary 264 is not included in VOR 260. VOR 258 includes five noncontiguous regions that function together as a VOR. FIG. 40 illustrates VOR 258 moving along the dotted line arrow from a first position shown in the dotted line boundary.

In the drawings and illustrated embodiments, the exemplary viewing operation regions define the segment of the first image for which a second image is produced as being inside the viewing operation region. The method of the present invention may also be implemented, however, to provide a viewing operation region that defines the first image segment as being the portion of the first image outside the viewing operation region. In this manner, the method of the present invention displays the second image in place of the first image segment in the display area outside the distinguishable outline of the viewing operation region.

It is therefore evident that there has been provided in accordance with the present invention, a method of operating a machine, as well as a machine, that fully satisfy the aims and advantages set forth herein. While this invention has been described in conjunction with specific embodiments, many alternatives, modifications and variations will be apparent to those skilled in the art. The specific embodiments illustrated and discussed herein are by no means exhaustive of all possible categories and instances of method implementations, and the invention as herein described is intended to embrace all such alternatives, modifications and variations as fall within the scope of the appended claims.

What is claimed:

1. A method of operating a machine; the machine including:
    a signal source for producing signals indicating image display requests;
    output circuitry connected to an output utilization device; the output utilization device producing human perceptible output; the output utilization device including a display having a display area for presenting images in response to receiving image definition data from the output circuitry; the display area having a first image displayed in a present image position therein;
    a processor connected for receiving the signals from the signal source, and connected for providing data defining human perceptible output to the output circuitry; and
    memory for storing data; the data stored in the memory including:
        a first image model data structure; the first image being produced using the first image model data structure; and
        instruction data indicating instructions the processor executes; the instruction data including a model-based output operation for use in operating on the first image model data structure;
        the processor further being connected for accessing the data stored in the memory;
    the method comprising:
    operating the processor to receive request signal data from the signal source; the request signal data indicating a display request to present an output producing region in a present viewing position in the display area coextensive with the present image position of a first image segment of the first image; the output producing region having the model-based output operation associated therewith; and
    operating the processor to respond to the request signal data indicating the display request by
        determining an input portion of the first image model data structure using the present viewing position of the output producing region;
        producing output signal data defining human perceptible output using the model-based output operation and using the input portion of the first image model data structure; and
        providing the output signal data defining the human perceptible output to the output circuitry connected to the output utilization device so that the output utilization device presents the human perceptible output in response to the display of the output producing region substantially at the same time as the first image is being displayed in the display area;
    whereby presentation of the human perceptible output produced using the first image model data structure in response to the display request gives the perception to a machine user of providing information related to the first image segment.

2. The method according to claim 1 wherein the output producing region is a viewing operation region, and wherein the act of operating the processor to produce the output signal data includes producing image definition data defining a second image for display in the viewing operation region; the second image having size and shape dimensions substantially identical to size and shape dimensions of the viewing operation region; and the act of operating the processor to provide the output signal data to the output circuitry connected to the output utilization device includes providing the image definition data defining the second image to the output circuitry connected to the display so that the display presents the second image in the viewing operation region; the second image being presented in the viewing operation region substantially at the same time as the first image is being displayed in the display area; whereby the second image in the viewing operation region in the present viewing position in the display area coextensive with the present image position of the first image segment replaces the first image segment in the display area.

3. The method according to claim 2 wherein the first image segment includes a first display feature; wherein the first image model data structure includes a display feature attribute data item having a present attribute value indicating the first display feature; and wherein the act of operating the processor to produce the image definition data defining the second image further includes obtaining a new attribute value for the display feature attribute data item; the new attribute value indicating a modified first display feature; and using the new attribute value for the display feature attribute data item to produce the image definition data defining the second image; the second image thereby including the modified first display feature;

whereby the first image segment including the first display feature is replaced by the second image including the modified first display feature displayed in the viewing operation region.

4. The method according to claim 3 wherein the act of obtaining the new attribute value for the display feature attribute data item produces a predetermined attribute value.

5. The method according to claim 3 wherein the act of obtaining the new attribute value for the display feature attribute data item includes computing the new attribute value from an attribute change function using an operating parameter data item, the attribute change function relating the operating parameter data item to the new attribute value.

6. The method of claim 5 wherein the signal source includes input circuitry connected to a user input device;

the input circuitry receiving signals from the user input device indicating actions of a machine user; and the act of operating the processor to receive the request signal data includes receiving the request signal data from the input circuitry indicating the display request by the machine user; the request signal data including the operating parameter data item;

whereby the machine user provides the operating parameter data item for obtaining the new attribute value indicating the modified first display feature to be included in the second image.

7. The method according to claim 3 wherein the first display feature has first and second display feature positions in the display area; and wherein the act of operating the processor to produce the image definition data defining the second image further includes, when one of the first and second display feature positions is coextensive with image display positions in the display area inside the viewing operation region and the other of the first and second display feature positions is coextensive with image display positions in the display area outside the viewing operation region, producing the image definition data defining the second image so that the second image includes the modified first display feature only for the display feature positions of the modified first display feature coextensive with image display positions in the display area inside the viewing operation region;

whereby the first display feature appears unmodified for the display feature positions of the first display feature coextensive with image display positions in the display area outside the viewing operation region.

8. The method of claim 3 wherein the signal source includes input circuitry connected to a user input device; the input circuitry receiving signals from the user input device indicating actions of a machine user; and the act of operating the processor to receive the request signal data indicating the display request from the signal source includes receiving the request signal data from the input circuitry indicating the display request by the machine user.

9. The method according to claim 3 wherein the data stored in the memory further includes instruction data defining an application operation; the application operation being capable of producing the first image including the first display feature from the first image model data structure; and the act of producing the image definition data defining the second image including the modified first display feature includes operating the processor to perform the application operation using the first image model data structure and the new attribute value for the display feature attribute data item.

10. The method according to claim 3 wherein the act of operating the processor to produce the image definition data defining the second image further includes:

operating the processor to access the display feature attribute data item in the first image model data structure, and to obtain the present attribute value thereof; and operating the processor to select the display feature attribute data item as a selected display feature attribute data item when the present attribute value matches display attribute selection criteria information indicated by a criteria selection data item; and the act of using the new attribute value to produce the image definition data defining the second image includes using the new attribute value for the selected display feature attribute data item;

whereby the first image segment including the first display feature is replaced by the second image including the modified first display feature displayed in the viewing operation region only when the display feature attribute data item is selected according to the display attribute selection criteria information.

11. The method according to claim 10 wherein the act of producing the image definition data defining the second image further includes, when the present attribute value of the display feature attribute data item does not match the display attribute selection criteria information, using the present attribute value of the display feature attribute data item without modification; the second image including the first display feature having no modification thereto.

12. A method of operating a machine; the machine including:

input circuitry connected to a user input device; the input circuitry receiving signals indicating requests of a machine user;

output circuitry connected to a display having a display area for presenting images; the display area having a first image displayed in a present image position therein;

a processor connected for receiving the signals from the input circuitry, and connected for providing image definition data defining images to the output circuitry; and memory for storing data; the data stored in the memory including:
instruction data indicating instructions the processor executes; and
a first image model data structure; the first image being produced from the first image model data structure;

the processor further being connected for accessing the data stored in the memory;

the method comprising:

operating the processor to receive request signal data from the input circuitry indicating a display request by the machine user to display a viewing operation region in a present viewing position in the display area coextensive with the present image position of a first image segment of the first image; the viewing operation region having a model-based viewing operation associated therewith for mapping the first image model data structure to image definition data defining a second image for display in the viewing operation region; and operating the processor to respond to the request signal data indicating the display request by producing image definition data defining the second image according to the model-based viewing operation using the first image model data structure; the second image having size and shape dimensions substantially identical to size and shape dimensions of the viewing operation region; and providing the image definition data defining the second image to the output circuitry connected to the display so that the display presents the second image in the viewing operation region in response to the image definition data; the second image being displayed substantially at the same time as the first image is being displayed in the display area;

whereby replacing the first image segment in the display area with the presentation of the second image in the viewing operation region in response to the display request by the machine user gives the perception to the machine user of producing a view of the first image according to the model-based viewing operation associated with the viewing operation region.

13. The method according to claim 12 wherein the first image segment includes a first display feature representing a display feature attribute data item included in the first image model data structure; the display feature attribute data item having a present attribute value indicating the first display feature; and wherein the act of producing the image definition data defining the second image includes operating on an attribute change data item to obtain a new attribute value for the display feature attribute data item; the new attribute value indicating a modified first display feature; and using the new attribute value for the display feature attribute data item to produce the image definition data defining the second image; the second image thereby including the modified first display feature;

whereby the second image including the modified first display feature displayed in the viewing operation region replaces the first image segment including the first display feature in the display area.

14. The method according to claim 13 wherein the first image segment further includes a plurality of first image segment display features; the plurality of first image segment display features and the first display feature constituting the first image segment; each first image segment display feature representing one of a plurality of first image data items in the first image model data structure; and wherein the act of operating the processor to produce the image definition data defining the second image further includes using the plurality of first image data items in the first image model data structure represented by the plurality of first image segment display features in the first image segment; the second image thereby including the modified first display feature and the plurality of first image segment display features;

whereby presentation of the second image including the modified first display feature and the plurality of first image segment display features in the viewing operation region gives the appearance to the machine user of presenting the modified first display feature in the spatial context of the first image.

15. The method according to claim 13 wherein the act of operating the processor to produce the image definition data defining the second image further includes:
operating the processor to access the display feature attribute data item in the first image model data structure, and to obtain the present attribute value thereof; and
selecting the display feature attribute data item as a selected display feature attribute data item when the present attribute value of the display feature attribute data item matches display attribute selection criteria information indicated by a criteria selection data item; and the act of using the new attribute value for the display feature attribute data item to produce the image definition data defining the second image includes
using the new attribute value for the selected display feature attribute data item when the present attribute value of the display feature attribute data item matches the display attribute selection criteria information; and
using the present attribute value without modification for the display feature attribute data item when the present attribute value of the display feature attribute data item does not match the display attribute selection criteria information; the second image thereby including the first display feature having no modification thereto;

whereby the modified first display feature in the second image displayed in the viewing operation region replaces the first display feature included in the first image segment only when the display feature attribute data item is selected according to the display attribute selection criteria information.

16. The method according to claim 13 wherein the request signal data from the input circuitry indicating the display request by the machine user includes a movement signal indicating a movement action by the machine user moving the viewing operation region from a first position in the display area to the present viewing position coextensive with the first image segment including the first display feature in the display area.

17. The method according to claim 16 wherein the first image has the appearance of being displayed in a first image plane in the display area;

the viewing operation region has the appearance of being displayed in a second image plane in the display area, in front of the first image plane; and the movement action by the machine user moves the viewing operation region displayed in the second image plane in front of the first image segment of the first image displayed in the first image plane.

18. The method according to claim 16 further including, before operating the processor to receive the movement signal from the input circuitry indicating moving the viewing operation region to the present viewing position, operating the processor to determine if the viewing operation region is currently displayed in a first viewing position coextensive with a prior image position of a prior selected first image segment in the display area; the prior selected first image segment including a prior first display feature; and wherein the act of producing the image definition data defining the second image further includes producing image definition data defining the prior selected first image segment including the prior first display feature of the first image; and the act of operating the processor to provide the image definition data defining the second image to the output circuitry includes providing the image definition data defining the prior selected first image segment to the output circuitry connected to the display so that the display presents the prior selected first image segment including the prior first display feature in the prior image position of the display area substantially at the same time as the second image is displayed in the viewing operation region;

thereby giving the appearance to the machine user of continuously presenting the first image including the prior selected first image segment with the prior first display feature in the display area while presenting the second image including the modified first display feature in the viewing operation region.

19. The method according to claim 12 wherein the display area has a plurality of first images displayed therein;

the data stored in the memory further includes a plurality of first image model data structures; each of the first images being produced from a respective one of the first image model data structures; the data stored in the memory further including image identification data indicating the respective one of the first image model data structures producing each first image; and the act of operating the processor to produce the image definition data defining the second image includes operating the processor to access the image identification data to identify the first image model data structure which produced the first image segment positioned coextensively with the viewing operation region.

20. A method of operating a machine; the machine including:

a user input device for receiving signals indicating actions of a machine user;

a display having a display area for presenting images; the display area having a first image displayed in a present image position therein; the first image including a first display feature;

a processor connected for receiving the signals from the user input device, and connected for providing image definition data defining images to the display; and memory for storing data; the data stored in the memory including:

instruction data indicating instructions the processor executes; and a first image model data structure; the first image being produced from the first image model data structure; the first image model data structure including a display feature attribute data item represented by the first display feature included in the first image; the display feature attribute data item having a present attribute value indicating the first display feature when displayed in the display area;

the processor further being connected for accessing the data stored in the memory;

the method comprising:

operating the processor to provide image definition data defining a viewing operation region image to the display; the display presenting the viewing operation region image in response to the image definition data; the viewing operation region image showing a viewing operation region displayed in a first position in the display area; the viewing operation region having a model-based viewing operation associated therewith for mapping the present attribute value of the display feature attribute data item to a new attribute value;

operating the processor to receive user signal data from the user input device; the user signal data indicating a movement action by the machine user moving the viewing operation region from the first position in the display area to a present viewing position coextensive with the present image position of a first image segment of the first image; the first image segment including the first display feature; and operating the processor to respond to the user signal data indicating movement of the viewing operation region by providing image definition data defining a second image to the display so that the display presents the viewing operation region in the present viewing position and presents the second image in the viewing operation region in response to the image definition data; the second image having size and shape dimensions substantially identical to size and shape dimensions of the viewing operation region; the second image showing a modified first display feature representing the new attribute value for the display feature attribute data item included in the first model data structure;

whereby presentation in the viewing operation region of the modified first display feature included in the second image replaces presentation of the first display feature included in the first image segment.

21. The method according to claim 20 wherein the act of operating the processor to respond to the user signal data by providing image definition data defining a second image to the display further includes:

operating the processor to access the display feature attribute data item in the first image model data structure, and to obtain the present attribute value thereof; and operating the processor to select the display feature attribute data item as a selected display feature attribute data item when the present attribute value of the display feature attribute data item matches display attribute selection criteria information indicated by a criteria selection data item; and operating the processor to produce the image definition data defining the second image using the new attribute value for the selected display feature attribute data item; the second image including the modified first display feature;

whereby presentation of the second image including the modified first display feature in the viewing operation region, in response to movement of the viewing operation region, gives the appearance to the machine user of replacing the first image segment with the second image including the modified first display feature only when the display feature attribute data item is selected according to the display attribute selection criteria information.

22. A method of operating a machine; the machine including:

input circuitry connected to a user input device; the input circuitry receiving signals indicating requests of a machine user;

output circuitry connected to a display having a display area for presenting images; the display area having a rendered image displayed in a present image position therein;

a processor connected for receiving the signals from the input circuitry, and connected for providing image definition data defining images to the output circuitry; and memory for storing data; the data stored in the memory including:

a scene description model data structure used for producing the rendered image; the scene description model data structure including a display feature attribute data item having a present attribute value for controlling the appearance of a plurality of image display features in the first image; and instruction data indicating instructions the processor executes; the instruction data including rendering operation instruction data defining a graphical image rendering operation capable of producing the rendered image from the scene description model data structure;

the processor further being connected for accessing the data stored in the memory;

the method comprising:

operating the processor to receive request signal data from the input circuitry indicating a display request by the machine user to display a viewing operation region in a present viewing position in the display area coextensive with the present image position of a first image segment of the rendered image; and operating the processor to respond to the request signal data indicating the display request by obtaining a new attribute value for the display feature attribute data item; the new attribute value indicating a plurality of modified image display features;

obtaining second image size-and-position data from the present viewing position of the viewing operation region in the display area indicating size and position information about a second rendered image;

executing the rendering operation instruction data defining the graphical image rendering operation to produce image definition data defining the second rendered image using the scene description model data structure, the new attribute value for the display feature attribute data item, and the second image size-and-position data; the second rendered image including the plurality of modified image display features modified according to the new attribute value; the second rendered image having size and shape dimensions substantially identical to size and shape dimensions of the viewing operation region; and providing the image definition data defining the second rendered image to the output circuitry connected to the display so that the display presents the second rendered image in the viewing operation region; the second rendered image being displayed substantially at the same time as the rendered image is being displayed in the display area;

whereby, in response to the display request by the machine user, the second rendered image displayed in the viewing operation region appears to replace the first image segment in the display area in the spatial context of the rendered image, giving the appearance to the machine user of replacing the plurality of image display features in the first image segment with the plurality of modified image display features.

23. A machine comprising:

a signal source for producing signals indicating output operation requests;

output circuitry connected to an output utilization device; the output utilization device presenting human perceptible output; the output utilization device including a display having a display area for presenting images; the display area having a first image displayed in a present image position therein;

a processor connected for receiving the signals from the signal source, and connected for providing data defining human perceptible output to the output circuitry for presentation by the output utilization device; and memory for storing data; the data stored in the memory including:

a first image model data structure; the first image being produced using the first image model data structure; and instruction data indicating instructions the processor can execute; the instructions including a model-based output operation for use in operating on the first image model data structure;

the processor being further connected for accessing the data stored in the memory;

the processor, in executing the output operation instructions, receiving request signal data from the signal source; the request signal data indicating a display request to present an output producing region displayed in a present viewing position in the display area coextensive with the present image position of a first image segment of the first image; the output producing region having the model-based output operation associated therewith;

the processor further, in responding to the request signal data indicating the display request, determining an input portion of the first image model data structure using the present viewing position of the viewing operation region;

producing output signal data defining human perceptible output using the model-based output operation and the input portion of the first image model data structure; and providing the output signal data defining the human perceptible output to the output circuitry connected to the output utilization device so that the output utilization device presents the human perceptible output in response to the output signal data; the output utilization device presenting the human perceptible output in response to the display of the output producing region at the same time as the first image is being displayed in the display area;

whereby presentation of the human perceptible output produced using the first image model data structure in response to the display request gives the perception to a machine user of providing information related to the first image segment.

24. A machine comprising:

input circuitry connected to a user input device; the input circuitry receiving signals indicating requests of a machine user;

output circuitry connected to a display having a display area for presenting images; the display area having a first image displayed in a present image position therein;

a processor connected for receiving the signals from the input circuitry, and connected for providing image definition data defining images to the output circuitry for presentation by the display; and memory for storing data; the data stored in the memory including:

a first image model data structure; the first image being produced from the first image model data structure; and instruction data indicating instructions the processor can execute; the instruction data including a model-based viewing operation for operating on the first image model data structure;

the processor being further connected for accessing the data stored in the memory;

the processor, in executing the instructions, receiving request signal data from the input circuitry indicating a display request by the machine user to display a viewing operation region in a present viewing position in the display area coextensive with the present image position of a first image segment of the first image; the viewing operation region having the model-based viewing operation associated therewith;

the processor further, in executing the instructions, responding to the request signal data indicating the display request by producing image definition data defining a second image using the model-based viewing operation and the first image model data structure; the second image having size and shape dimensions substantially identical to size and shape dimensions of the viewing operation region; and providing the image definition data defining the second image to the output circuitry connected to the display so that the display presents the second image in the viewing operation region in response to the image definition data; the second image being displayed substantially at the same time as the first image is being displayed in the display area;

whereby the processor, in executing the instructions, causes the presentation of the second image in the viewing operation region to replace the presentation of the first image segment in the display area in response to the display request by the machine user.

25. The machine according to claim 24 wherein the first image segment includes a first display feature representing a display feature attribute data item included in the first image model data structure; the display feature attribute data item having a present attribute value indicating the first display feature; and wherein the processor further, in responding to the request signal data indicating the display request by producing the image definition data defining the second image using the first image model data structure, obtaining a new attribute value for the display feature attribute data item; the new attribute value indicating a modified first display feature; and using the new attribute value for the display feature attribute data item to produce the image definition data defining the second image; the second image thereby including the modified first display feature;

whereby the processor causes the second image including the modified first display feature displayed in the viewing operation region to replace the first image segment including the first display feature displayed in the display area in response to the display request by the machine user.

26. An article of manufacture for use in a machine that includes:

a display having a display area for presenting images to a machine user; the display area having a first image displayed in a first image position therein;

a user input device for receiving signals indicating actions of the machine user;

memory for storing data; the data stored in the memory including a first image model data structure; the first image being produced from the first image model data structure;

a storage medium access device for accessing a medium that stores data; and a processor connected for receiving data from the user input device, for providing data defining images to the display, and for accessing the data stored in the memory; the processor further being connected for receiving data from the storage medium access device;

the article comprising:

a data storage medium that can be accessed by the storage medium access device when the article is used in the machine; and data stored in the data storage medium so that the storage medium access device can provide the stored data to the processor when the article is used in the machine; the stored data comprising instruction data indicating instructions the processor can execute;

the processor, in executing the instructions, receiving request signal data from the user input device indicating a display request by the machine user to display a viewing operation region in a present viewing position in the display area coextensive with a present image position of a first image segment of the first image; the viewing operation region having a model-based viewing operation associated therewith for operating on the first image model data structure;

the processor, further in executing the instructions, responding to the display request by providing image definition data defining a second image to the display so that the display presents the second image in the viewing operation region in response to the image definition data; the second image being produced according to the model-based viewing operation using the first image model data structure; the second image having size and shape dimensions substantially identical to size and shape dimensions of the viewing operation region; the second image being displayed substantially at the same time as the first image is being displayed in the display area;

whereby the processor, in executing the instructions indicated by the instruction data stored in the data storage medium, causes, in response to the display request by the machine user, presentation of the second image in the viewing operation region to replace presentation of the first image segment in the display area.

27. The article of manufacture according to 26 wherein,
in the machine that includes the display area having a first image displayed in a first image position therein, the first image including a first display feature;
in the machine that includes the memory for storing the first image model data structure, the first image model data structure including a display feature attribute data item representing the first display feature in the first image;
the processor, in receiving request signal data from the user input device indicating a display request by the machine user, displaying the viewing operation region so that the first image segment includes the first display feature; and
the processor, further in executing the instructions, further responding to the display request by providing the image definition data defining the second image to the display, producing the image definition data defining the second image using a new attribute value for the display feature attribute data item included in the first model data structure; the second image showing a modified first display feature representing the new attribute value;
whereby the processor, in executing the instructions indicated by the instruction data stored in the data storage medium, causes, in response to the display request by the machine user, presentation of the second image including the modified first display feature in the viewing operation region to replace presentation of the first image segment including the first display feature in the display area.

28. A machine comprising:
input circuitry connected to a user input device; the input circuitry receiving signals from the user input device indicating requests of a machine user;
image output circuitry connected to a display having a display area for presenting images thereon;
a memory for storing data; and
a processor connected for receiving the signals from the input circuitry, and connected for providing image definition data defining images to the output circuitry connected to the display; the output circuitry causing the display to present the images in the display area in response to receiving the image definition data;
the data stored in the memory including:
a model data structure indicating information;
image definition data defining a first image; the first image being produced using the model data structure and displayed in a present image position in the display area of the display;
viewing operation interface instruction data indicating viewing operation region presentation instructions the processor can execute to produce image definition data defining a viewing operation region for display in the display area in a present viewing position; the viewing operation region presentation instructions including input request instructions for receiving the request signal data from the input circuitry; and
viewing operation instruction data indicating model-based viewing operation instructions the processor can execute to produce image definition data defining a second image using the model data structure;
the model-based viewing operation instructions determining an input portion of the model data structure for use in producing the second image by using the present viewing position of the viewing operation region to obtain a data item included in the model data structure; the processor executing the model-based viewing operation instructions in response to executing the input request instructions for receiving the request signal data from the input circuitry;
the processor being further connected for accessing the data stored in the memory;
when request signal data is provided from the input circuitry indicating an image display request by the machine user to display the viewing operation region in the display area, execution of the viewing operation region presentation instructions causing the processor to receive the request signal data from the input circuitry and to display the viewing operation region in the present viewing position in the display area coextensive with the present image position of a first image segment of the first image;
execution of the viewing operation region presentation instructions further causing the processor to execute the model-based viewing operation instructions to produce the second image using the model data structure;
execution of the viewing operation instructions further causing the processor to display the second image in the viewing operation region substantially at the same time as the first image is being displayed in the display area so that the second image overlays and replaces the first image segment in the display area.

29. The machine of claim 28 wherein the request signal data indicating the image display request by the machine user to display a viewing operation region includes signals indicating a movement action by the user moving the viewing operation region from a prior viewing position in the display area to the present viewing position coextensive with the present image position of the first image segment of the first image.

30. A method of operating a machine to provide multiple views of an information space; the machine including a display having a display area for presenting images; a processor connected for providing image definition data defining images for presentation in the display area of the display; and memory for storing data; the data stored in the memory including instruction data indicating instructions the processor executes and a model data structure indicating information in the information space; the processor further being connected for accessing the data stored in the memory;
the method comprising:
presenting a first image in a present image position in the display area of the display; the first image being produced from the model data structure and representing a first view of the information space;
providing a model-based viewing operation, stored in the memory of the machine, to produce a second image representing a second view of the information space using the model data structure;
presenting a viewing operation region in a present viewing position in the display area coextensive with the present image position of a first image segment of the first image;
determining an input portion of the model data structure for use in producing the second image; the input portion of the model data structure being determined by using the present image position of the first image segment as determined by the present viewing position of the viewing operation region coextensively positioned therewith;

producing the second image representing the second view of the information space using the model-based viewing operation and the input portion of the model data structure; and presenting the second image in the viewing operation region so that the second image overlays and replaces the first image segment in the display area; the second image having size and shape dimensions substantially identical to size and shape dimensions of the viewing operation region, and being displayed substantially at the same time as the first image is being displayed in the display area.

31. The method of operating the machine of claim 30 wherein the machine further includes a user input device for receiving signals indicating requests of a machine user; the processor being further connected for receiving the signals indicating the requests of the machine user; and wherein the viewing operation region is presented in the present viewing position in the display area in response to receiving request signal data from the user input device; the request signal data indicating a display request by the machine user to present the viewing operation region in the present viewing position.

32. The method of operating the machine of claim 31 wherein the signals indicating the requests of the machine user indicate a movement action by the machine user moving the viewing operation region from a prior viewing position in the display area to the present viewing position.

33. The method of operating the machine of claim 30 wherein the step of determining an input portion of the model data structure for use in producing the second image includes using a predetermined selection position within the viewing operation region to obtain a data item included in the model structure; the viewing operation using the data item to produce the second image.

* * * * *